US012680181B2

(12) United States Patent
Strange

(10) Patent No.: US 12,680,181 B2
(45) Date of Patent: *Jul. 14, 2026

(54) GEOTHERMAL HYDROGEN PRODUCTION SYSTEM

(71) Applicant: GOOD WATER ENERGY LTD, Claremont (AU)

(72) Inventor: Warren Ross Strange, Claremont (AU)

(73) Assignee: GOOD WATER ENERGY LTD., Claremont (AU)

( * ) Notice: Subject to any disclaimer, the term of this patent is extended or adjusted under 35 U.S.C. 154(b) by 530 days.

This patent is subject to a terminal disclaimer.

(21) Appl. No.: 18/276,836

(22) PCT Filed: Feb. 9, 2022

(86) PCT No.: PCT/AU2022/050082

§ 371 (c)(1),
(2) Date: Aug. 10, 2023

(87) PCT Pub. No.: WO2022/170390

PCT Pub. Date: Aug. 18, 2022

(65) Prior Publication Data

US 2025/0277318 A1 Sep. 4, 2025

(30) Foreign Application Priority Data

Feb. 10, 2021 (AU) ................................ 2021100825
Feb. 10, 2021 (AU) ................................ 2021100827

(Continued)

(51) Int. Cl.
*C25B 9/65* (2021.01)
*C02F 1/16* (2023.01)

(Continued)

(52) U.S. Cl.
CPC .................. *C25B 9/65* (2021.01); *C02F 1/16* (2013.01); *C25B 1/04* (2013.01); *C25B 15/085* (2021.01);

(Continued)

(58) Field of Classification Search
CPC ................................ C02F 1/10; C02F 1/4604
See application file for complete search history.

(56) References Cited

U.S. PATENT DOCUMENTS 7,453,164 B2 * 11/2008 Borden ................... F03D 13/25
                                                        123/3
7,891,188 B2 * 2/2011 Zachar ..................... C25B 1/04
                                                        60/659

(Continued)

FOREIGN PATENT DOCUMENTS

AU       2014101274 A4    11/2014
DE          2933068 A1     3/1981
JP       2005337060 A     12/2005

OTHER PUBLICATIONS

International Search Report for related International Application No. PCT/AU2022/050082; action dated Aug. 18, 2022; (4 pages).

(Continued)

*Primary Examiner* — Brian W Cohen
(74) *Attorney, Agent, or Firm* — K&L Gates LLP

(57) ABSTRACT

The present disclosure is directed to a geothermal hydrogen production system, comprising; a primary liquid circuit circulating a liquid into a geothermal well and returning heated liquid from a well head of the geothermal well, the primary liquid circuit passing through a desalination plant; a first turbine driven by the heated liquid to produce a first mechanical output; and a second turbine driven by the heated liquid to produce a second mechanical output, wherein the first mechanical output drives an electrical generator, configured to power an electrolyser generating (Continued)

hydrogen via electrolysis of fresh water, and the second mechanical output drives an air compressor to provide at least one of a first, a second and a third compressed air supply, wherein the first compressed air supply drives a supply pump to supply salt water to the desalination plant, the second compressed air supply drives a start-up pump to initiate the primary liquid circuit, and the third compressed air supply drives a fresh water pump to deliver fresh water from the desalination plant to the electrolyser.

56 Claims, 16 Drawing Sheets

(30) Foreign Application Priority Data

| | | |
|---|---|---|
| Feb. 10, 2021 | (AU) ................................ | 2021900321 |
| Feb. 10, 2021 | (AU) ................................ | 2021900322 |
| Jun. 25, 2021 | (AU) ................................ | 2021103623 |
| Jun. 25, 2021 | (AU) ................................ | 2021901941 |
| Nov. 25, 2021 | (AU) ................................ | 2021903799 |

(51) Int. Cl.
  *C02F 103/08* (2006.01)
  *C25B 1/04* (2021.01)

*C25B 15/08* (2006.01)
  *F01D 15/08* (2006.01)
  *F03G 4/00* (2006.01)

(52) U.S. Cl.
  CPC ............... *F01D 15/08* (2013.01); *F03G 4/00* (2021.08); *C02F 2103/08* (2013.01); *C02F 2201/009* (2013.01); *C02F 2303/10* (2013.01); *F05D 2220/76* (2013.01)

(56) References Cited

U.S. PATENT DOCUMENTS

| | | | | |
|---|---|---|---|---|
| 12,372,068 | B2 * | 7/2025 | Strange | ................... F24T 50/00 |
| 2008/0127646 | A1 * | 6/2008 | Doland | .................... F03D 9/19 |
| | | | | 60/495 |
| 2010/0045042 | A1 * | 2/2010 | Hinders | ............... F28D 9/0006 |
| | | | | 204/194 |
| 2014/0190899 | A1 | 7/2014 | Shnell | |

OTHER PUBLICATIONS

Written Opinion for related International Application No. PCT/AU2022/050082; action dated Aug. 18, 2022; (4 pages).

* cited by examiner

LEGEND

- ................ COMPRESSED AIR
- — · · — · · CIRCUIT 1
- — · — · — CIRCUIT 2
- — — — AIR IN
- ———— WATER
- — — — HYDROGEN
- ———— SALT WATER BRINE

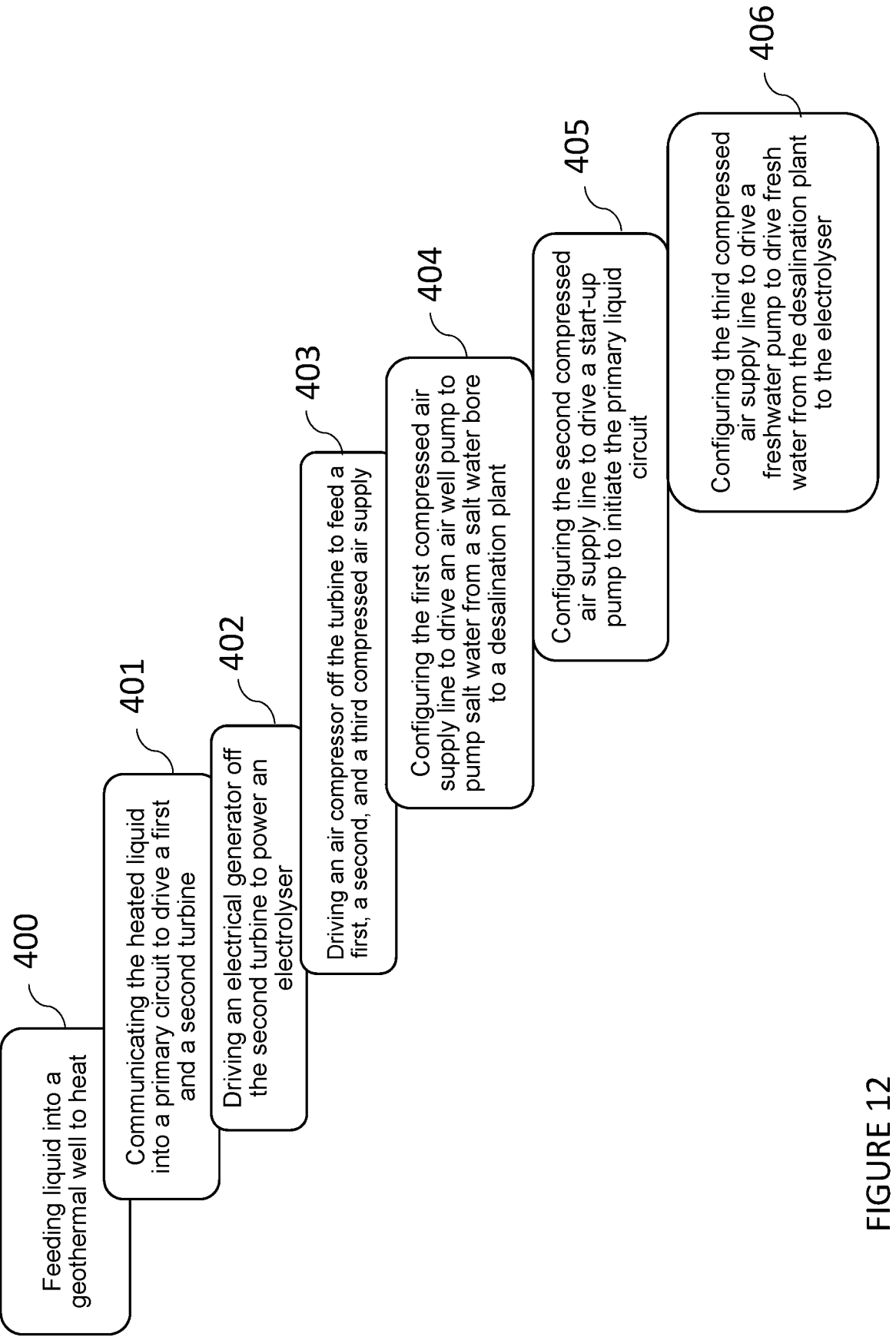

400

Feeding liquid into a geothermal well to heat

401

Communicating the heated liquid into a primary circuit to drive a first and a second turbine

402

Driving an electrical generator off the second turbine to power an electrolyser

403

Driving an air compressor off the turbine to feed a first, a second, and a third compressed air supply

404

Configuring the first compressed air supply line to drive an air well pump to pump salt water from a salt water bore to a desalination plant

405

Configuring the second compressed air supply line to drive a start-up pump to initiate the primary liquid circuit

406

Configuring the third compressed air supply line to drive a freshwater pump to drive fresh water from the desalination plant to the electrolyser

FIGURE 12

GEOTHERMAL HYDROGEN PRODUCTION SYSTEM

CROSS-REFERENCE TO RELATED APPLICATIONS

This application is the National Stage filing under 35 U.S.C. 371 of International Application No. PCT/AU2022/050082, filed on Feb. 9, 2022, which claims the benefit of earlier filing date and right of priority to Australian Application No. 2021100825 filed on Feb. 10, 2021, Australian Application No. 2021100827 filed on Feb. 10, 2021, Australian Application No. 2021900321 filed on Feb. 10, 2021, Australian Application No. 2021900322 filed on Feb. 10, 2021, Australian Application No. 2021103623 filed on Jun. 25, 2021, Australian Application No. 2021901941 filed on Jun. 25, 2021, and Australian Application No. 2021903799 filed on Nov. 25, 2021 the contents of which are all hereby incorporated by reference herein in their entirety.

FIELD

The disclosure is directed to a geothermal hydrogen production system. The system can be driven directly from a geothermal well or indirectly driven from a geothermal well using a binary heating circuit. The disclosure also relates to a combined geothermal hydrogen production and compression system. The disclosure is also directed to a geothermal ammonia production system.

BACKGROUND

Australia is getting hotter and drier and as a result fresh water is getting scarce. Additionally, people are becoming more environmentally aware and are seeking cleaner and greener products.

While solar and wind energy have low emissions, they cannot presently deliver affordable baseload electricity. In contrast, geothermal power can provide limitless, zero-emission, baseload energy but drilling costs have historically made it expensive to do so, and restricted its use to locations where high temperatures are at shallow depth.

People typically link geothermal power to countries such as New Zealand, Indonesia and the Philippines which are geologically active and where drilling to 2000 metres or less is sufficient to provide access to the high temperatures required to produce usable energy. However, it would be desirable to drawn on geothermal energy to produce fresh-water and renewable electricity anywhere in the world.

Previous attempts at large scale geothermal in Australia were thwarted by high drilling costs and both technological and environmental problems using conventional oil and gas drilling techniques. However, the ability to harness deep thermal heat and to utilise this energy to provide low-cost desalination, heating, cooling or pumping, electricity generation and green hydrogen production, is highly desirable.

Zero-emission electricity and water can be used to produce 'green' hydrogen, at lower costs than solar/battery produced green hydrogen. The process of desalination of salt water can produce valuable by-products like high quality salt, potash and other minerals, while green hydrogen can provide a desirable liquid fuel and a potential clean energy storage solution for the future.

Typical water delivery schemes are produced and delivered using fossil fuels to generate electricity which in turn produces a large carbon footprint. However, any hydrogen product produced with water containing a carbon foot-print cannot be called "green" hydrogen.

Once produced and stored, green hydrogen can be used to power fuel cell hydrogen electric cars and other heavy vehicles such as ships, trains and planes. Hydrogen can also provide energy to turbines and factories and can also be used directly in the home for cooking and heating as a replacement for natural gas. In the present drive to decarbonize, green hydrogen provides a possible low-carbon fuel alternative to replace the fossil fuels our society currently relies upon.

Ammonia (NH3) is an important product for food production being used to produce fertiliser to feed the population. Present methods of ammonia production involve separating nitrogen from the air using fossil fuel driven systems and combining this nitrogen gas with hydrogen: typically derived from gas or coal. This process, while functional, is dirty and adds to the world's carbon dioxide (CO2) emissions.

The present disclosure was conceived with these shortcomings in mind.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

SUMMARY

The disclosure is broadly direct to a system or plant for producing fresh water and electricity, and using the zero emission electricity and fresh water to feed an electrolyser to therein disassociate the fresh water into its constituent parts, oxygen and hydrogen. Both the fresh-water production and the electricity generation to supply the electrolyser are powered from geothermal energy either directly or indirectly. The geothermal energy is drawn from one, or a plurality, of geothermal wells the output of which is highly controllable based on the fluid input to the well head/s. Furthermore, the pumps required to feed and drive the communication of fluids between the stages of the system are also driven from geothermal energy, thereby avoiding supplementary electrical input from non-renewable sources.

The disclosure facilitates the production of green Hydrogen, produced without emissions and at a relatively low cost compared to known methods. The disclosure using geothermally produced electricity and zero emission distilled water which supplies the hydrogen electrolyser to be disassociated into oxygen and hydrogen. As both the electricity and the water produced by the above system do not produce emissions, the resulting hydrogen can be truly labelled "green".

The geothermal hydrogen production system of the disclosure can produce 24-hour, round the clock hydrogen, without the use of batteries or electricity transmission. This will meet base load requirements providing constant renewable thermal energy, electricity and water delivery for maximum hydrogen production.

It is anticipated, that the system described herein is capable of producing between 40-100 Kg of hydrogen per hour, from each geothermal well. As such the system can be scaled to the required output for the Australian and export markets on the basis that one Hectare of land can accommodate up to 10,000 tonne of green hydrogen production per year. This is to be contrasted with alternative energy sources like solar which require considerably more land, for example in a single Hectare of solar energy panels could produce just 87 tonne of hydrogen per year.

Additional benefits to the system described herein is the capital expenditure required to install and maintain such a system, which is significantly lower than that of solar or battery powered hydrogen production plants.

The system described herein requires no fossil fuel, solar or wind generated electricity, no transmission of electricity, no clearing of trees for transmission lines, and no emissions or toxic waste.

The output of the system can be easily varied and is fully flexible based on well output between 0%-100% of pumping volumes achieved by remotely varying the fluid flow at the well head.

Additional saving are made on maintenance and running costs, as once drilled and installed, a single geothermal well can produce thermal energy at very low cost for hundreds of years.

Currently the Australian government has set a 2030 target of $9.10 per Kg for green hydrogen production. However, this production cost estimate does not include the cost to deliver 30 to 40 litres of heated water for distillation and electrolysis to produce just 1 kg of hydrogen. Further solar or wind energy capacity and operational costs are required for the delivery of 9 litres of hot distilled water to the electrolyser and for the compression of hydrogen after it is produced. The present geothermal system is calculated to produce at around a quarter of this target price including the costs of delivering sea water, distilling sea water, delivering the distilled water and compressing the hydrogen. This opens opportunities for industries that currently consider hydrogen prices to exclude them from this technology, for example: transport; family cars; heavy transport industries; cooking and heating; and numerous export markets.

In one embodiment, there is provided a geothermal hydrogen production system, comprising; a primary liquid circuit circulating liquid into a geothermal well and returning heated liquid from a well head of the geothermal well, the primary liquid circuit passing through a desalination plant; a first turbine driven by the heated liquid to produce a first mechanical output; a second turbine driven by the heated liquid to produce a second mechanical output; a supply pump delivering salt water to the desalination plant; and a fresh water pump delivering fresh water from the desalination plant to the electrolyser, wherein the first mechanical output drives an electrical generator configured to power an electrolyser generating hydrogen via electrolysis of fresh water, and the second mechanical output drives a compressor to provide a compressed air supply.

Although not expressly repeated in reference to each embodiment of the disclosure described herein, it is understood that the following features are applicable to each embodiment of the disclosure described herein, whereby:

In some embodiments, the compressed air supply may drive the supply pump to supply salt water to the desalination plant.

In some embodiments, the compressed air supply may drive a start-up pump to initiate the primary liquid circuit.

In some embodiments, the compressed air supply may drive the fresh water pump to deliver fresh water from the desalination plant to the electrolyser.

In some embodiments, the compressed air supply may drive a circuit pump to circulate the working medium in the secondary circuit.

In some embodiments, the compressed air supply may drive a brine pump to pump brine from the desalination plant.

In some embodiments, the compressed air supply may drive a waste water pump to pump waste water from the electrolyser.

In some embodiments, any one or more of the supply pump, the start-up pump, the freshwater pump, the circuit pump, the brine pump and the waste water pump may be configured to be driven from electricity generated from the electrical generator In some embodiments, any one or more of the supply pump, the start-up pump, the freshwater pump, the circuit pump, the brine pump and the waste water pump may be configured to be driven from an external electricity supply. The external electricity supply may be drawn from an electrical power grid or generated from renewable energy sources: for example wind, solar, wave and tidal. Any one or more of the supply pump, the start-up pump, the freshwater pump, the circuit pump, the brine pump and the waste water pump may be configured to be driven directly from a renewable or grid supplied energy source or from a battery.

In a first aspect of the disclosure, there is provided a geothermal hydrogen production system, comprising; a primary liquid circuit circulating liquid into a geothermal well and returning heated liquid from a well head of the geothermal well, the primary liquid circuit passing through a desalination plant; a first turbine driven by the heated liquid to produce a first mechanical output; and a second turbine driven by the heated liquid to produce a second mechanical output, wherein the first mechanical output drives an electrical generator configured to power an electrolyser generating hydrogen via electrolysis of fresh water, and the second mechanical output drives a compressor to provide at least one of a first, a second and a third compressed air supply, wherein the first compressed air supply drives a supply pump to supply salt water to the desalination plant, the second compressed air supply drives a start-up pump to initiate the primary liquid circuit, and the third compressed air supply drives a fresh water pump to deliver fresh water from the desalination plant to the electrolyser. As the primary liquid passes through the desalination plant, the thermal energy therein is used to distil the salt water (or sea water) in the desalination plant before the liquid is re-injected into the geothermal well.

The use of waste thermal energy or exhausted thermal energy (after electricity has been generated) to provide the mechanical energy requirements instead of using electricity improves the efficiency of the system. It further improves the net electricity level available for sale or hydrogen production, and reduces the cost of green hydrogen production and compression.

In some embodiments, a portion of the electricity that is generated from geothermal energy can provide for the pumping and compressing of air and hydrogen, although this can reduce the net amount of electricity that is available for sale or for hydrogen production. This system as a whole is considered to be green, as the electricity is green that drives the additional mechanical requirements. With alternative energies like solar or wind, there is no choice as there is no thermal energy (heat) available to provide these additional requirements, this is one of the many reasons why solar and wind generated green hydrogen is so expensive (incurring the additional costs of water delivery, water treatment, water heating and hydrogen compression).

With the contemplated geothermal energy production system of the disclosure where some of the electricity is used for these pumping and compression requirements instead of using waste thermal energy, then the heat in the primary and secondary fluid circuits will have to be removed by alternative means. This could involve, for example coolers and/or condensers which would require additional electrical input to the system. Again, driving these additional components from the electricity generated will further reduce the net electricity available for sale or hydrogen production.

It is more efficient and cost effective to use the waste thermal energy of the system for desalination, pumping and/or compression of hydrogen. As such, the design serves two purposes: it provides for the required cooling and condensing of the primary and secondary circuits (which could use up to 40% of the electricity produced); and it provides for a higher net amount of electricity for sale or hydrogen production. By calculation, the result is green hydrogen production and/or compression costs of below AU$2.00 per kg by 2023. These costs could potentially be reduced to around AU$1.00 per kg by 2030, with improvements to the cost, performance and life of the electrolysers for hydrogen production.

The primary liquid passes through the desalination plant divesting thermal energy to distil the salt water in the desalination plant to produce fresh water and brine. In some embodiments the heated liquid may be sequentially fed to the first and then the second turbine before being introduced to the desalination plant.

In some embodiments the primary liquid in the primary liquid circuit may be water.

The liquid in the primary liquid circuit may be communicated to the desalination plant downstream of the first and second turbines before returning to the geothermal bore to be reheated. The heated liquid of the primary circuit may be expelled from the desalination plant in a cooled state to be communicated back to the well head of the geothermal well to be reheated.

Circulation of the primary liquid circuit once initiated by the start-up pump may be sustained by a thermal syphoning effect drawing liquid into the geothermal well at a first temperature as heated liquid is forced out of the well head at a second temperature, greater than the first temperature.

Thermal syphoning is a mode of passive heat exchange sustained by convection to circulate the liquid within the primary liquid circuit without the requirement for mechanical pumps. Once a heat transfer is initiated to a first part of the circuit, the change in heat will give rise to a change in density, urging the hotter, less dense liquid in one part of the circuit to rise, as cooler, denser liquid in the circuit sinks: using natural convection to draw the liquid around the circuit to and from the heat source.

In some embodiments, the first and second turbines may be connected in series, to allow the heated liquid to sequentially travel from the first to the second turbine.

In some embodiments a portion of the heated liquid may be subject to pressure change to produce steam to drive the turbine. The heated liquid may be subject to pressure change in a separator or flash separator. A portion of the liquid in the primary liquid circuit may be outputted from the separator or flash separator and mixed with liquid in the primary circuit exhausted from the turbine to increase the temperature of the liquid in the primary liquid circuit.

The residual fluid from each separator or flash separator may be reintroduced into the primary liquid circuit prior to being introduced to a subsequent turbine. A portion of the liquid in the primary liquid circuit may be outputted from the separator or flash separator and mixed with liquid in the primary circuit exhausted from the turbine to increase the temperature of the liquid in the primary liquid circuit.

The liquid in the primary liquid circuit is communicated to the desalination plant downstream of the turbine before returning to the geothermal bore to be reheated. In some embodiments, circulation of the primary liquid circuit once initiated by the start-up pump may be sustained by a thermal syphoning effect drawing liquid into the geothermal well at a first temperature as heated liquid is forced out of the well head at a second temperature, greater than the first temperature.

In some embodiments an air storage tank may be incorporated within at least one of the first, the second, and the third compressed air supplies, to store compressed air.

In some embodiments, the system may further comprise a second compressor driven by the second mechanical output from the second turbine and configured to compress the hydrogen generated by the electrolyser.

In some embodiments an air vacuum pump may be connected upstream of the air compressor, such that the air vacuum pump is driven by a flow of the ambient air drawn into the air compressor. A vacuum line may be connected to the vacuum pump, to drawn air from at least one chamber of the desalination plant.

The first compressed air supply may drive the supply pump located within a salt water bore. The supply pump may be an air pump. The compressed air forced from the supply pump may drive salt water from the salt water bore to an inlet in a first chamber of the desalination plant. The salt water may be sprayed into the first chamber of the desalination plant, heated by the flow of liquid from the primary liquid circuit passing therethrough. The fresh water from the desalination plant may be pumped directly to the electrolyser to be disassociated (decomposed) into oxygen and hydrogen.

The primary liquid circuit once initiated may be sustained by a thermal syphoning effect drawing liquid into the geothermal well at a first temperature as heated liquid is forced out of the well head at a second temperature, greater than the first temperature.

The supply pump and the start-up pump may be driven to initiate the liquid of the primary circuit and the working medium of the secondary circuit simultaneously. The start-up pump may be deactivated once the primary liquid circuit is moving.

In some embodiments, the system may further comprise a third turbine driven by the heated liquid of the primary liquid circuit to produce a third mechanical output, the third mechanical output being configured to drive a compressor to compress the hydrogen generated by the electrolyser.

The compressed hydrogen may be collected and stored at 1000 Bar to maximise the amount of hydrogen stored in any given cylinder capacity. At least one of the first, second and third turbines may be substituted for a screw expander, turbine, ORC turbine, engine, steam engine or water wheel.

In one embodiment, there is provided a geothermal hydrogen production system comprising a primary circuit and a secondary circuit, the primary liquid circuit circulating liquid into a geothermal well and returning heated liquid from a well head of the geothermal well, the heated liquid of the primary circuit being fed to a heat exchanger to heat a working medium of the secondary circuit, the heated working medium passing through a desalination plant, the heated working medium of the secondary circuit driving a first turbine to produce a first mechanical output and the heated liquid of the primary circuit driving a second turbine to produce a second mechanical output, wherein the first mechanical output drives an electrical generator configured to power an electrolyser generating hydrogen via electrolysis of fresh water, and the second mechanical output drives a compressor to provide a compressed air supply.

In a second aspect of the disclosure, there is provided a geothermal hydrogen production system using a secondary circuit, comprising: a primary liquid circuit circulating liquid into a geothermal well and returning heated liquid from a well head of the geothermal well; the heated liquid being fed to a heat exchanger to heat a working medium of a secondary circuit passing through a desalination plant, wherein the heated working medium of the secondary circuit drives a first turbine and a second turbine to produce a first mechanical output and a second mechanical output; and wherein the first mechanical output drives an electrical generator, configured to power an electrolyser generating hydrogen via electrolysis of fresh water, and the second mechanical output drives an air compressor to provide at least one of a first, a second and a third compressed air supply, wherein the first compressed air supply drives a supply pump to supply salt water to the desalination plant, the second compressed air supply drives a start-up pump to initiate the primary liquid circuit, and the third compressed air supply drives a fresh water pump to deliver fresh water from the desalination plant to the electrolyser.

In some embodiments, the system may further comprise a second compressor driven by the second mechanical output from the second turbine and configured to compress the hydrogen generated by the electrolyser. In some embodiments, a third turbine may be driven by either of: (i) the heated liquid of the primary liquid circuit; or (ii) the heated working medium of the secondary circuit, to produce a third mechanical output, wherein the third mechanical output is configured to drive a compressor to compress the hydrogen generated by the electrolyser.

As the working medium passes through the desalination plant, the thermal energy therein is used to distil the salt water (or sea water) in the desalination plant before the working medium is directed back to the heat exchanger to be reheated. The liquid in the primary liquid circuit may be water. In some embodiments, the supply pump may be an air pump. The working medium passes through the desalination plant divesting thermal energy to distil the salt water in the desalination plant to produce fresh water and brine.

In some embodiments, the air compressor may further provide a fourth compressed air supply to drive a circuit pump to circulate the working medium in the secondary circuit. The air compressor may further provide a fourth compressed air supply to drive a circuit pump to circulate the working medium in the secondary circuit.

In some embodiments there is provided a fifth compressed air supply configured to drive a salt brine pump to pump salt brine from the desalination plant. The liquid in the primary liquid circuit may be water. In some embodiments the working medium in the secondary circuit may be a binary fluid having a low-boiling point. The working medium may be N Pentane. The working medium in the secondary circuit may be communicated to the desalination plant before returning to the heat exchanger to be re-heated.

In some embodiments the primary liquid circuit once initiated may be sustained by a thermal syphoning effect drawing liquid into the geothermal well at a first temperature as heated liquid is forced out of the well head at a second temperature, greater than the first temperature. The supply pump and the start-up pump may be driven to initiate the liquid of the primary circuit and the working medium of the secondary circuit simultaneously. The start-up pump can be deactivated once the primary liquid circuit is moving as the thermal syphoning effect will provide a natural pumping action to maintain liquid movement in the primary circuit.

A storage tank may be incorporated within at least one of the first, second, third, fourth, and fifth compressed air supply, to store compressed air.

In some embodiments, an air vacuum pump may be connected to an intake of the air compressor, such that the air vacuum pump is driven by a flow of ambient air drawn through the vacuum pump into the air compressor. A vacuum line may be connected to the vacuum pump, to drawn air from at least one chamber of the desalination plant.

The first compressed air supply may drive the supply pump located within a salt water bore an ocean or a salt water dam. The supply pump may be an air pump. The compressed air forced from the supply pump may drive salt water from the salt water bore or ocean or salt water dam to an inlet in a first chamber of the desalination plant. The salt water may be sprayed into the first chamber of the desalination plant, heated by the flow of working medium in the secondary circuit passing therethrough.

Thermal heat drawn from the geothermal well is used to provide thermal heat energy to the desalination plant which will boil sea or salt water in a vacuum state inside of the MED desalination plant.

The disclosure uses a low enthalpy geothermal system to: (i) drive a desalination plant which delivers a sea or salt water supply from a salt water bore, the ocean or salt water storage dam or tank; (ii) drive a vacuum system required in the desalination plant, without the need for additional electricity; and (iii) supply freshwater to and power a hydrogen electrolyser.

The primary liquid circuit is sustained by a thermal syphoning effect, providing a flow of the primary fluid to a surface of a deep geothermal well. The primary liquid can be water or distilled water.

The thermal syphoning effect provides a flow of the primary liquid to the surface of a deep geothermal well. This effect occurs when liquid, or fresh water at a temperature of approximately 50° C. is drawn down an annulus of the geothermal well to be heated by the hot geology within the well. The thermal syphoning effect is responsible for pushing the heated water back to the surface of the well, where this delivery of thermal energy to the surface requires no energy input to maintain the thermal energy flow.

Typically, electricity is required to deliver sea or salt water to the MED or Reverse Osmosis (RO) desalination plant, the electricity being used to create a vacuum inside the chambers of the desalination plant where salt water is vaporised, and electricity is again used to pump the fresh water and the brine away from the MED plant.

The present disclosure utilises an air compressor driven by the thermal heat energy, to at least reduce (and in some cases eliminate) the requirement for additional electricity. This is achieved by using a screw expander, turbine or water wheel system that turns flow of the primary liquid (thermal energy from the fluid flow) into a mechanical output in the form of a rotary or piston force. This mechanical output can directly or indirectly drive an air compressor to power air pumps or alternatively can be used to drive a generator for electricity generation.

The air compressor utilises the suction side of the compressor (intake) to create a vacuum within the chambers of the MED plant, and the pressure side of the compressor (output) provides compressed air that it used to drive one or more air pumps. The one or more air pumps are used to deliver salt water to the MED plant, whether from a salt water bore (beach or inland), from a storage tank or dam, or from the ocean.

Additional pumps driven from the compressed air source can be used to start and/or assist in the circulation of the primary and/or secondary fluid circuit urging water through the geothermal well to harvest thermal energy to drive the circuit. In one embodiment, a secondary pump can be integrated into the primary liquid circuit to facilitate the start-up of the thermal syphoning effect. This pump may be an air pump or an air driven pump.

The use of air pumps provides advantages in that there are no moving parts that can corrode in salt water. This provides an advantage in reliability of the system and longevity of the system and reduces maintenance costs. It is also more energy efficient to directly drive an air compressor to create both a vacuum and to move salt water to and from the MED plant, than it is to use or generate electricity for these purposes.

In some embodiments, the system may further comprise a third turbine driven by the heated working medium of the secondary circuit to produce a third mechanical output, the third mechanical output being configured to drive a compressor to compress the hydrogen generated by the electrolyser. The compressed hydrogen may be collected and stored at 1000 Bar to maintain the hydrogen in liquid form. Any one of the first, second and third mechanical outputs may directly or indirectly drive a pump, a compressor or an electrical generator.

From a safety perspective, the present disclosure also provides advantages in reducing (and in some cases eliminating) the use of dangerous electricity in the environment of salt water.

The disclosure uses a screw expander, turbine, ORC turbine, engine, steam engine or water wheel that converts energy from the liquid in the primary liquid circuit (thermal energy from the flowing fluid) into a mechanical output in the form of a rotary or piston force. This mechanical output can directly or indirectly drive a pump, or a compressor or alternatively can be used to drive a generator for electricity generation.

The disclosure provides lower operating costs for water pumping, when compared to conventional pumps driven by electricity.

The geothermal hydrogen production systems of the present disclosure create zero emissions, as geothermal energy is used to provide all energy and pumping requirements. Thermal Syphoning provides thermal energy with no well pumping required once the primary fluid circuit is running, providing low-cost renewable energy.

It is calculated that 100 to 500 horsepower of pumping energy could be obtained from one single geothermal well, and this energy source is almost constant as opposed to solar or wind energy which can fluctuate greatly depending on the time of day and the time of the year.

Additional comparisons with both wind and solar power shows geothermal energy to have a very small physical footprint, thus leaving surrounding land untouched, and available for alternative use. Additionally, this greatly reduces the environmental impact of the geothermal hydrogen production system as there is no requirement for power lines, clearing of trees, no emissions and no toxic waste produced and the land above and around the geothermal bore can be rehabilitated after installation. Geothermal desalination and pumping is also resistant to weather events and bush fire risk.

The present disclosure provides additional advantages in that there is minimal well or pump maintenance required, no power line maintenance or power losses through long distance transmission, and no solar panels to dust. The use of steam engines and steam expanders has a long life and a track record for proven reliability, known examples operating for up to 100 years.

Once drilled and installed a single geothermal well will produce for hundreds of years while the well head flow can be controlled remotely to adjust the pumping volumes achieved.

The above advantages provide for significant reductions in typical desalination and pumping costs and significant reductions in $CO_2$ emissions.

Geothermal desalination and pumping systems, driven from single well geothermal energy systems using the thermal syphoning effect, do not produce the plastic waste that is normally generated by RO desalination plants. Additionally, these geothermal energy systems do not produce $CO_2$ emissions, do not produce toxic waste from the regular disposal of solar panels and wind turbine blades, do not require additional electricity generation and transmission, and have much lower negative impacts on the environment. It is calculated that a geothermal desalination and pumping system could produce fresh water up to 8 times cheaper than an RO desalination system whether driven from fossil fuel or electricity generated from solar, wind, or battery fed systems.

In some embodiments, the air compressor may provide a third compressed air supply configured to pump salt brine from the desalination plant. The liquid in the primary liquid circuit may be water.

In some embodiments, a portion of the heated liquid may be subject to pressure change to produce vapour to drive the first turbine and the second turbine. The heated liquid may be subject to pressure change in a separator or flash separator.

In some embodiments, a portion of the liquid in the primary liquid circuit may be outputted from a first flash separator and mixed with liquid in the primary circuit exhausted from the first turbine to increase the temperature of the liquid in the primary liquid circuit. In some embodiments, a portion of the liquid in the primary liquid circuit may be outputted from a second flash separator and mixed with liquid in the primary circuit exhausted from the second turbine to increase the temperature of the liquid in the primary liquid circuit.

The liquid in the primary liquid circuit may be communicated to the desalination plant downstream of each of the first and second turbines before returning to the geothermal bore to be reheated.

In some embodiments, circulation of the primary liquid circuit once initiated by the start-up pump may be sustained by a thermal syphoning effect drawing liquid into the geothermal well at a first temperature as heated liquid is forced out of the well head at a second temperature, greater than the first temperature.

An air storage tank may be incorporated within at least one of the first, second and the third compressed air supply, to store compressed air.

In some embodiments, an air vacuum pump may be connected to an intake of the air compressor, such that the air vacuum pump is driven by a flow of ambient air drawn through the vacuum pump into the air compressor. A vacuum line may be connected to the vacuum pump, to drawn air from at least one chamber of the desalination plant.

The first compressed air supply may drive the supply pump located within a salt water bore, or the ocean or a salt water storage tank of dam. The supply pump may be an air pump.

In some embodiments, the compressed air forced from the supply pump may drive salt water from the salt water bore, or ocean or storage tank or dam to an inlet in a first chamber of the desalination plant. The salt water may be sprayed into the first chamber of the desalination plant, heated by the flow of liquid from the primary liquid circuit passing therethrough.

In some embodiments, at least one of the first turbine and the second turbine may be exchanged for a steam engine or a screw expander.

In some embodiments there is additionally provided a third compressed air supply configured to drive a brine pump to deliver salt brine away from the desalination plant.

The geothermal desalination and pumping system of the disclosure provides all of the advantages set-out above in relation to the geothermal hydrogen production system, including zero emissions, reduced installation costs and maintenance costs, long usable life-span, comparatively small physical footprint (as compared to wind or solar), no toxic waste, and a reliable, steady long term energy supply.

In some embodiments, a fourth compressed air supply is provided to drive a circuit pump to circulate the working medium in the secondary circuit.

In some embodiments, a fifth compressed air supply may be produced from the air compressor, the fifth compressed air supply configured to drive an air pump to pump salt brine away from the desalination plant.

In some embodiments, driving the turbine may be directly off the heated liquid of the primary liquid circuit. In some embodiments, driving the turbine may be off a secondary circuit in which heat from the heated liquid of the primary liquid circuit provides heat to a working medium of a secondary circuit to drive the turbine. Effecting heat transfer between the primary and the secondary circuits of some embodiments may be via a heat exchanger.

In some embodiments, drawing ambient air through the air compressor may be via an air vacuum pump. Drawing air from at least one chamber of the desalination plant may create a vacuum therein via a vacuum line off the vacuum pump.

In some embodiments, the turbine may be substituted for one of a screw expander, a steam engine, and an ORC turbine. In some embodiments, the turbine may comprise a series of turbines. In some embodiments, the air compressor may be a screw compressor or a piston compressor. The method may additionally provide a third compressed air supply configured to drive a brine pump to deliver salt brine away from the desalination plant. The saltwater bore can further be substituted for the ocean or a salt water da, to provide a source of salt water to be delivered to the desalination plant.

In one embodiment, there is provided a geothermal hydrogen production system comprising a primary circuit and a secondary circuit, the primary liquid circuit circulating liquid into a geothermal well and returning heated liquid from a well head of the geothermal well, the heated liquid passing through a desalination plant within the primary liquid circuit, the heated liquid of the primary circuit passing a heat exchanger to heat a working medium of the secondary circuit, wherein the heated working medium of the secondary circuit drives a first turbine to produce a first mechanical output and the heated liquid of the primary circuit drives a second turbine to produce a second mechanical output;

wherein the first mechanical output drives an electrical generator configured to power an electrolyser generating hydrogen via electrolysis of fresh water, and the second mechanical output drives a compressor to provide a compressed air supply.

In a third aspect, the disclosure provides a geothermal hydrogen production system comprising a primary circuit and a secondary circuit, the primary liquid circuit circulating liquid into a geothermal well and returning heated liquid from a well head of the geothermal well, the heated liquid passing through a desalination plant within the primary liquid circuit, the heated liquid of the primary circuit passing a heat exchanger to heat a working medium of the secondary circuit, wherein the heated working medium of the secondary circuit drives a first turbine to produce a first mechanical output and the heated liquid of the primary circuit drives a second turbine to produce a second mechanical output; wherein the first mechanical output drives an electrical generator configured to power an electrolyser generating hydrogen via electrolysis of fresh water, and the second mechanical output drives a compressor to provide at least one of a first, a second and a third compressed air supply, wherein the first compressed air supply drives a supply pump to supply salt water to the desalination plant, the second compressed air supply drives a start-up pump to initiate the primary liquid circuit, and the third compressed air supply drives a fresh water pump to deliver fresh water from the desalination plant to the electrolyser.

In some embodiments, the system may further comprise a second compressor driven by the second mechanical output from the second turbine and configured to compress the hydrogen generated by the electrolyser. In some embodiments the system may further comprise a third turbine driven by either of: (i) the heated liquid of the primary liquid circuit; or (ii) the heated working medium of the secondary circuit, to produce a third mechanical output, wherein the third mechanical output is configured to drive a compressor to compress the hydrogen generated by the electrolyser.

In a further embodiment, there is provided a geothermal hydrogen production system comprising a primary circuit and a secondary circuit, the primary liquid circuit circulating liquid into a geothermal well and returning heated liquid from a well head of the geothermal well, the heated liquid being fed to a heat exchanger to heat a working medium of the secondary circuit, before passing through a desalination plant, wherein the heated working medium of the secondary circuit drives a first turbine to produce a first mechanical output and the heated liquid of the primary circuit drives a second turbine to produce a second mechanical output; and wherein the first mechanical output drives an electrical generator configured to power an electrolyser generating hydrogen via electrolysis of fresh water, and the second mechanical output drives an air compressor to provide a compressed air supply.

In a further embodiment, there is provided a geothermal hydrogen production system comprising a primary circuit and a secondary circuit, the primary liquid circuit circulating liquid into a geothermal well and returning heated liquid from a well head of the geothermal well, the heated liquid being fed to a heat exchanger to heat a working medium of the secondary circuit, before passing through a desalination plant, wherein the heated working medium of the secondary circuit drives a first turbine to produce a first mechanical output and the heated liquid of the primary circuit drives a second turbine to produce a second mechanical output; and wherein the first mechanical output drives an electrical generator configured to power an electrolyser generating hydrogen via electrolysis of fresh water, and the second mechanical output drives an air compressor to provide a first, a second and a third compressed air supply, wherein the first compressed air supply drives a supply pump to supply salt water to the desalination plant, the second compressed air supply drives a start-up pump to initiate the primary liquid circuit, and the third compressed air supply drives a fresh water pump to deliver fresh water from the desalination plant to the electrolyser. As the working medium passes through the desalination plant, the thermal energy therein is used to distil the salt water (or sea water) in the desalination plant before the working medium is directed back to the heat exchanger to be reheated.

In some embodiments the secondary circuit may comprise a fresh water condenser configured to draw heat from the secondary circuit to heat the fresh water from the desalination plant before being delivered to the electrolyser. The secondary circuit may comprise a salt water condenser configured to draw heat from the secondary circuit to heat the salt water prior to supplying the desalination plant.

In one embodiment, there is provided a geothermal hydrogen production and compression system comprising a primary circuit and a secondary circuit, the primary liquid circuit circulating liquid into a geothermal well and returning heated liquid from a well head of the geothermal well, the heated liquid passing through a desalination plant within the primary liquid circuit the heated liquid of the primary circuit passing a heat exchanger to heat a working medium of the secondary circuit, wherein the heated working medium of the secondary circuit drives a first turbine to produce a first mechanical output and the heated liquid of the primary circuit drives a second turbine to produce a second mechanical output; the first mechanical output drives an electrical generator, configured to power an electrolyser generating hydrogen via electrolysis of fresh water, and the second mechanical output drives a first and a second compressor, the first compressor configured to compress air and the second compressor configured to compress hydrogen, wherein the first air compressor provides a compressed air supply.

In one embodiment, there is provided a geothermal hydrogen production and compression system comprising a primary circuit and a secondary circuit, the primary liquid circuit circulating liquid into a geothermal well and returning heated liquid from a well head of the geothermal well, the heated liquid passing through a desalination plant within the primary liquid circuit the heated liquid of the primary circuit passing a heat exchanger to heat a working medium of the secondary circuit, wherein the heated working medium of the secondary circuit drives a first turbine to produce a first mechanical output and the heated liquid of the primary circuit drives a second turbine to produce a second mechanical output; the first mechanical output drives an electrical generator, configured to power an electrolyser generating hydrogen via electrolysis of fresh water, and the second mechanical output drives a first and a second compressor, the first compressor configured to compress air and the second compressor configured to compress hydrogen, wherein the first air compressor provides a first, a second and a third compressed air supply, the first compressed air supply driving a supply pump to supply salt water to the desalination plant, the second compressed air supply driving a start-up pump to initiate the primary liquid circuit, and the third compressed air supply driving a fresh water pump to deliver fresh water from the desalination plant to the electrolyser.

In some embodiments, the secondary circuit may further comprise a fresh water condenser configured to draw heat from the secondary circuit to heat the fresh water from the desalination plant before being delivered to the electrolyser. The secondary circuit may further comprise a salt water condenser configured to draw heat from the secondary circuit to heat the salt water prior to supplying the desalination plant.

As the primary liquid passes through the desalination plant, the thermal energy therein is used to distil the salt water (or sea water) in the desalination plant before the liquid is re-injected into the geothermal well.

In a further embodiment, there is provided a geothermal hydrogen production and compression system comprising a primary circuit and a secondary circuit, the primary liquid circuit circulating liquid into a geothermal well and returning heated liquid from a well head of the geothermal well, the heated liquid of the primary circuit being fed to a heat exchanger to heat a working medium of the secondary circuit, the heated working medium passing through a desalination plant, wherein the heated working medium of the secondary circuit drives a first turbine to produce a first mechanical output and the heated liquid of the primary circuit drives a second turbine to produce a second mechanical output; the first mechanical output drives an electrical generator, configured to power an electrolyser generating hydrogen via electrolysis of fresh water, and the second mechanical output drives a first compressor and a second compressor, the first compressor configured to compress air and the second compressor configured to compress hydrogen.

In a further embodiment, there is provided a geothermal hydrogen production and compression system comprising a primary circuit and a secondary circuit, the primary liquid circuit circulating liquid into a geothermal well and returning heated liquid from a well head of the geothermal well, the heated liquid of the primary circuit being fed to a heat exchanger to heat a working medium of the secondary circuit, the heated working medium passing through a desalination plant, wherein the heated working medium of the secondary circuit drives a first turbine to produce a first mechanical output and the heated liquid of the primary circuit drives a second turbine to produce a second mechanical output; the first mechanical output drives an electrical generator, configured to power an electrolyser generating hydrogen via electrolysis of fresh water, and the second mechanical output drives a first compressor and a second compressor, the first compressor configured to compress air and the second compressor configured to compress hydrogen, wherein the first compressor supplies a first, a second and a third compressed air supply, the first compressed air supply driving a supply pump to supply salt water to the desalination plant, the second compressed air supply driving a start-up pump to initiate the primary liquid circuit, and the third compressed air supply driving a fresh water pump to deliver fresh water from the desalination plant to the electrolyser.

As the working medium passes through the desalination plant, the thermal energy therein is used to distil the salt water (or sea water) in the desalination plant before the working medium is directed back to the heat exchanger to be reheated.

In some embodiments the secondary circuit may comprise a fresh water condenser configured to draw heat from the secondary circuit to heat the fresh water from the desalination plant before being delivered to the electrolyser. The secondary circuit may comprise a salt water condenser configured to draw heat from the secondary circuit to heat the salt water prior to supplying the desalination plant.

In a still further embodiment, there is provided a method of generating and feeding fresh water to an electrolyser to produce hydrogen, powered by geothermal energy and driven by compressed air, comprising the steps: feeding liquid into a geothermal well and drawing heated liquid from the well head of the geothermal well to form a primary liquid circuit, the primary liquid conveying heat energy to a desalination plant; communicating the heated liquid from the primary liquid circuit to a first turbine and a second turbine to produce a first mechanical output and a second mechanical output respectively; directing the first mechanical output to an electrical generator to power an electrolyser configured to generate hydrogen via electrolysis of fresh water, and directing the second mechanical output to a compressor to produce a compressed air supply.

In some embodiment, the compressed air supply may be directed to drive any one of more of: a supply pump configured to drive salt water to the desalination plant; a start-up pump to initiate the primary liquid circuit; a fresh water pump to pump fresh water from the desalination plant to the electrolyser to be decomposed into hydrogen and oxygen; a circuit pump to circulate the working medium in the secondary circuit; a brine pump to pump brine from the desalination plant; and a waste water pump to pump waste water from the electrolyser. The liquid in the primary liquid circuit may be water or distilled water.

In a fourth aspect, the disclosure provides a method of generating and feeding fresh water to an electrolyser to produce hydrogen, powered by geothermal energy, comprising the steps: feeding a liquid into a geothermal well and drawing heated liquid from the well head of the geothermal well to form a primary liquid circuit, the primary liquid conveying heat energy to a desalination plant; communicating the heated liquid from the primary liquid circuit to a first turbine and a second turbine to produce a first mechanical output and a second mechanical output respectively; directing the first mechanical output to an electrical generator to power an electrolyser configured to generate hydrogen via electrolysis of fresh water, and directing the second mechanical output to a compressor to produce at least one of a first, a second and a third compressed air supply, wherein the first compressed air supply drives a supply pump configured to drive salt water to the desalination plant, the second compressed air supply drives a start-up pump to initiate the primary liquid circuit, and the third compressed air supply drives a fresh water pump to pump fresh water from the desalination plant to the electrolyser to be decomposed into hydrogen and oxygen.

In some embodiments, the method may comprise the step of driving the turbine directly off the heated liquid of the primary liquid circuit.

The method may further comprise the step of: driving a second compressor from the second mechanical output of the second turbine, the second compressor configured to compress the hydrogen generated by the electrolyser. The method may further comprise the step of communicating the heated liquid from the primary liquid circuit to a third turbine to produce a third mechanical output, and directing the third mechanical output to a second compressor configured to compress the hydrogen produced by the electrolyser.

The method may comprise the step of driving at least one of the first and second turbines off a secondary circuit in which heat from the heated liquid of the primary liquid circuit provides heat to a working medium of a secondary circuit to drive the turbine. Heat transfer between the primary and the secondary circuits of some embodiments may be effected via a heat exchanger.

In some embodiments, the method may comprise the step of drawing ambient air through the air compressor may via an air vacuum pump. The method may comprise the step of drawing air from at least one chamber of the desalination plant to create a vacuum therein via a vacuum line off the vacuum pump. The method may comprise the step of substituting at least one of the first and the second turbines for any one of a screw expander, a steam engine, and an ORC turbine.

The method may comprise the step of further communicating the heated liquid or heated working medium to a third turbine to produce a third mechanical output to power a compressor. At least one of the first, second, and third turbines may comprise a series of turbines. The air compressor may be a screw compressor or a piston compressor. In some embodiments, the saltwater bore may be substituted for the ocean or a salt water dam, to provide a source of salt water to be delivered to the desalination plant.

In a fifth aspect, the disclosure provide a method of generating and feeding fresh water to an electrolyser to produce hydrogen, powered by geothermal energy, comprising the steps: feeding a liquid into a geothermal well and drawing heated liquid from the well head of the geothermal well, the heated liquid of the primary circuit being fed to a heat exchanger to heat a working medium of the secondary circuit, the heated working medium passing through a desalination plant, wherein the heated working medium of the secondary circuit drives a first turbine and a second turbine to produce a first mechanical output and a second mechanical output respectively; directing the first mechanical output to an electrical generator to power an electrolyser configured to generate hydrogen via electrolysis of fresh water, and directing the second mechanical output to a first compressor to produce at least one of a first, a second and a third compressed air supply, wherein the first compressed air supply is configured to drive a supply pump to drive salt water to the desalination plant, the second compressed air supply drives a start-up pump to initiate the primary liquid circuit, and the third compressed air supply drives a fresh water pump to pump fresh water from the desalination plant to the electrolyser to be decomposed into hydrogen and oxygen.

In a further aspect, the disclosure provides a method of generating and feeding fresh water to an electrolyser to produce hydrogen, powered by geothermal energy, comprising the steps: feeding liquid into a geothermal well and drawing heated liquid from the well head of the geothermal well to form a primary liquid circuit, the primary liquid conveying heat energy to a desalination plant; feeding the heated liquid of the primary circuit to a heat exchanger to heat a working medium of a secondary circuit, wherein the heated working medium of the secondary circuit drives a first turbine to produce a first mechanical output and the heated liquid of the primary liquid circuit drives a second turbine to produce a second mechanical output respectively; directing the first mechanical output to an electrical generator to power an electrolyser configured to generate hydrogen via electrolysis of fresh water, and directing the second mechanical output to a compressor to produce at least one of a first, a second and a third compressed air supply, wherein the first compressed air supply is configured to drive a supply pump to drive salt water to the desalination plant, the second compressed air supply drives a start-up pump to initiate the primary liquid circuit, and the third compressed air supply drives a fresh water pump to pump fresh water from the desalination plant to the electrolyser to be decomposed into hydrogen and oxygen.

The method may further comprise the step of: driving a second compressor from the second mechanical output of the second turbine, the second compressor configured to compress the hydrogen generated by the electrolyser. The method may further comprise the step of communicating the heated liquid from the primary liquid circuit to a third turbine to produce a third mechanical output, and directing the third mechanical output to a second compressor configured to compress the hydrogen produced by the electrolyser.

The method may comprise the step of driving at least one of the first and second turbines off a secondary circuit in which heat from the heated liquid of the primary liquid circuit provides heat to a working medium of a secondary circuit to drive the turbine. Heat transfer between the primary and the secondary circuits of some embodiments may be effected via a heat exchanger.

In some embodiments, the method may comprise the step of drawing ambient air through the air compressor may via an air vacuum pump. The method may comprise the step of drawing air from at least one chamber of the desalination plant to create a vacuum therein via a vacuum line off the vacuum pump. The method may comprise the step of substituting at least one of the first and the second turbines for any one of a screw expander, a steam engine, and an ORC turbine.

The method may comprise the step of further communicating the heated liquid or heated working medium to a third turbine to produce a third mechanical output to power a compressor. At least one of the first, second, and third turbines may comprise a series of turbines. The air compressor may be a screw compressor or a piston compressor. In some embodiments, the saltwater bore may be substituted for the ocean or a salt water dam, to provide a source of salt water to be delivered to the desalination plant.

The method may further comprise the step of: driving a second compressor from the second mechanical output of the second turbine, the second compressor configured to compress the hydrogen generated by the electrolyser. The method may further comprising the step of: communicating the heated liquid from the primary liquid circuit to a third turbine to produce a third mechanical output, and directing the third mechanical output to a second compressor configured to compress the hydrogen produced by the electrolyser.

In some embodiments, the method may further comprise the step of: drawing heat from the working medium of the secondary circuit via a fresh water condenser to heat the fresh water from the desalination plant before delivering the fresh water to the electrolyser; or drawing heat from the working medium of the secondary circuit via a salt water condenser to heat the salt water before delivering the salt water to the desalination plant.

The working medium in the secondary circuit may be a binary fluid having a low-boiling point. The working medium may be N-Pentane.

On some embodiments, the method may further comprise the step of powering at least one of the supply pump, the start-up pump and the fresh water pump from the electrical generator.

In some embodiment, the method may further comprising the step of pumping saltwater from a saltwater source using the air-driven supply pump, to deliver salt water to the desalination plant.

In some embodiments there is provided a geothermal ammonia production system, comprising; a primary liquid circuit circulating a liquid into a geothermal well and returning heated liquid from a well head of the geothermal well, the primary liquid circuit passing through a desalination plant; a first, and a second turbine driven by the heated liquid to produce a first and a second mechanical output; wherein the first mechanical output drives an electrical generator, configured to power (i) an electrolyser generating hydrogen via electrolysis of fresh water; and (ii) an ammonia production plant, and the second mechanical output drives an air compressor drawing ambient air through a nitrogen plant to separate nitrogen from the ambient air to feed the ammonia production plant, wherein any one of the first and second mechanical outputs is configured to drive at least one of a supply pump to supply salt water to the desalination plant and a freshwater pump to deliver fresh water from the desalination plant to the electrolyser.

In some embodiments, the compressed air supply may drive a start-up pump to initiate the primary liquid circuit.

In some embodiments, the compressed air supply may drive a circuit pump to circulate the working medium in the secondary circuit.

In some embodiments, the compressed air supply may drive a brine pump to pump brine from the desalination plant.

In some embodiments, the compressed air supply may drive a waste water pump to pump waste water from the electrolyser.

In some embodiments, any one or more of the supply pump, the start-up pump, the freshwater pump, the circuit pump, the brine pump and the waste water pump may be configured to be driven from electricity generated from the electrical generator In some embodiments, any one or more of the supply pump, the start-up pump, the freshwater pump, the circuit pump, the brine pump and the waste water pump may be configured to be driven from an external electricity supply. The external electricity supply may be drawn from an electrical power grid or generated from renewable energy sources: for example wind, solar, wave and tidal. Any one or more of the supply pump, the start-up pump, the freshwater pump, the circuit pump, the brine pump and the waste water pump may be configured to be driven directly from a renewable or grid supplied energy source or from a battery.

In some embodiments there is provided a geothermal ammonia production system, comprising; a primary liquid circuit circulating a liquid into a geothermal well and returning heated liquid from a well head of the geothermal well, the primary liquid circuit passing through a desalination plant; a first, a second, and a third turbine driven by the heated liquid to produce a first, a second and a third mechanical output; wherein the first mechanical output drives an electrical generator, configured to power (i) an electrolyser generating hydrogen via electrolysis of fresh water; and (ii) an ammonia production plant, the second mechanical output drives an air compressor drawing ambient air through a nitrogen plant to separate nitrogen from the ambient air to feed the ammonia production plant, the third mechanical output is configured to drive a compressor to compress the hydrogen generated by the electrolyser and feed the compressed hydrogen to the ammonia production plant; and wherein any one of the first, second and third mechanical outputs is configured to drive a supply pump to supply salt water to the desalination plant and drive a freshwater pump to deliver fresh water from the desalination plant to the electrolyser. The supply pump and the freshwater pump may be air-driven pumps driven from a compressed air supply from the air compressor.

Ammonia is used in food production to produce fertiliser. Present ammonia production involves separating Nitrogen from the air using fossil fuel energy sources and combining it with hydrogen using the Haber-Bosch Process (HBP) to form ammonia. Typically, the HBP is the main industrial procedure for the production of ammonia, used predominantly to produce fertilizer. The HBP converts atmospheric nitrogen (N2) to ammonia (NH3) by a reaction with hydrogen (H2) using a metal catalyst under high temperatures (400° C.-500° C.) and pressures (10 MPa+):

$$N_2+3H_2 \rightarrow 2NH_3$$

The conversion is conducted with steam using high-temperature and high-pressure inside a reformer which uses a nickel catalyst to thereby separate the carbon and hydrogen atoms. The catalyst is required because nitrogen (N2) is highly unreactive due to triple atomic bonds. As such, HBP requires catalysts to accelerate the breaking of the atomic bonds. Typically, the HBP uses heterogeneous or solid catalysts to interact with gaseous reagents. Typical catalysts are ferrite based with an iron oxide carrier.

Aside from its renowned fertilizing properties ammonia is also an excellent energy carrier with an energy density greater than that of hydrogen. When in liquid form, at ambient temperature, ammonia has an energy density of about 3 kWh/litre and if chilled to negative 35° C., this can be increased to almost 4 kWh/litre.

In addition to its energy density, ammonia is easier and cheaper to store and transport and can take advantage of existing global infrastructure already in place for transporting products such as propane. Because of its high energy density, ammonia can be used to store energy which presents a huge opportunity for the collection and storage of energy derived from renewable sources.

While ammonia carries some risks, being toxic, the risk is not dissimilar to other gases, for example, methane or methanol. However, unlike many toxins, ammonia dissipates quickly and begins self-neutralizing when spilled. As such, ammonia does not accumulate in the ground and can be taken-up by plants and bacteria facilitating nitrification.

Additionally, ammonia can be liquefied at about 7.5 bar, at ambient temperatures, similar to propane and butane, providing further advantages over known products (like liquefied natural gas (LNG) which requires cryogenic storage) providing zero emission alternatives to the shipping industry.

In some embodiments, any one of the first second and third mechanical outputs may be additionally configured to drive a start-up pump to initiate the primary liquid circuit.

The air compressor driven by the second mechanical output may be configured to provide a first, a second and a third compressed air supply, wherein the first compressed air supply drives the supply pump to supply salt water to the desalination plant, the second compressed air supply drives the start-up pump to initiate the primary liquid circuit, and the third compressed air supply drives the fresh water pump to deliver fresh water from the desalination plant to the electrolyser.

In some embodiments, a power output from the electrical generator is configured to drive: the supply pump to supply salt water to the desalination plant; the start-up pump to initiate the primary liquid circuit; and the fresh water pump to deliver fresh water from the desalination plant to the electrolyser.

The air compressor driven by the second mechanical output may be configured to provide at least one of a first, a second and a third compressed air supply, wherein the first compressed air supply drives the supply pump to supply salt water to the desalination plant, the second compressed air supply drives the start-up pump to initiate the primary liquid circuit, and the third compressed air supply drives the fresh water pump to deliver fresh water from the desalination plant to the electrolyser.

A power output from the electrical generator may be configured to drive at least one of: the supply pump to supply salt water to the desalination plant; the start-up pump to initiate the primary liquid circuit; and the fresh water pump to deliver fresh water from the desalination plant to the electrolyser.

Any one of the first, second and third mechanical outputs may be additionally configured to drive an oxygen compressor to compress oxygen generated by the electrolyser. The oxygen compressor may be driven by the second mechanical output in a double turbine arrangement with the air compressor. The compressed hydrogen may be delivered to the ammonia production plant at temperatures of 300° C. and above. The compressed hydrogen may be delivered to the ammonia production plant at pressures of 20 bar and above.

In some embodiments, the supply of salt water to the desalination plant may be drawn through a cooler to cool the compressed hydrogen after compression. The heated liquid from the primary liquid circuit may be communicated to the ammonia production plant to supply thermal energy thereto. The heated liquid may be drawn from the primary liquid circuit prior to entering a first flash separator. Exhausted heated liquid from the ammonia production plant may be reintroduced to the primary liquid circuit after the first flash separator. The exhausted heated liquid from the ammonia production plant may be reintroduced to the primary liquid circuit after a second flash separator or a third flash separator.

In some embodiments there is provided a geothermal ammonia production system comprising a primary circuit and a secondary circuit, the primary liquid circuit circulating a liquid into a geothermal well and returning heated liquid from a well head of the geothermal well, the heated liquid passing through a desalination plant within the primary liquid circuit, the heated liquid of the primary circuit passing a heat exchanger to heat a working medium of the secondary circuit, wherein the heated working medium of the secondary circuit drives a first turbine to produce a first mechanical output and the heated liquid of the primary circuit drives a second turbine to produce a second mechanical output; the first mechanical output drives an electrical generator, configured to power (i) an electrolyser generating hydrogen via electrolysis of fresh water; and (ii) an ammonia production plant, and the second mechanical output drives a first air compressor and a second hydrogen compressor, the first compressor configured to draw ambient air through a nitrogen plant to separate nitrogen from the ambient air to feed the ammonia production plant, and the second compressor configured to compress the hydrogen generated by the electrolyser and feed the compressed hydrogen to the ammonia production plant, wherein any one of the first and the second mechanical outputs is configured to drive a supply pump to supply salt water to the desalination plant, and a fresh water pump to deliver fresh water from the desalination plant to the electrolyser.

In some embodiments there is provided a geothermal ammonia production system comprising a primary circuit and a secondary circuit, the primary liquid circuit circulating a liquid into a geothermal well and returning heated liquid from a well head of the geothermal well, the heated liquid of the primary circuit being fed to a heat exchanger to heat a working medium of the secondary circuit, the heated working medium passing through a desalination plant, wherein the heated working medium of the secondary circuit drives a first turbine to produce a first mechanical output and the heated liquid of the primary circuit drives a second turbine to produce a second mechanical output, the first mechanical output drives an electrical generator, configured to power: (i) an electrolyser generating hydrogen via electrolysis of fresh water; and (ii) an ammonia production plant, the second mechanical output drives an air compressor drawing ambient air through a nitrogen plant to separate nitrogen from the ambient air to feed the ammonia production plant, wherein any one of the first and second mechanical outputs is configured to drive a supply pump to supply salt water to the desalination plant and drive a freshwater pump to deliver fresh water from the desalination plant to the electrolyser.

In some embodiments, any one of the first and second mechanical outputs may be additionally configured to drive a start-up pump to initiate the primary liquid circuit. The air compressor driven by the second mechanical output may be configured to provide any one of more of a first, a second, a third, a fourth, a fifth, and a sixth compressed air supply, wherein the first compressed air supply drives the supply pump to supply salt water to the desalination plant, the second compressed air supply drives the start-up pump to initiate the primary liquid circuit, the third compressed air supply drives the fresh water pump to deliver fresh water from the desalination plant to the electrolyser, the fourth compressed air supply drives a circuit pump to circulate the working medium in the secondary circuit, the fifth compressed air supply drives a brine pump to pump brine from the desalination plant, and a sixth compressed air supply drives a waste water pump to pump waste water from the electrolyser.

A power output from the electrical generator may be configured to drive any one of more of: the supply pump to supply salt water to the desalination plant; the start-up pump to initiate the primary liquid circuit; the fresh water pump to deliver fresh water from the desalination plant to the electrolyser; the circuit pump to circulate the working medium in the secondary circuit, the brine pump to pump brine from the desalination plant, and, the waste water pump to pump waste water from the electrolyser. In some embodiments the supply pump, the start-up pump, the fresh water pump, the circuit pump, the brine pump and the waste water pump may be driven from an external power source, alternative energy source, or battery.

The air compressor driven by the second mechanical output may be configured to provide at least one of a first, a second and a third compressed air supply, wherein the first compressed air supply drives the supply pump to supply salt water to the desalination plant, the second compressed air supply drives the start-up pump to initiate the primary liquid circuit, and the third compressed air supply drives the fresh water pump to deliver fresh water from the desalination plant to the electrolyser.

In some embodiments, any one of the first mechanical output and the second mechanical outputs may be additionally configured to drive an oxygen compressor to compress oxygen generated by the electrolyser. The oxygen compressor may be driven by the second mechanical output in a double turbine arrangement with the air compressor. In some embodiments the second or the third mechanical output may be configured to drive a further compressor to compress the hydrogen drawn from the electrolyser before being fed to the ammonia production plant. The compressed hydrogen may be delivered to the ammonia production plant at temperatures of 300° C. and above. The compressed hydrogen may be delivered to the ammonia production plant at pressures of 20 bar and above.

In some embodiments, the supply of salt water to the desalination plant may be drawn through a cooler to cool the compressed hydrogen after compression. The heated liquid from the primary liquid circuit may be communicated to the ammonia production plant to supply thermal energy thereto.

In some embodiments, the heated liquid may be drawn from the primary liquid circuit prior to entering the heat exchanger. The exhausted heated liquid from the ammonia production plant may be reintroduced to the primary liquid circuit before entering the heat exchanger. The exhausted heated liquid from the ammonia production plant may be reintroduced to the primary liquid circuit immediately before entering the heat exchanger.

In some embodiments, the secondary circuit may comprise at least one of: a fresh water condenser configured to draw heat from the secondary circuit to heat the fresh water from the desalination plant before being delivered to the electrolyser; and a salt water condenser configured to draw heat from the secondary circuit to heat the salt water prior to supplying the desalination plant.

In some embodiments there is provided a method of generating and feeding fresh water to an electrolyser to produce ammonia, powered by geothermal energy, comprising the steps: feeding a liquid into a geothermal well and drawing heated liquid from the well head of the geothermal well to form a primary liquid circuit, the primary liquid conveying heat energy to a desalination plant; communicating the heated liquid from the primary liquid circuit to a first turbine, a second turbine and a third turbine to produce a first mechanical output, a second mechanical output and a third mechanical output respectively; directing the first mechanical output to an electrical generator to power: (i) an electrolyser generating hydrogen via electrolysis of fresh water; and (ii) an ammonia production plant; directing the second mechanical output to an air compressor to draw ambient air through a nitrogen plant to separate nitrogen from the ambient air to feed the ammonia production plant; directing the third mechanical output to a second compressor configured to compress the hydrogen produced by the electrolyser and feed the compressed hydrogen to the ammonia production plant; driving a supply pump to supply salt water to the desalination plant and driving a freshwater pump to deliver fresh water from the desalination plant to the electrolyser. Any one of more of the supply pump and the freshwater pump may be driven from any one of the first, second and third mechanical outputs.

In some embodiments the method may additionally comprise the step of driving a start-up pump to initiate the primary liquid circuit off any one of the first second and third mechanical outputs. The method may additionally comprise the step of providing a first, a second and a third compressed air supply from the air compressor, wherein the first compressed air supply drives the supply pump to supply salt water to the desalination plant, the second compressed air supply drives the start-up pump to initiate the primary liquid circuit, and the third compressed air supply drives the fresh water pump to deliver fresh water from the desalination plant to the electrolyser.

In some embodiments the method may additionally comprise the step of powering the supply pump to supply salt water to the desalination plant; the start-up pump to initiate the primary liquid circuit; and the fresh water pump to deliver fresh water from the desalination plant to the electrolyser from a power output from the electrical generator. the method may additionally comprise the step of providing at least one of a first, a second and a third compressed air supply from the air compressor, wherein the first compressed air supply drives the supply pump to supply salt water to the desalination plant, the second compressed air supply drives the start-up pump to initiate the primary liquid circuit, and the third compressed air supply drives the fresh water pump to deliver fresh water from the desalination plant to the electrolyser.

In some embodiments the method may additionally comprise the step of powering at least one of the supply pump to supply salt water to the desalination plant; the start-up pump to initiate the primary liquid circuit; and the fresh water pump to deliver fresh water from the desalination plant to the electrolyser from a power output from the electrical generator.

In some embodiments there is provided a geothermal ammonia production system comprising: a primary liquid circuit circulating liquid into a geothermal well and returning heated liquid from a well head of the geothermal well, the primary liquid circuit delivering thermal energy to a desalination plant; and a first and a second turbine driven by the heated liquid to produce a first mechanical output and a second mechanical output, wherein the first mechanical output drives an electrical generator, configured to power an electrolyser generating hydrogen via electrolysis of fresh water, and the second mechanical output drives a second electrical generator configured to provide electrical power to a power grid, and a cooling circuit in connection with a district cooling network, the cooling circuit comprising a chiller driven from residual thermal energy of the primary liquid circuit. In some embodiments, the heat transfer medium of the cooling circuit may be water or distilled water.

The first electrical generator may be a DC generator. In some embodiments of the system power from the DC generator can also be used to power pumps and compressors within the system. The second electrical generator may be an AC generator configured to feed additional electrical energy straight back into the local energy grid, providing an additional commercial revenue stream to the system.

The system may additionally comprise a series of cooling ponds, for example a seawater cooling pond and a freshwater cooling pond.

The chiller may be an absorption chiller, a centrifugal chiller, or a helical-rotary chiller. The chiller may be an ammonia absorption chiller.

Various features, aspects, and advantages of the disclosure will become more apparent from the following description of embodiments of the disclosure, along with the accompanying drawings in which like numerals represent like components.

BRIEF DESCRIPTION OF THE DRAWINGS

Embodiments of the disclosure are illustrated by way of example, and not by way of limitation, with reference to the accompanying drawings, of which:

FIG. 12 is a flow chart illustrating the steps in a method for generating and feeding fresh water to an electrolyser to produce green hydrogen, powered by geothermal energy and driven by compressed air;

Embodiments will now be described more fully hereinafter with reference to the accompanying drawings, in which various embodiments, although not the only possible embodiments, of the disclosure are shown. The disclosure may be embodied in many different forms and should not be construed as being limited to the embodiments described below.

DETAILED DESCRIPTION

The desalination plants of the geothermal hydrogen production system, geothermal hydrogen production system with secondary circuit, and the geothermal hydrogen production and compression system are described herein in relation to an MED desalination plant, it is contemplated that aspects of the disclosure can also be applied to a Reverse Osmosis (RO) desalination plant.

While the term "turbine" is used herein to describe a machine that produces mechanical work by passing a fluid flow over a rotor or impeller to impart rotational motion thereto, it is understood that the "turbine" can be substituted for other mechanical devices, such as a steam engine, an Organic Rankine Cycle (ORC) turbine or a screw expander. Those skilled in the art will appreciate that different expanders are suitable for different power ranges and applications.

The term "liquid" has been used herein to refer to the liquid of the primary liquid circuit. A secondary circuit is described to have a "working medium" where this medium is a fluid that circulates in a closed loop and is purely used as a working medium to transfer heat energy. It is understood that the liquid and the working medium could, in some embodiments, both be water. The working medium can be a liquid or gas with higher or lower boiling points and with different heat transfer properties such as N-Pentane.

The term "well" has been used herein to refer to a deep geothermal wellbore providing thermal energy from hot geology to power the system. For clarity, the term "bore" has been used herein to refer to a salt water wellbore, providing salt water to the desalination plant. The technical terms bore and well can be used interchangeably, and have been used selectively herein in relation to the geothermal well and the salt water bore, merely for clarity.

The term "green hydrogen" has been used herein to define a hydrogen product produced by renewable electricity. This is in contrast to brown hydrogen, which is produced from coal or lignite, grey hydrogen produced from natural gas such as methane (both of which release emissions in to the atmosphere) and finally blue hydrogen which is also produced from natural gas (additionally capturing and sometimes storing released carbon). Using traditional means of production, green hydrogen typically costs twice as much as blue hydrogen.

Figure 1:
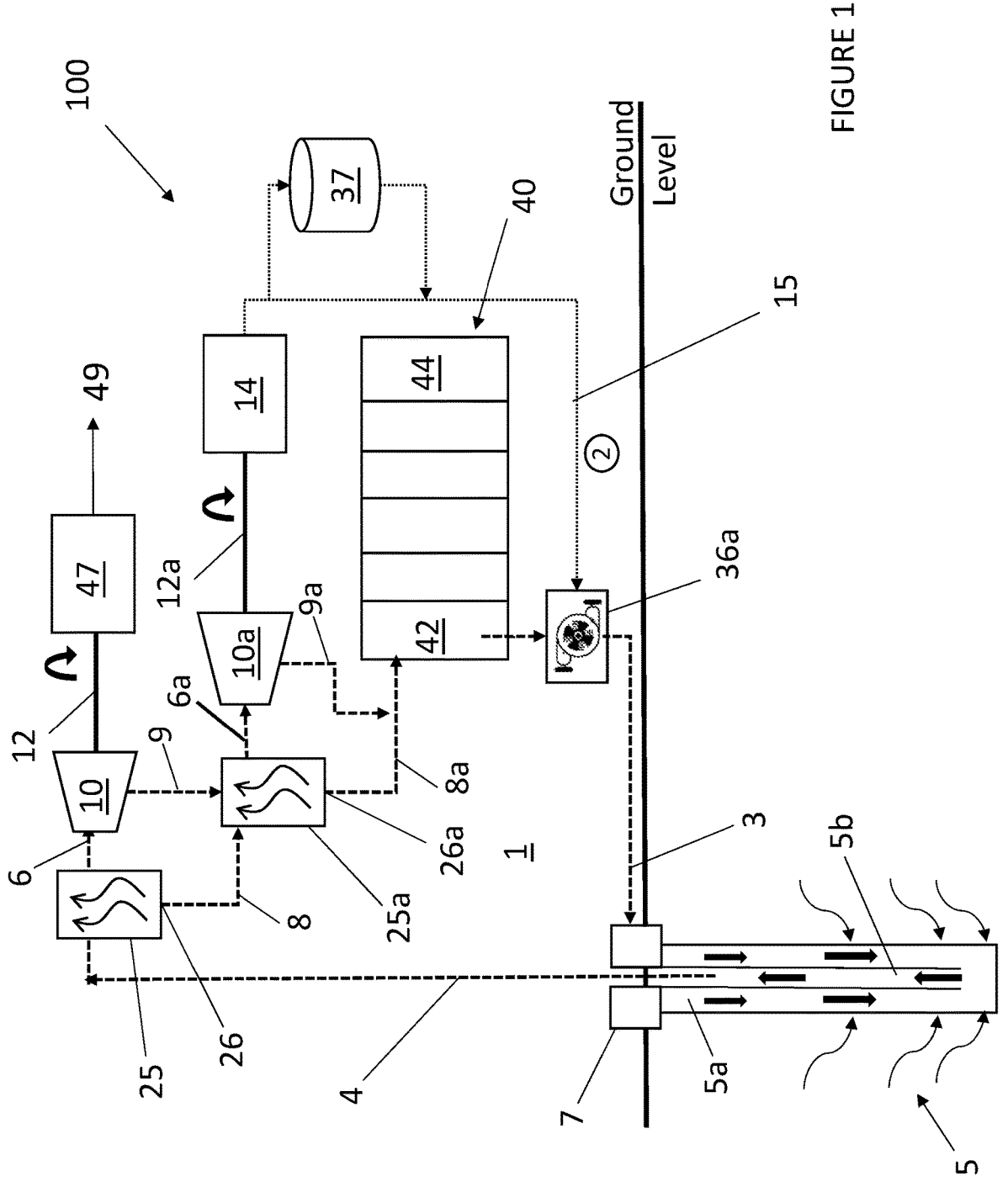
FIG. 1 is a schematic view of a geothermal hydrogen production system, where a first and a second turbine is driven directly off heated liquid from a geothermal well.
Figure 2:
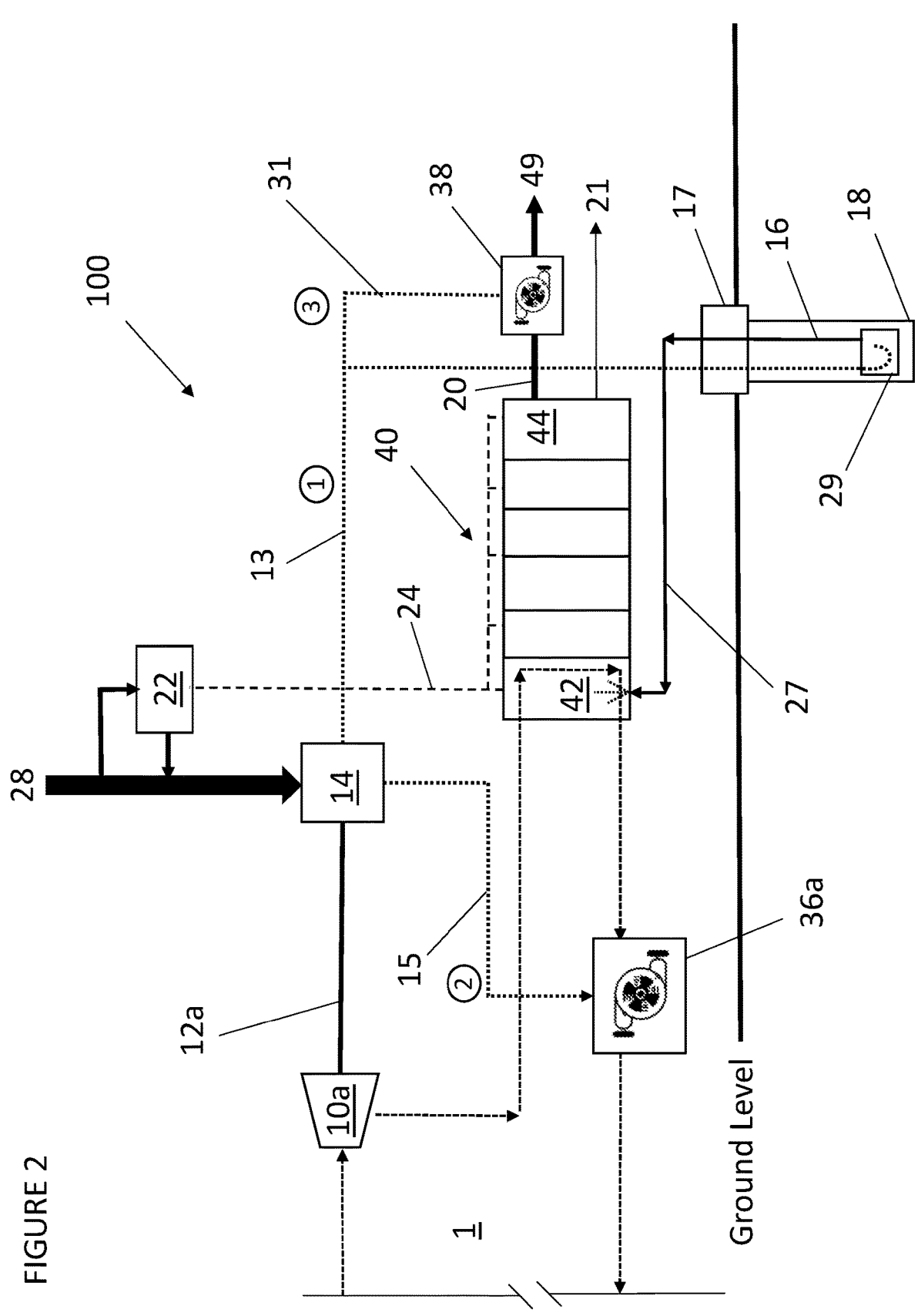
FIG. 2 is a schematic view of the geothermal hydrogen production system of FIG. 1, illustrating a compressed air circuit driven by geothermal energy from the well.

With reference to FIGS. 1 and 2, there is illustrated a geothermal hydrogen production system (100) according to an embodiment of the disclosure, comprising; a primary liquid circuit (1) circulating a liquid (3) into a geothermal well (5) and returning heated liquid (4) from a well head (7) of the geothermal well (5), the primary liquid circuit (1) passing through a desalination plant (40); a first turbine (10) driven by the heated liquid to produce a first mechanical output (12); and a secondary turbine (10a) driven by the heated liquid to produce a second mechanical output (12a), wherein the first mechanical output (12) drives an electrical generator (47), configured to power an electrolyser (49) generating hydrogen via electrolysis of fresh water, and the second mechanical output (12a) drives an air compressor (14) to provide a first (13), a second (15) and a third compressed air supply (31), wherein the first compressed air supply (13) drives a supply pump (29) to supply salt water (16) to the desalination plant (40), the second compressed air supply (15) drives a start-up pump (36a) to initiate the primary liquid circuit (1), and the third compressed air supply (31) drives a fresh water pump (38) to drive fresh water (19) from the desalination plant (40) to the electrolyser (49).

The geothermal well (5) requires bottom-hole geology temperatures of about 270° C.-300° C. to heat the liquid (3). In this description, the primary liquid is water; however, it is contemplated that other liquids can be used in the primary circuit. Water is a low risk liquid, as any leaks or damage to the system (100) will release nothing more than water into the surrounding environment.

The thermal syphoning effect forces geothermally heated liquid (4) to the surface as cooler liquid (3) is drawn into the well (5) to heat. The liquid (3) can be water, wherein the heated water (4) from the well (5) is used to drive the first turbine (10), which in turn drives the electrical generator (47). Electrical energy generated by the generator (47) is communicated via cables or conduits (56) to power the electrolyser (49). This part of the system is described in more detail in relation to FIGS. 8-10.

The heated liquid (4) after being exhausted from the first turbine (10) is re-charged and subsequently fed to the secondary turbine (10a) to produce the second mechanical output (12a) to power the compressor (14), wherein compressor (14) is an air compressor.

After exiting (exhausting from) the secondary turbine (10a) the still hot exhaust (9a) in the form of vapour (6) and/or heated liquid (4) is reintroduced and mixed back into the primary circuit (1) before being directed to the desalination plant (40).

The air compressor (14) once activated, sucks in ambient air (28) on a first side to create a vacuum for the chambers of the desalination plant (40) shown in more detail in FIG. 2.

The second side of the air compressor (14) outputs compressed air to at least the first compressed air supply (13) the second compressed air supply (15) and the third compressed air supply (31) directly (or via a storage tank (37)). In some embodiments, a fourth compressed air supply (32) and a fifth compressed air supply (46) can be supplied from the air compressor (14) to drive ancillary pumps (described in further detail in reference to FIGS. 4 and 5).

The compressed air of the first compressed air supply (13) drives the supply pump (29) (illustrated in FIG. 2 as an air well pump) that pumps air into a sea or salt water bore (18) to drive salt water from the salt water bore (at about 20 m to 50 m depth), which is then fed to the desalination plant (40) which provides a fresh water outlet (20) and a brine outlet (21) as two separate outputs. The primary circuit can also comprise the start-up pump (36a) or similar initiation system to kick-start the primary circuit (1) of the system (100). The start-up pump (36a) is driven by air from the second compressed air supply (15) until such time as the thermal syphoning process begins, whereafter there is little to no further requirement for pumping (e.g., zero to negligible energy input to keep the system running).

In FIG. 1 the primary liquid circuit (1) is illustrated as a dashed-line, that circulates the liquid (3), for example water, as it is drawn into the geothermal well (5) to be heated by the hot geology deep within the well (5). The depths of the well (5) can be between 3,000 m to 10,000 m depending on the geology and the thermal energy required. Where the geothermal well (5) is configured as a closed loop, alternative liquids can be selected as the heating medium in the primary circuit (1). Where the well is open, water is the preferred heating medium to minimise the impact of the system on the surrounding environment.

In FIGS. 1 and 2, the primary circuit (1) is shown in dashed line, and the compressed air lines (13, 15, 31) are shown as dotted lines. A solid black line is shown between the turbine (10) and the electrical generator (47), and the secondary turbine (10*a*) and the air compressor (14) representing shafts or axles that transmit the respective first and second mechanical outputs (12, 12*a*) e.g. rotational movement, therebetweeen.

The storage tank (37), illustrated in FIG. 1, can be included in at least one of the compressed air supply lines (13, 15, 31, 32, 46) to store compressed air for initiation of the system (100) or for use in the system prior to the activation of the air compressor (14).

As the liquid (3) is drawn into an outer annulus (5*a*) of the geothermal well (5) it is heated (the heat shown in FIG. 1 as arrows directed toward the well (5)) and the heated liquid (4) rises up through a central insulated casing (5*b*) bringing the heated liquid (4) to ground level at the well head (7).

The heated liquid (4) is between 270° C. and 300° C. depending on the location of the well (5), the depth of the well (5) and the geology of the area.

Once the primary liquid circuit (1) is initiated, the action of the heated liquid (4) rising continues to draw cooler liquid (3) at about 50° C.-60° C. into the well (5) thus propagating the thermal syphoning effect.

Figure 3B:
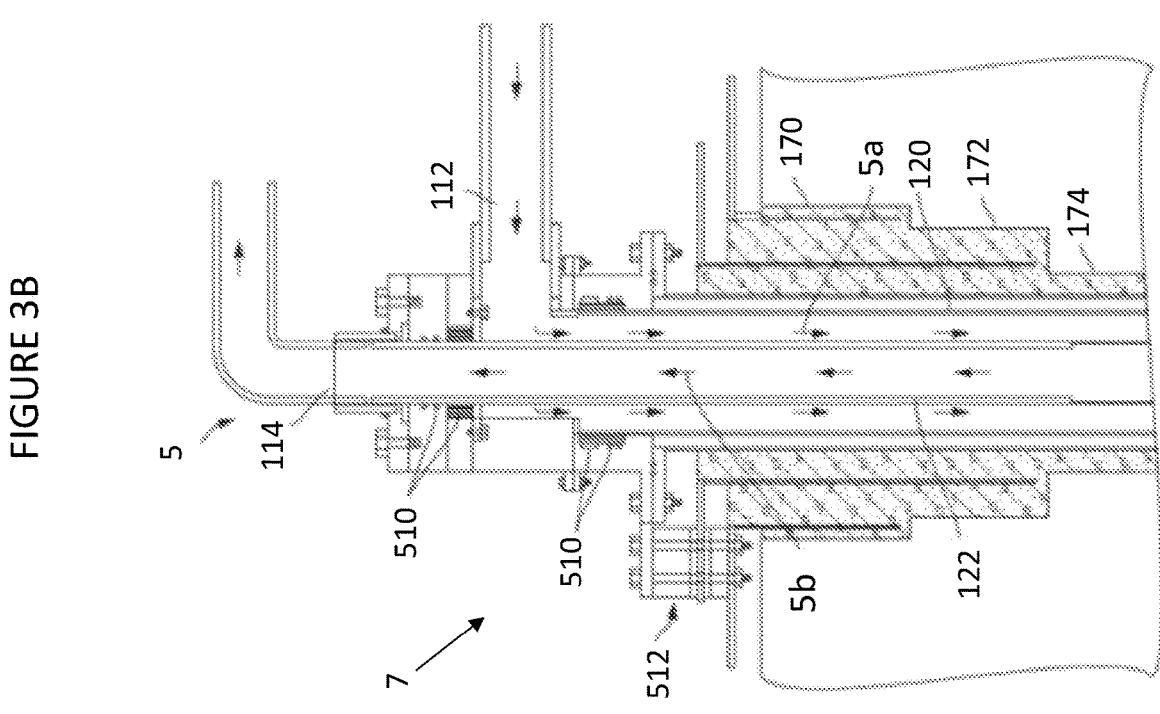
FIG. 3B is a cross-sectional view of a well head of the geothermal well, illustrating a series of valves and seals for controlling the flow of liquid into and out of the geothermal well within the primary liquid circuit.
Figure 3A:
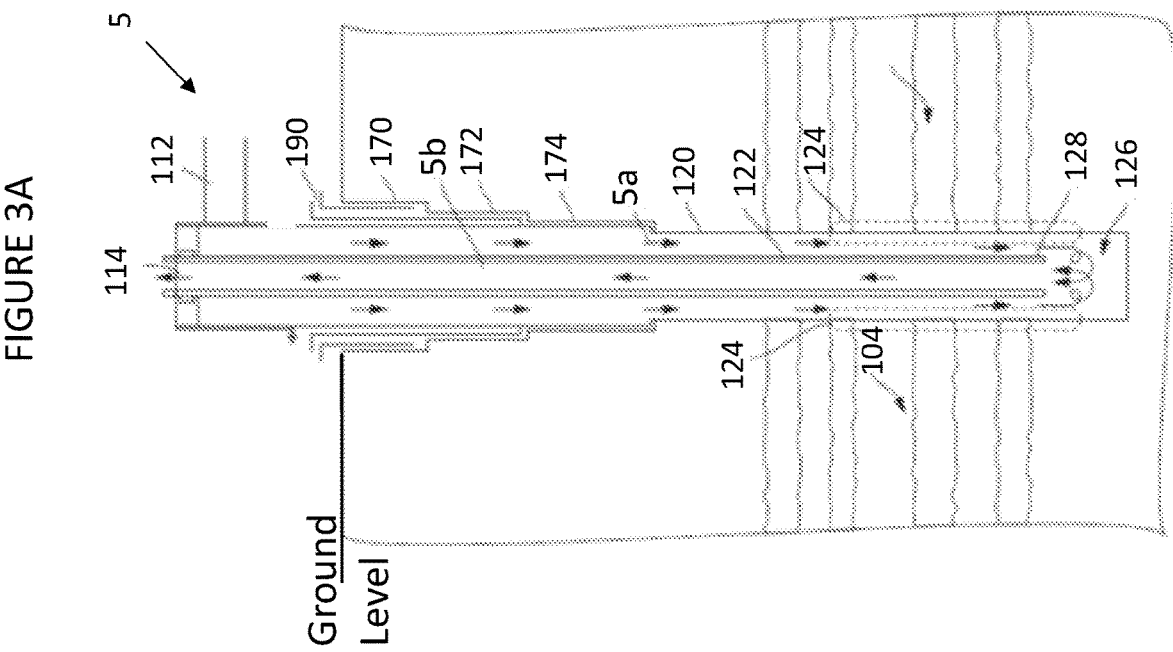
FIG. 3A is a cross-sectional view of a geothermal well, illustrating a steady reduction in a diameter of the well bore, as the well extends into the substrate.

Further details of the geothermal well (5) are described in relation to FIGS. 3A and 3B herein.

As the liquid in the primary circuit (1) emerges from the well head (7) at between 270° C.-300° C., a flash separator (25) is used to provide a vapour (for example steam) to drive the turbine (10). In some circumstances, the heated liquid (4) can remain pressurised (not boiling) and can drive a device to convert thermal energy into movement.

Several stages of flash separator (25) (also referred to as flash tanks) can be configured to provide for additional energy to be harvested. In some arrangements a series of flash separators are interlinked with the products of each separator driving a single turbine (10), alternatively the product of each separator can be individually channelled to drive a series of turbines/expanders.

The pressure within the separator decreases when heated liquid (4) is drawn into the flash separator or separator (25). This drop in pressure forces a portion of the heated liquid (4) to vaporise, and where the heated liquid (4) is water, to create steam (6). The steam (6) is communicated to the turbine (10) where the flow of steam (6) drives the turbine (10) or engine to produce a mechanical output (12) schematically illustrated in FIG. 1 as a shaft that is rotated. The mechanical output (12) as movement of the shaft is then transmitted to the electrical generator (47). In this manner, at least a portion of the thermal energy drawn from the geology of the well (5) is used to drive the electrical compressor (47) connected to the turbine (10).

When introducing the heated liquid (4) to the separator (25) the heated liquid (4) enters the separator (25) typically via a throttling valve reducing the pressure of the heated liquid (4) to initiate flash evaporation. A portion of the liquid (4) immediately "flashes" into vapour, or steam where water is the selected liquid. The vapour is then drawn off the top of the separator (25) to drive the turbine (10).

After flashing, the un-flashed liquid or residual heated liquid (8) of the primary circuit (1) exits the separator (25) via an outlet or drain (26). Simultaneously, the vapour and/or steam (6) exits the turbine (10) as exhaust (9) which has decreased in temperature. The residual heated liquid (8) is mixed with the exhaust (9) of the turbine (10) to bring the temperature back-up before being directed to a secondary flash separator (25*a*).

The liquid of the primary circuit (1) constituted of residual heated liquid (8) and exhaust (9) is fed to the secondary separator (25*a*) and again reduced in pressure on entry to the secondary separator (25*a*) causing about 10% of the liquid to immediately evaporate into vapour or steam (6*a*). The vapour (6*a*) is then channelled to a secondary turbine (10*a*) which generates a secondary mechanical output (12*a*) to drive the air compressor (14).

The un-flashed residual heated liquid (8*a*) of the secondary separator (25*a*) exits via drain (26*a*) and is combined with the exhaust (9*a*) of the secondary turbine (10*a*) back into the primary liquid circuit (1), and once combined are communicated to a first chamber (42) of the desalination plant (40) to evaporate the salt water (16) introduced thereto.

Finally, the primary liquid circuit (1) after passing through each of the separators (25, 25*a*) each of the turbines (10, 10*a*) and exiting the desalination plant (40) is directed back to the geothermal well (5) to be reheated.

On exiting the plant (40), the liquid of the primary circuit (1) can be routed through the start-up pump (36*a*) at a reduced temperature of between 50° C.-60° C. before being directed back to the well (5) to continue the thermal syphoning effect.

Figure 6:
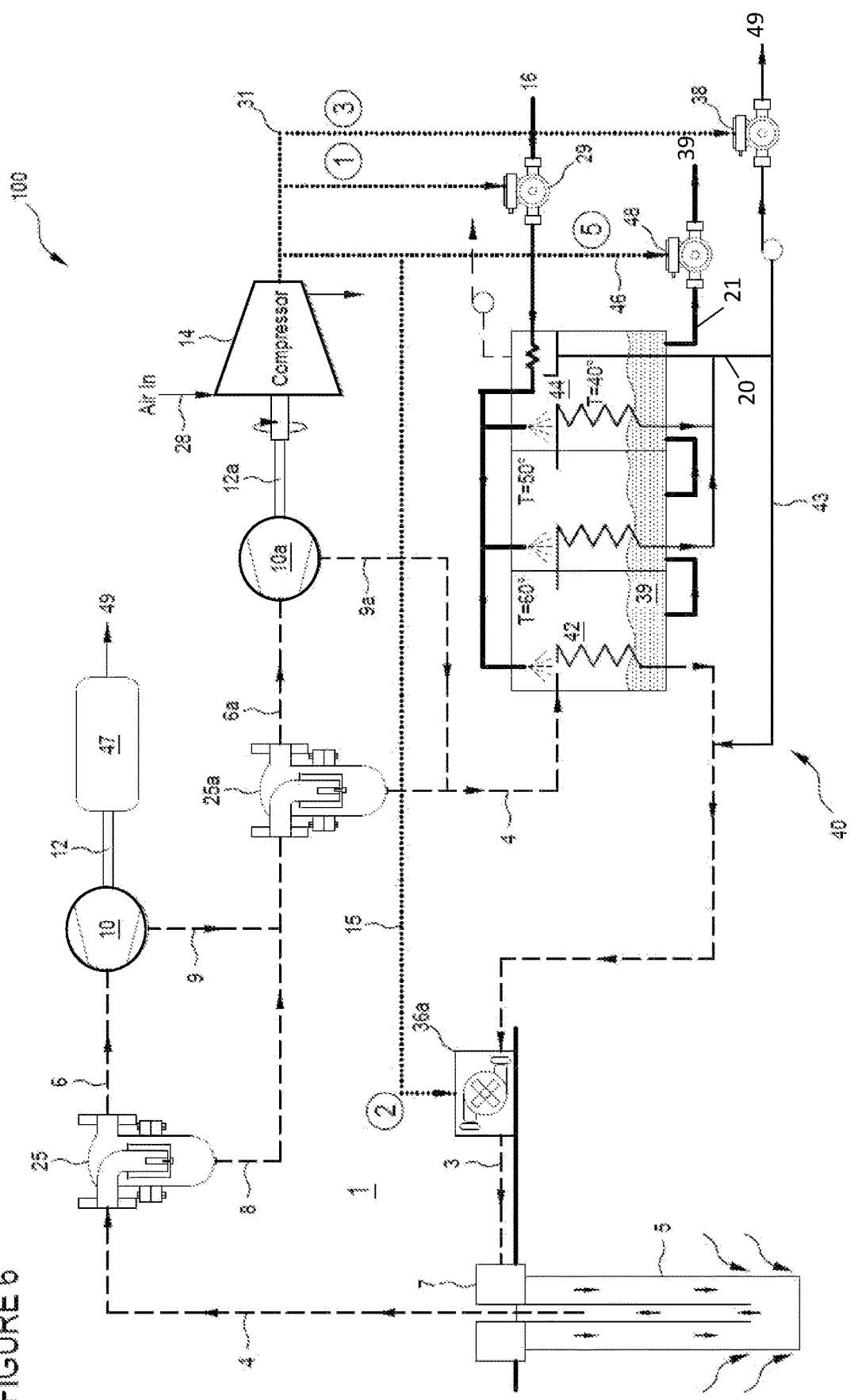
FIG. 6 is a schematic view of a geothermal hydrogen production system, illustrating a plurality of turbines for providing discrete mechanical outputs for driving the desalination process and generating electricity simultaneously.

The primary liquid circuit (1) is a closed loop (at least outside of the well (5)). However, a top-up water supply (43) can be incorporated into the loop, as illustrated in FIG. 6, whereby fresh water (19) desalinated within the MED plant (40) is diverted way from the fresh water outlet (20) and into the primary liquid circuit (1).

The start-up pump (36*a*) is only used to initiate the circuit (1) and is not required after start-up. The start-up pump (36*a*) is a fluid air pump and is driven by the second compressed air supply (15) from the compressor (14). The start-up pump (36*a*) being driven off the second compressed air supply (15) avoids the requirement for additional electricity to run the system (100). This part of the system will be further described in reference to FIG. 2.

When the well (5) has been sitting without flow or thermal energy production and the temperature of the liquid inside of the insulated casing (5*b*) is the same temperature as the liquid outside of the insulated casing (5*b*) in the annulus (5*a*) of the well (5) (outlet and inlet closed), the total volume of liquid (water) in the well (5) is heated according to thermal gradients of the geology. This means that the total in-well liquid temperature will be around 130° C. at 3000 m, 190° C. at 4000 m, 300° C. at 6000 m, 410° C. at 8000 m and 550° C. at 10000 m.

To start the thermal syphoning effect in the well (5), a small amount of water movement is required and this will take a small 10 KW start-up pump (36) to initiate this flow, or a store of ambient temperature water held in an elevated storage tank that can be delivered into an annulus of the well head (7) by gravity and water head pressure which would avoid the requirement for additional energy. As soon as a volume of cooler liquid (3) is added into the well head (7), the weight of the newly added liquid will be heavier than the weight of the heated liquid (4) inside of the well (5) and a flow from the well head (7) will increase as the cooler liquid (3) continues to be added and drawn into the annulus of the well (5). Within a few minutes, the start-up pump (36a) can be turned off as the thermal syphoning effect will generate the flow and thermal energy production.

Depending on the mechanical output required the skilled person can selectively substitute the above described turbines (10, 10a) for alternative machines, for example: direct stream turbines, ORC turbines, screw expanders, steam engines or the like.

Additionally, the compressor (14) can be selected from either screw compressors or piston compressors, where a screw compressor will be better suited to a large volume of fluid under lower pressure and a piston compressor will be better suited to larger pressures with less volume.

Before moving to FIG. 2, a brief overview of the internal workings of a typical desalination plant is provided.

Multi-Effect Distillation (MED) Plants

Figure 7:
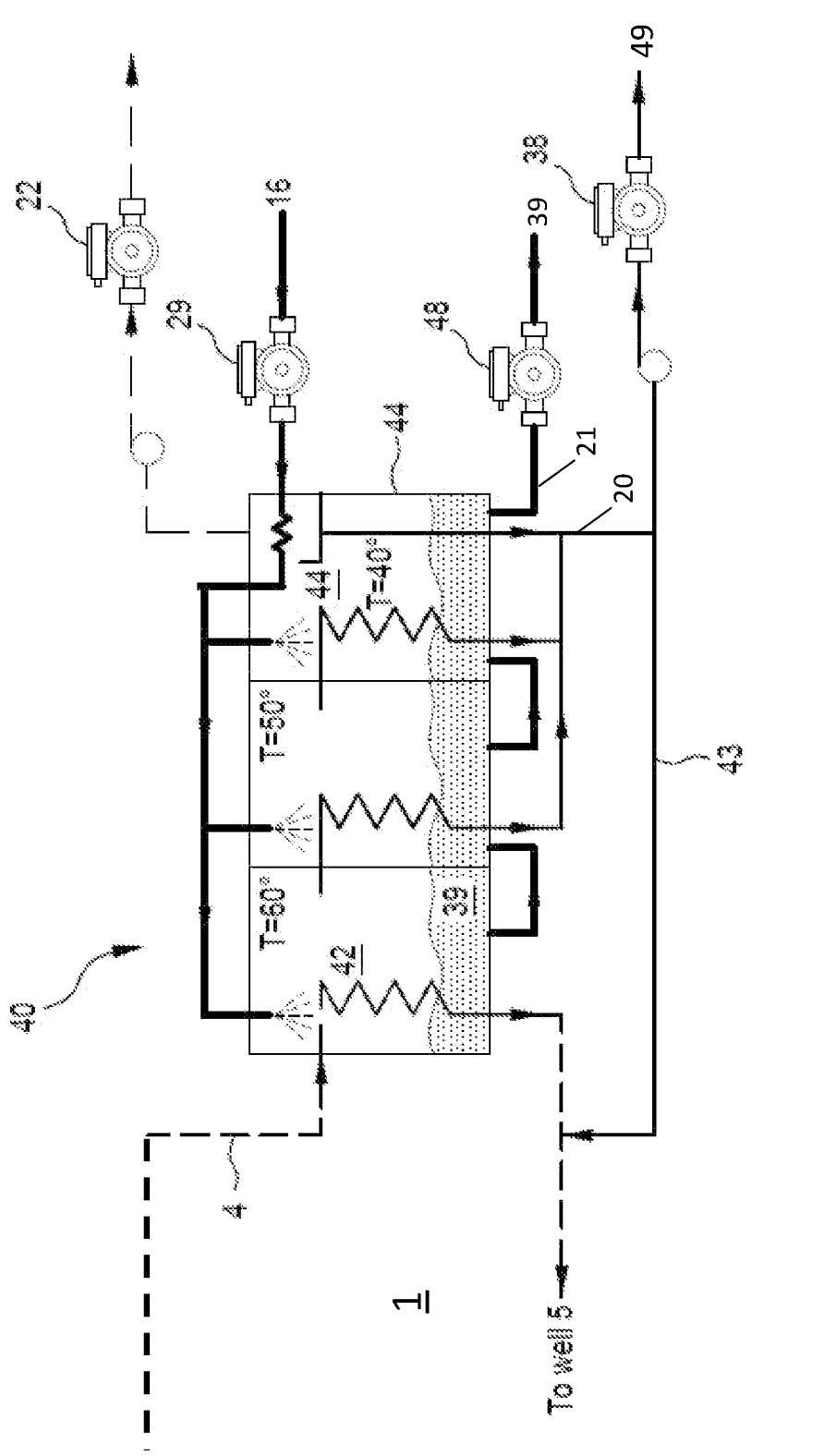
FIG. 7 is a schematic view of a multi-effect distillation (MED) desalination plant illustrating a series of three chambers each sequentially decreasing in temperature and pressure, to provide a first output of fresh water, and a second output of brine.

An MED plant uses distillation to desalinate sea or salt water. In each "effect" or "stage" of the multi effect distillation (MED) plant), salt water is sprayed onto tubes or plants heated by thermal energy inside of the tubes or plate heat exchangers that are position inside of the MED chambers. Some of the saline water evaporates, and this fresh vapour is directed into the next chamber of the MED plant to be sprayed onto the tubes or plates in the next chamber and so on until this process has been replicated between three and seven times in three to seven MED chambers of the MED plant with increasing vacuum or decreasing atmosphere pressure in each chamber, heating and evaporating more fresh water from salt water. Thus each stage reuses energy from the previous stage, with successively lower temperatures and pressures. A schematic diagram of an MED desalination plant (40) is illustrated in FIG. 7.

The MED plant (40) comprises a sequence of closed chambers separated by walls, having a hot fluid or steam heat source at a first chamber the same fluid with reduced heat (condensed) exiting from the first chamber. Each successive chamber has a temperature and a pressure lower than a previous chamber. This means the walls within each chamber are held at a temperature intermediate the temperatures of the fluids on either side thereof. This temperature differential, coupled with a pressure drop in the chamber, transfers evaporation energy from a warmer first zone of the chamber to a colder second zone of the chamber. From the second zone the heat energy then travels via conduction (and/or piping) through the wall to the colder subsequent chamber. Additional salt water can also be sprayed into the subsequent chambers to continue the effect through each chamber of the plant (40).

The primary liquid circuit (1) of the system (100) is routed through the first chamber (42) of the MED plant (40) after being expelled from the secondary turbine (10a). In this manner the heat energy in the primary liquid circuit (1) is used to supply the MED plant (40) before being returned to the geothermal bore to be re-heated. The primary circuit liquid enters the first chamber of the MED plant (40) at about 80 to 95° C. On exiting the first chamber (42) having an ambient temperature of 60° C. to 70° C., cold salt or sea water is sprayed onto the internal pipes communicating the primary liquid circuit (1) through the MED plant (40) to reduce the temperature in the primary liquid circuit to between 60° C. to 50° C.

The temperature in the first chamber (42) of the plant (40) is about 70° C., and drops by about 5° C. in each subsequent chamber. The temperature in a final chamber (44) is about 60° C. in a three chamber MED system illustrated in FIG. 7 or 45° C. in a six chamber MED system. The MED plant (40) can comprise additional chambers, depending on the quality of the salt water delivered to the MED plant and the required quality of the fresh water (19) delivered from the MED plant (40).

The liquid in the primary circuit (1) can be pumped by the start-up pump (36a) illustrated in FIG. 1 as an air pump, to the geothermal well head (7) inlet until such time as the thermal syphoning takes effect and naturally circulates the liquid of the primary fluid circuit (1). As such, the start-up pump (36a) is only required to initiate the primary fluid circuit (1).

As illustrated in FIGS. 6 and 7, the desalination plant (40) has two main outlets: (i) fresh water outlet (20); and (ii) brine outlet (21). The brine outlet (21) directs brine (39) away from the plant (40) as the desalination plant (40) continues to process sea or salt water (16). The fresh-water outlet (20) directs fresh water (19) to the electrolyser (49) to maintain the reaction in the electrolyser to continuously create hydrogen therein.

The fresh-water outlet (20) can also provide the supply of top-up water (43) that can be directed back into the primary liquid circuit (1) to account for water loss from the primary liquid circuit (1). This top up supply (43) of distilled water also serves as a cleaning system for the well circulation liquid.

In order to run the desalination plant (40) each subsequent chamber of the plant (40) requires a drop in pressure to continue the evaporation cycle of the plant (40). As illustrated in FIG. 2, the air compressor (14) provides compressed air to the first, second and third air supply lines (13, 15, 31) and simultaneously creates the required vacuum for the chambers of the plant (40).

Turning now to FIG. 2, the compressed air circuit of the system (100) is described in more detail.

Ambient air (28) is drawn into the system (100) through an air vacuum pump (22). This air vacuum pump (22) is impeller driven by fluid flow or a Venturi system creating suction in a vacuum line (24). The compressor (14) driven by the secondary turbine (10a) sucks ambient air (28) into the system and compresses the air into the supply lines (13, 15, 31). The suction from the compressor (14) draws in the ambient air (28) driving the air vacuum pump (22) as it does so. The compressor provides at least three supply lines (13, 15, 31) but can supply more as described herein in reference to FIGS. 4 and 5.

The first compressed air supply (13) is directed to the supply pump (29) in the form or an air-well pump located deep within the salt water bore (18) or in the ocean or salt or sea water storage tank or dam. As air is pumped into the bottom of the salt water bore (18) or the ocean or storage tank or dam, the sea salt water is pumped to the surface and towards the MED plant (40). The supply pump or pumps (29) is/are capable of pumping this sea or salt water (16) along a salt water delivery line (27) for distances of up to 10 kms from the ocean, storage or bore (18) to the MED plant (40). At the termination of the delivery line (27) the sea or salt water (16) is sprayed at between sea or salt water temperature and ambient temperature into the chambers of the plant (40).

It is calculated that for every million litres of salt water delivered to the MED plant (40) approximately 400,000 litres of distilled fresh water (19) can be drawn from fresh water outlet (20) without any $CO_2$ emissions, toxic waste or additional electricity load input and at an operational cost per KL of around 8 times lower than typical RO desalination costs per KL.

Although not illustrated in the Figures, the salt water bore (18) and the supply pump (29) can comprise a plurality of salt water bores (18) and air pumps, all feeding the single delivery line (27) to feed one or more desalination plants (40).

The brine outlet (21) discharges the accumulated brine as a residual or waste product of the desalination system (100). However, this waste brine can be used for downstream processes, or harvested for desirable commercial properties. In some embodiments, the fifth compressed air supply (46) can be configured to drive a brine discharge pump (48) illustrated in FIG. 6, to pump the brine from the MED plant (40) during operation.

The waste brine can be evaporated to produce salt, pot ash, magnesium, lithium and other minerals at very low cost compared to current mining process for these minerals. These products can be sold to farmers for fertilising requirements and to the public for consumption and a wide range of other requirements. In some locations, local crops such as wheat and barley can be used to produce PLA at low cost. Using some of the waste heat from this geothermal MED system, PLA can be produced from locally grown crops at very low cost. This product can be exported and can generate environmentally friendly, plant based plastic production business opportunities.

Meanwhile, the suction of the air compressor (14) draws air from the chambers of the MED plant (40) to create a vacuum such that the compressed air on the pressure side of the compressor (14) delivers compressed air via the first compressed air supply (13) to the salt water bore (18) or ocean to push the salt water to the bore head (17) or to the surface and into the MED plant (40).

As ambient air (28) is continually drawn through the air vacuum pump (22) by the compressor (14) the vacuum is continually created on the other side of the vacuum air pump (22). This vacuum is communicated to the chambers of the plant (40) via the vacuum line (24) that draws air from each of the chambers of the MED plant (40) to drop the pressure therein, as required to propagate the continued distillation in each subsequent chamber of the plant (40).

The second compressed air supply (15) is directed to the start-up pump (36a) and the first compressed air supply (13) is directed to the supply pump (29) as described above. The third compressed air supply (31) is routed to drive the fresh water pump (38) to pump the fresh water (19) from the MED plant (40) to the electrolyser (49).

Air Well Pumps

The supply pump (29) can be an air-well pump and is driven entirely from the first compressed air supply (13) from the compressor (14) powered by geothermal energy from the well (5). The supply pump (29) requires no additional energy or electrical input.

Configuring the supply pump (29) as an air-well pump, is highly efficient and has low maintenance requirements because there are no moving parts. The first compressed air supply (13) simply pushes the salt water (18) from the bottom of the bore (18) (which could be an ocean bore or an inland bore) and pushes the salt water to a desired location, for example a tank, reservoir or desalination plant (40).

In this design, the first compressed air supply (13) delivers the salt ground-water from a larger salt ground-water system that is commonly found inland in Australia, and particularly in wheat belt and arid areas.

The mechanical outputs (12, 12a) from the turbines (10, 10a) can be used to drive a raft of mechanical devices, for example, a pump, a compressor, a further turbine, or a generator. In the case of the second output (12a), it is more efficient to drive the compressor (14) that drive an electrical generator that can be sued to power a compressor because both the suction side and the pressure side of the compressor (14) can be used to supply the vacuum needs of the desalination plant (40) and salt water (16) delivery. If the mechanical output (12) was used to drive an electric generator to run a vacuum pump and to run electric submersible pumps for salt water delivery, then there would be energy losses in the conversion to electricity and then further loses in the conversion back to mechanical motors to generate the vacuum and move the salt water. This would in turn drive higher costs for maintenance and replacement of electrical components.

As such, the use of the supply pump (29) provides an ideal pairing, as the MED plant (40) requires a vacuum for the salt water (18) to boil at less than 100° C. in its chambers.

Each section of the MED plant (40) has a higher vacuum (lower pressure) as the salt water (18) is cooled in every stage of the MED plant (40). The final chamber (44) of six chamber MED plant (40) will have a temperature of around 45° C.-40° C. and this requires the largest vacuum for the salt water to vaporise, greater than the first chamber (42) where the chamber temperature is ideally 70° C.

The incorporation of the air storage tank (37) also facilitates the use of several down-hole air pumps and several vacuum pumps. In addition, the air storage tank (37) provides an energy storage so that when the geothermal well (5) is turned down or off for short periods, the second compressed air supply (15) can be activated to drive the air vacuum pump (22), start-up pump (36a) and the supply pump (29) located in the salt water bore (18).

The system (100) will require the liquid in the primary liquid circuit (1) to reach about 270° C.-300° C. when delivered from the geothermal well (5) to run the two turbines (10, 10a) and the MED plant (40).

The system (100) can be installed inland to utilise the large supplies of salt water or on the coast to use sea water as a source for desalination. The cost of producing fresh water in all of these locations, including maintenance, equipment depreciation, wages and admin costs is calculated to be about AUD$0.30c per KL. Compared to RO desalination that costs about A$2.20 per KL for a lower quality water product and produces large amounts of $CO_2$ and plastic waste; geothermal desalination by MED is much cheaper and produces no waste plastic or $CO_2$ emissions. The well(s) (5) will produce thermal energy for hundreds of years and the low cost surface equipment will require minimal maintenance, and routine replacement about every thirty years.

Geothermal Well

The geothermal well (5) and well head (7) are further described in relation to FIGS. 3A and 3B, which are excerpts from Australian Patent No. AU 2020101487. Although FIGS. 3A and 3B illustrate only one well (5) it is understood that multiple wells can be used in series or in parallel to increase the potential mechanical output (12) of the pumping station (100).

A single well (5) is illustrated in FIG. 3A to provide a means for circulating liquid through a reservoir and also provide an inlet channel (annulus) (5a) and insulated return channel (5b) for supplying a primary liquid to the well head (7). The channels (5a, 5b) are arranged co-axially in tubing strings within the well (5) and separated by an insulated casing (122). Although the inlet channel (5a) is shown to surround the insulated return channel (5b) it is contemplated that the channels (5*a*, 5*b*) can be reversed such that the inlet channel (5*a*) extends centrally through the insulated return channel (5*b*).

Shown in FIG. 3A, the well (5) includes a pipe inlet (112), a pipe outlet (114), the inlet channel (5*a*) (inlet channel) and the insulated return channel (5*b*) (outlet channel) disposed concentrically therein.

The inlet channel (5*a*) down the annulus of the well (5) receives liquid from the pipe inlet (112) and is defined between an outer casing (120) and the insulated inner casing (122). The insulated return channel (5*b*) is defined by the insulated inner casing (122) positioned within the outer casing (120). The insulated return channel (5*b*) provides heated liquid (4) to the pipe outlet (114) to be pushed by the thermal syphoning effect to the pipe outlet (114) of the well head (7).

Additional casings can be nested to extend the well downwards with a decreasing diameter. For example, a first support casing (170) extends from the well head (7) and geological surface inward towards the well end (e.g., into the ground). In some embodiments, the first support casing (170) extends axially into the ground to a depth of approximately 100 metres. The first support casing (170) may have a diameter of 30 inches.

A second support casing (172) is positioned within, and may abut, the first support casing (170) and extends from the well head and geological surface inward towards the well end (e.g. into the ground) at a depth greater than the first support casing (170). In some embodiments, the second support casing (172) extends axially into the ground to a depth of approximately 1500 metres. The second support casing (172) may have a diameter of 18⅝ to 20 inches. A third support casing (174) can be positioned within, and may abut, the second support casing (172) and extends from the well head and geological surface inward towards the well end (e.g. into the ground) at a depth greater than the second support casing (172). In some embodiments, the third support casing (174) extends axially into the ground to a depth of approximately 3000 metres. The third support casing (174) may have a diameter of 13⅜ to 16 inches.

An outer casing (120) is positioned with the third support casing (174) and extends past the third support casing (174) and defines a bottom of the well (5). The outer casing (120) can be partially defined by the geological layers such that the heated liquid (4) is permeable through a portion (124) of the outer casing (120) in the permeable geological layer. In some embodiments, the permeable portion (124) of the outer casing (120) is at a depth between 7,500 metres and 12,000 metres. The permeable portion (124) of the outer casing (120) may be configured to allow a liquid flow path (104) through the permeable rock toward a secondary well (not illustrated). The outer casing (120) may be consolidated rock such as granite that contains no groundwater, but has high levels of heat that will transfer into the cooler liquid (3) as the liquid is drawn down the inlet channel (5*a*) and comes into contact with the outer casing (120) of the well (5).

In some embodiments, the outer casing (120) extends axially into the ground to a depth of approximately 7,500 m-12,000 m and is not defined by geological layers, ie. the outer casing (120) extends to the bottom of the well (5). Where the outer casing (120) extends to and defines the bottom of the well (5), the well is closed to the surrounding geology. This "closed-well" or sealed well arrangement prevents contact between the liquid of the primary liquid circuit (1) and the geology surrounding the well (5). This "closed well" arrangement prevents sediment and other geological impurities from entering the liquid (3) of the primary liquid circuit (1).

The insulated inner casing (122) is positioned within the outer casing (120) and is configured to receive the flow of liquid (3) through the inlet channel (5*a*) at an end of the insulated inner casing (122). In some embodiments, the end (128) of the insulated inner casing (122) includes an intake screen (128) that receives the heated fluid flow from the inlet channel (5*a*) as it enters the insulated return channel (5*b*). The thermal syphoning effect pushes the heated liquid (4) up the inside of the insulated return channel (5*b*) of the insulated inner casing (122). The intake screen (128) can be configured to provide a filter to the liquid (3) as it enters the insulated inner casing (122).

In one embodiment, the pipe inlet (112) of the first well (5) receives a flow of between 5 and 30 kg/sec (eg. mass flow rate) at a temperature of 50° C. to 70° C. that flows through the inlet channel (5*a*) towards the bottom of the well (5). The injection velocity through the inlet channel (5*a*) may be 0.02 to 1 m/sec. The liquid (3) is heated as it passes through the lower layers of geology. The slower the liquid flow down the inlet channel (5*a*), the more the heat will be transferred from the geology into the injected liquid (3).

In some embodiments, liquid from the surrounding geology enters into the inlet channel (5*a*) through the permeable portion (124) of the outer casing (120). The liquid enters and can expand within the gap (126) as it enters the intake screen (128) of the insulated inner casing (122) and into the insulated return channel (5*b*).

The temperature of the heated liquid (4) can be between 150° C. and 300° C. s as the liquid travels through the gap (126) toward the insulated return channel (5*b*). The heated liquid (4) may lose some of the heat contained therein as it is pushed to the surface, through the insulated inner casing (122).

In most parts of Australia, the temperature of the liquid can be approximately 300° C. in a 6,000 meter deep well as the liquid (3) travels through the gap (126) toward the second channel (5*b*).

Approximately 10° C. is lost between a bottom (126) of the well (5) and the pipe outlet (114) but this heat is not lost totally, as it is transferred into the inlet channel (5*a*) and increases the heating rate of the inlet channel (5*a*). The heated liquid (4) exiting the pipe outlet (114) of the well head (7) will have a pressure of between 50 and 200 BAR and a mass flow rate of between 1 and 30 kg/sec at a temperature of between 290° C. and 140° C. from the insulated return channel (5*b*) depending on the depth of the geothermal well (5).

The well (5) with a bottom hole rock or geology temperature of 400° C. may have a thermal energy output of between 5 MW-30 MW, for example 19.78 MWth (thermal megawatts) with a flow rate from the well head (7) of 20 Kg per second and temperature of 280° C. and the well injection temperature is 50° C.

An expanded view of the well head (7) is shown in FIG. 3B. The well head (7) includes a plurality of seals (510), an exterior support collar (512), and other features to provide proper support and outlet for of the well (5).

Thermal syphoning moves the liquid within the well (5) once the system begins flowing. In some embodiments, 50° C. liquid (water cooled after generating a mechanical output) is drawn down the well (5) where the liquid (3) is heated up on its journey to the bottom of the well (5) and then pushed to the surface at the well head (7). The increased temperature and the pressure created from the heat forces the heated liquid up the production casing to the surface.

In some embodiments, an open well configuration may include the well (5) having a slotted portion at the bottom of the well in-line with the permeable geology such that the liquid can flow in and/or out of the well (5), through the geology, and downstream to a secondary well in series.

In one particular embodiment of the thermal syphoning system, the system may be a six well system, with injection flow rates being: Well 1-50 kg/s, Well 2-30 kg/s, Well 3-30 kg/s, Well 4-30 kg/s, Well 5-30 kg/s, Well 6-10 kg/s with the total injected being 180 kg/second. In this embodiment, the production flow rate may be: Well 1-30 kg/s, Well 2-30 kg/s, Well 4-30 kg/s, Well 5 30 kg/s and Well 6-30 kg/s. Total production of the embodiment may result in a flow rate of about 180 kg/second and 116 MW of thermal energy.

In one arrangements of the well (5) using a thermal syphoning system, a 300° C. or hotter bottom hole geology temperature, the natural flow rate (without restriction by an adjustable valve at the wellhead outlet) out of a 6.3" ID insulated production casing at the surface could be 30 kg/s or a velocity of 2 m/s. While the heated liquid (4) may experience heat loss on the journey up the well (5), the outlet temperature will typically be 5% less than the liquid temperature at the bottom of the well (5).

The well (5) can be configured for a few thousand metres up to about 12,000 m into almost any geology including granite. The geothermal heat is exchanged at depth via a closed-loop system rather than bringing deep geothermal brine to the surface. This form of well (5) has a production life of 100+ years, with relatively low maintenance costs. The well (5) has a small physical footprint and has minimal impact on surface ground water systems, as the layers of casings around the well (5) provide protection.

Figure 4:
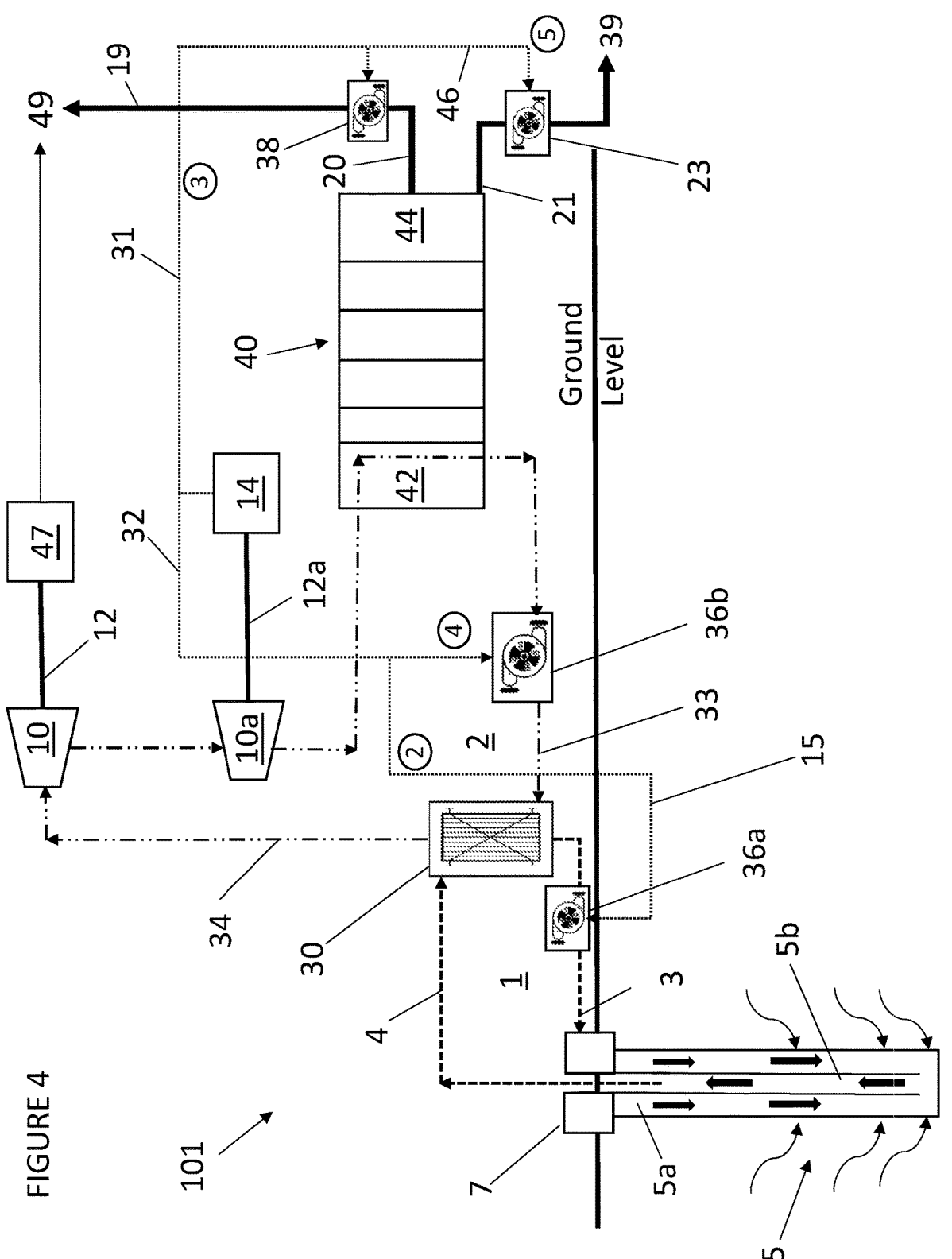
FIG. 4 is a schematic view of a geothermal hydrogen production system using a secondary (or Organic Rankine Cycle 'ORC') circuit.
Figure 5:
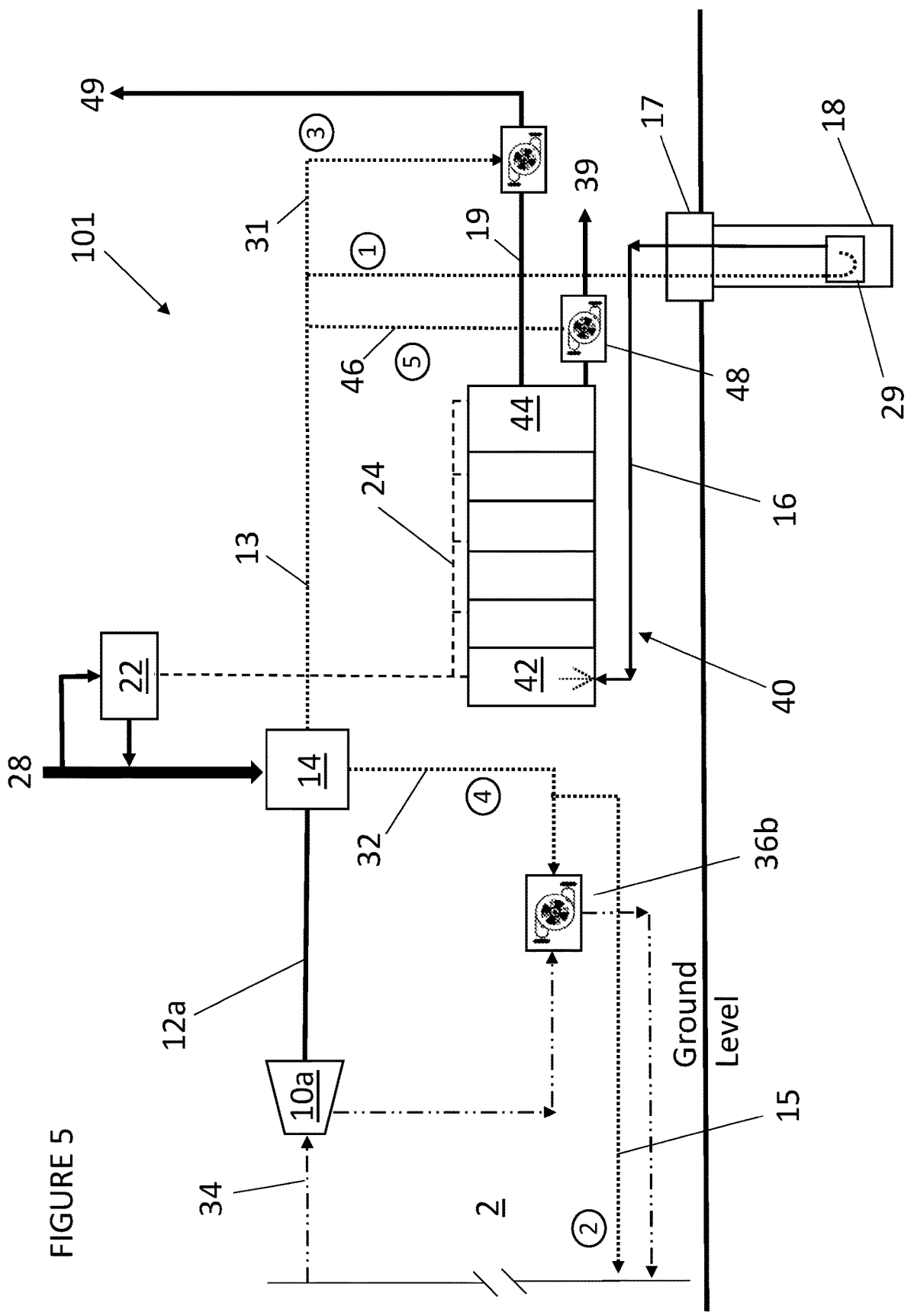
FIG. 5 is a schematic view of the geothermal hydrogen production system of FIG. 4, illustrating a compressed air circuit driven by thermal energy from the geothermal well.

A second aspect of the disclosure is shown in FIGS. 4 and 5, which illustrates a geothermal hydrogen production system (101) with a binary or secondary circuit, comprising a primary liquid circuit (1) circulating a liquid (3) into a geothermal well (5) and returning heated liquid (4) from a well head (7) of the geothermal well (5); the heated liquid (4) being fed to a heat exchanger (30) to heat a working medium (33) of a secondary circuit (2) passing through a desalination plant (40), wherein heated working medium (34) of the secondary circuit (2) drives a first turbine (10) and a secondary turbine (10a) to produce a first mechanical output (12) and a second mechanical output (12a); and wherein the first mechanical output (12) drives an electrical generator (47), configured to power an electrolyser (49) generating hydrogen via electrolysis of water, and the second mechanical output (12a) drives an air compressor (14) to provide at least one of a first (13), a second (15) and a third compressed air supply (31), wherein the first compressed air supply (13) drives a supply pump (29) to supply salt water (16) to the desalination plant (40), the second compressed air supply (15) drives a start-up pump (36a) to initiate the primary liquid circuit (1), and the third compressed air supply (31) drives a fresh water pump (38) to drive fresh water (19) from the desalination plant (40) to the electrolyser (49).

The geothermal hydrogen production system with a binary circuit (101) requires no electricity supply and also uses the thermal syphoning effect for energy requirements to maintain the primary liquid circuit (1) and to deliver salt water (16) to the desalination plant (40).

With this zero electricity hydrogen production system (101), it is possible to drive the electrical generator (47) from the first mechanical output (12) and to drive the compressor (14) from the second mechanical output (12a) both outputs generated from turbines (10,10a) driven off the vaporised or heated working medium (34) of the ORC or secondary circuit (2). The secondary circuit (2) being heated by the primary liquid circuit (1) with thermal energy derived from the geothermally heated well (5) or wells (5).

The geothermal hydrogen production system with a binary circuit (101) utilises the compressor (14) to both create vacuum in the desalination plant (40) and to supply the plurality of compressed air lines (13, 15, 31, 32, 46) where the first compressed air supply (13) powers the supply pump (29) in the form of an air-well pump to push sea or salt water from the ocean or salt water bore (18) to continuously feed the desalination plant (40).

The supply pump (29) is an air-pump essentially configured as a pipe that directs the first compressed air supply (13) into the salt water bore (18). The compressed air is released at the bottom of the bore (18) and this air then pushes salt water in the bore (18) to the bore head (17) at the surface. There are no moving parts to rust or decay making the supply pump (29) a very efficient, and low maintenance option. The power of the supply pump (29) is sufficient to drive the salt water (16) to the surface at the bore head (17) and to drive the salt water (16) along several kilometres of delivery pipeline (27) for ambient temperature delivery to the first chamber (42) of the desalination plant (40).

In FIGS. 4 and 5, the primary liquid circuit (1) is shown in dashed line, the secondary circuit (2) is shown in dot-dot-dashed line, and the compressed air lines (13, 15, 31, 32, 46) are shown as dotted lines. Additionally, each compressed air supply line is numbered in a circle. A solid black line is shown between the turbines (10, 10a) and the respective air compressor (14) and electrical generator (47) representing shafts or axles that transmit the mechanical outputs (12, 12a) e.g. rotational movement therebetween.

An Organic Rankin Cycle (ORC) has been incorporated into the first aspect of the disclosure (100) to provide mechanical outputs (12,12a) when the geological temperature is not hot enough for a direct steam or direct screw expander system as described in system (100) above. The mechanical outputs (12,12a) are then fed to the electrical generator (47) and compressor (14), as described above in relation to the first aspect of the disclosure. The compressor (14) is selected from rotary or piston style compressors depending on the required air compressor volumes.

The primary liquid circuit (1) operates in the same manner as described herein in relation to the first aspect of the disclosure; however, the turbines (10, 10a) are not driven off the primary liquid circuit (1). In contrast to the geothermal hydrogen production system (100), the geothermal hydrogen production system with a binary circuit (101) uses the heat exchanger (30) to transfer the geothermal heat from the primary liquid circuit (1) to the working medium (33) in the secondary circuit (2) that is separated from the primary liquid circuit (1) of the well (5). The secondary circuit (2) is a closed circuit.

The second side of the air compressor (14) outputs compressed air to at least the first compressed air supply (13), the second supply line (15), and the third compressed air supply (31) directly (or via the storage tank (37)). Illustrated in FIGS. 4 and 5, is further provided the fourth compressed air supply (32) driving a circuit pump (36b) in the secondary circuit (2) and the fifth compressed air supply (46) supplied from the air compressor (14) to drive a brine pump (23). The brine pump (23) is configured to draw the waste product of desalination from the MED plant (40) in the form of brine (39).

The secondary circuit (2) includes the circuit pump (36b), as illustrated in FIG. 4. The circuit pump (36b) drives circulation of the working medium (33) within the secondary circuit (2). The secondary circuit (2) (ORC system) uses a working medium that has a low boiling point such as N-Pentane. Similar to the start-up pump (36a) the circuit pump (36b) is driven by compressed air channelled from the compressor (14) to the circuit pump (36b) via the fourth compressed air supply (32).

The compressed air of the first compressed air supply (13) drives the supply pump (29) (illustrated in FIG. 5 as an air well pump that pumps air into a sea or salt water bore (18) to drive salt water from the salt water bore (at about 20 m to 50 m depth), which is then fed to the desalination plant (40) to supply the fresh water outlet (20) and the brine outlet (21) as two separate outputs. The start-up pump (36a) or similar initiation system kick-starts the primary liquid circuit (1) of the system (101), but once the thermal syphoning process begins there is little to no further requirement for pumping (e.g. zero to negligible energy input to keep the system running).

The circuit pump (36b) keeps the working medium (33) flowing around the second circuit (2), to continually draw cool working fluid (33) through the heat exchanger (30). Heat energy from the heated liquid in the primary liquid circuit (1) is transferred to the working medium (33) in the heat exchanger (30) before continuing around the secondary circuit (2) delivering the heated/vaporised working medium (34) to the turbines (10 10a) to create the mechanical outputs (12, 12a).

Compressed air from the storage tank (37) can be channelled to the start-up pump (36a) and circuit pump (36b) when the system (101) is to be initialised. The pumps (36a, 36b) initiate the circulation of the primary and secondary circuits (1, 2) urging the liquid (3) at ambient surface temperature into the geothermal well annulus (5a) with pump (36a) and drawing the cooled working medium (33) from the desalination plant (40) and pumping it towards the heat exchanger (30) to heat it back up. The pumps (36a, 36b) are air pumps driven off the second compressed air supply (15) and the fourth compressed air supply (32).

The storage tank (37) (not illustrated in FIGS. 4 and 5) can be incorporated into at least one or each of the compressed air supply lines (13,15, 31, 32, 46) to store compressed air for initiation of the system or driving the pumps 36a,46b, 38,48 at start-up. One possible arrangement for the storage tank (37) is shown in FIG. 1.

The secondary circuit (2) passes working medium (33) through the heat exchanger (30) to heat, which turns the working medium (33) to a vaporised heated working medium (34). The heated working medium (34) is then fed to the expander or turbines (10,10a) to generate the mechanical outputs (12, 12a) to drive the generator (47) and compressor (14). No flash separator is required in the primary liquid circuit (1) as the heat exchanger (30) provides the additional heat energy to convert the heated working medium (34) to vapour to drive the turbines (10, 10a).

The heated working medium (34) exits the secondary turbine (10a) at around 95° C. at which time it is directed to the first chamber (42) of the desalination plant (40). As the working medium of the secondary circuit (2) travels through the first chamber (42) it loses heat and drops to temperatures of between 50° C. to 60° C. upon which the working medium (33) is directed back toward the circuit pump (36b). On exiting the pump (36b) the working medium (33) of the secondary circuit (2) is passed back to the heat exchanger (30) to be reheated before repeating the secondary circuit (2) as described.

Illustrated in FIG. 5, the air compressor (14) can supply five compressed air supply lines (13, 15, 31, 32, 46) which operate as described above in relation to the geothermal hydrogen production system (100) and FIGS. 1 and 2. In alternative embodiments of the disclosure, more than five air supply lines can be fed from the compressor (14) to drive additional machines/pumps.

FIG. 6 provides a diagrammatic illustration of the geothermal hydrogen production system (100) more clearly setting out the flash separators (25, 25a) and the routing of the flashed vapour to the respective turbines (10, 10a) and the residual heated liquid (8, 8a) used to recharge the exhaust products (9, 9a) of the turbines (10, 10a).

Typically, the desalination plant (40) will take around 20° C. off the temperature of the heating or primary liquid circuit (1) as it passes through the first chamber (42) of the MED plant (40). The larger the capacity of the MED plant (40) the more heat required from the primary liquid circuit (1). Conversely, the smaller the capacity of the MED plant (40), the less heat required from the primary liquid circuit (1). Accordingly, there is sufficient thermal energy in the heated liquid (4) heated by the geothermal well (5), to power the desalination plant (40), while simultaneously drawing off thermal energy and converting it to mechanical energy to drive the electrical generator (47) and compressor (14) of the system (100).

Figure 8:
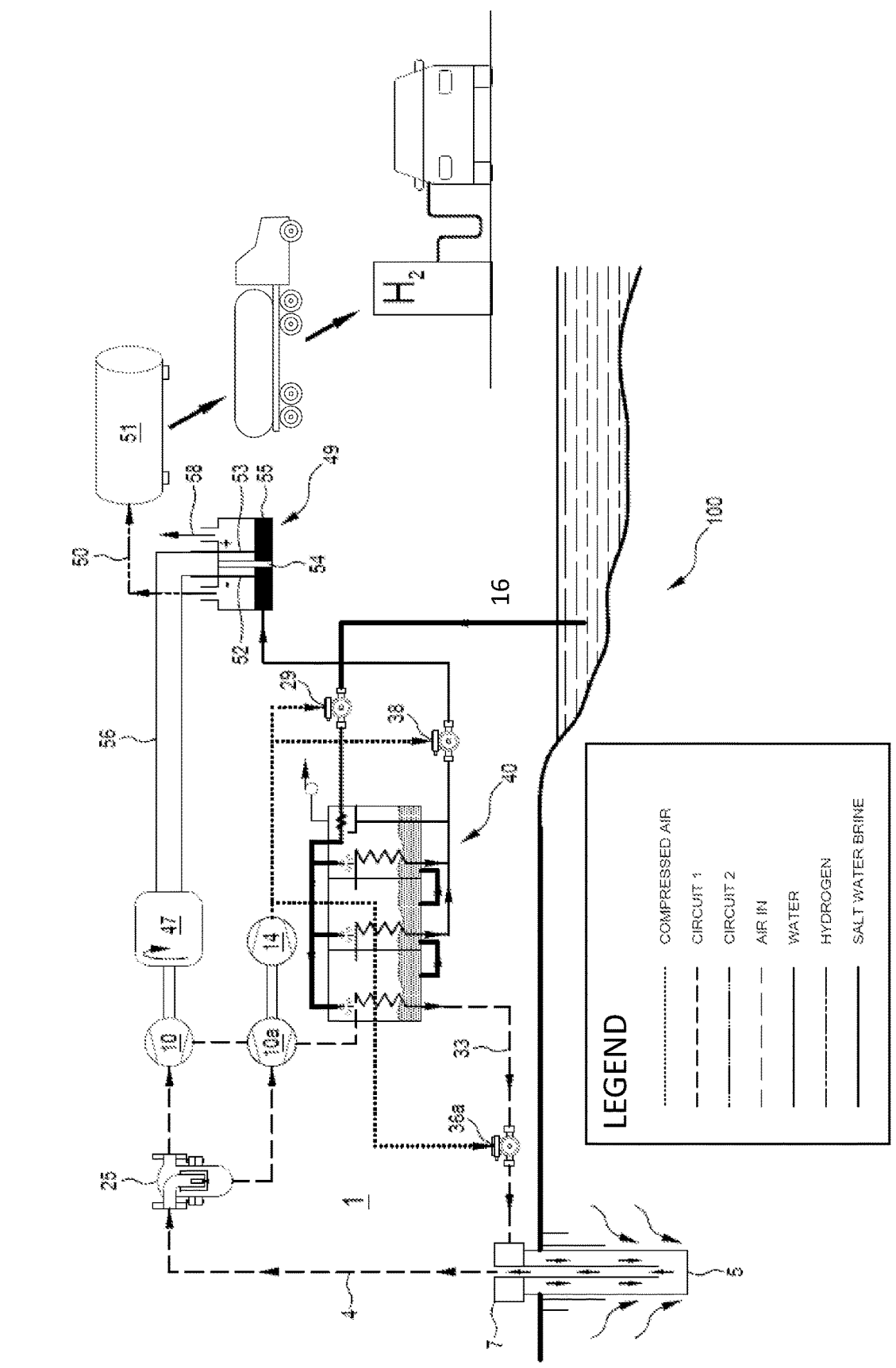
FIG. 8 is a schematic view of a single circuit geothermal hydrogen production plant according to an embodiment of the disclosure, wherein a pair of turbines is drive from the primary circuit.
Figure 9:
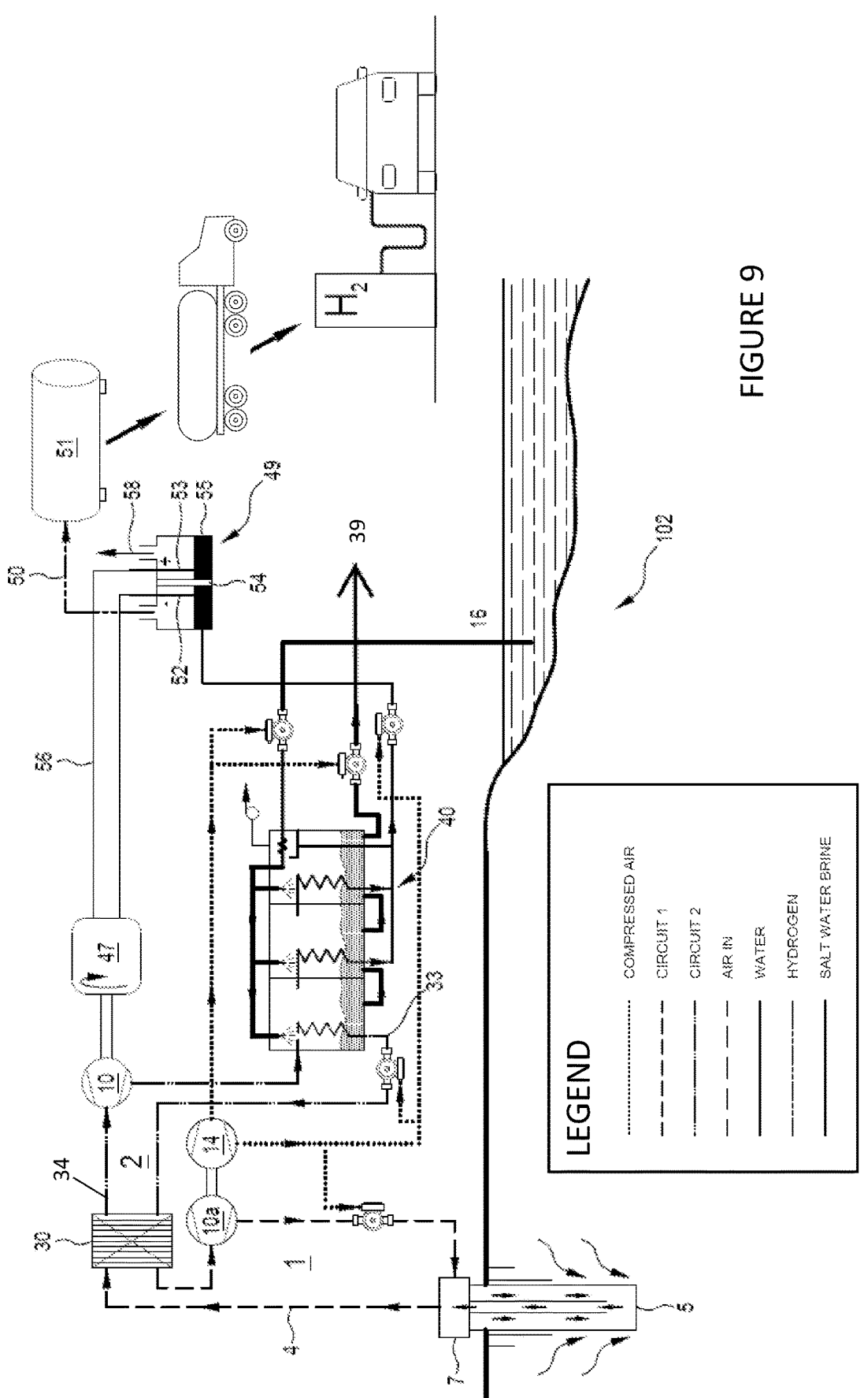
FIG. 9 is a schematic view of a geothermal hydrogen production plant having a secondary or binary circuit according to an embodiment of the disclosure, wherein a first turbine is driven off the secondary circuit and a second turbine is driven off the primary circuit.

The fresh water pump (38) draws the fresh, desalinated, water (19) from the fresh water outlet (20) of the plant (40) and pumps it to the electrolyser (49) to continuously top up an electrolyte solution (55) therein (illustrated in more detail in FIGS. 8 and 9).

The fresh water pump (38) can alternatively be driven: (i) directly by a mechanical output of a supplementary turbine; (ii) by electricity generated by the generator (47); or (iii) by compressed air generated by the compressor (14) driven by the secondary turbine (10a) and the direct drive shaft (12a).

In order to provide power for the additional components of the geothermal hydrogen production system (100) without the requirement for additional electricity, the heated liquid (4) (which can be water) is channelled through the first flash separator (25) where the pressure is reduced in the separator (25) to instantly flash evaporate a portion of the vapour into steam (6); about 10%.

The steam (6) is drawn off the top of the separator (25) to drive the first turbine (10). The turbine (10) is directly linked to the generator (47) which is driven from the mechanical output (12) of the turbine (10). The exhaust (9) of the turbine (10) is recharged by residual heated liquid (8) before being direct to the secondary flash separator (25a) to propel secondary turbine (10a) and thereby drive the compressor (14).

Compressor (14) then feeds the plurality of compressed air supply lines; first compressed air supply (13) to drive the supply pump (29) as described herein; second compressed air supply (15) to drive the start-up pump (36a) to initiate the primary liquid circuit (1) when/if required; third compressed air supply (31) to drive the fresh water pump (38) to supply the electrolyser (49), fourth compressed air supply (32) to drive the circuit pump (36b) of the secondary circuit (2), and fifth compressed air supply (46) to drive the brine discharge pump (48) which pumps brine (bi-products of the desalination process) from the brine outlet (21) out of the plant desalination (40).

Supply pump (29) is illustrated in proximity to the desalination plant (40) in the schematic view of FIG. 6; however, as described herein the supply pump (29) is physically located deep within the salt water bore (18) and can be distanced from the desalination plant (40) by some 10 kms or more.

The ambient air (28) is drawn into the compressor (14) as described above in relation to the systems (100) and (101) in order to supply the vacuum line (24) to the chambers of the desalination plant (40) via the air vacuum pump (22) (not illustrated in FIG. 6).

The depth of the well (5) required for any given geothermal hydrogen production system (100) will depend on the geology of the area. The well depth will be tailored to provide the requisite thermal energy required to feed both turbines (10, 10a), before being introduced to the desalination plant (40) at a sufficient temperature.

Turning now to FIG. 8, there is illustrated the geothermal hydrogen production system (100), comprising the desalination plant (40) and the electrolyser (49) configured as a hydrogen electrolyser, driven by the electrical output from the electrical generator (47).

Electrical power from the generator (47) is transferred via conduits (56) or cables to a cathode (52) and an anode (53) of the electrolyser to set-up an electrical circuit. The circuit transfers electrons from a first, anode, side of the electrolyser (49) to a second, cathode, side of the electrolyser (49).

The two sides of the electrolyser (49) are separated by a diaphragm (54), which along with the anode and cathode, is submersed in electrolyte solution (55) to complete the electrolyser (or electrolysis cell).

As the circuit of the electrolyser (49) is energised, the electrolyte solution (55) which here is water, reacts around the anode (53) producing hydrogen ions (protons) with a positive charge, electrons (with a negative charge) and also oxygen. The oxygen can be drawn off the electrolyser (49) at an oxygen outlet (58) illustrated in FIG. 10.

In a polymer electrolyte membrane electrolyser (a PEM electrolyser), the diaphragm (54) separating the two sides of the cell is a solid, plastic material. As the water is split on the anode (53) side, the protons migrate across the diaphragm towards the cathode (52). At the same time, the electrons flow in the electrical circuit from the anode to the cathode, whereupon the protons combine with the electrons at the cathode (52) to produce hydrogen. The hydrogen is drawn from the electrolyser (49) into a hydrogen line (50) and directed to a tank (51) for storage. The tank (51) can be stationary or transportable.

The reactions on either side of the electrolyser (49) can be written as:

$$2H2O \rightarrow O2+4H^++4e^- \qquad \text{Anode Reaction:}$$

$$4H^++4e^- \rightarrow 2H2 \qquad \text{Cathode Reaction:}$$

It is contemplated that other types of electrolyser (49) could be driven from the systems (100, 101) described herein: for example, solid oxide electrolysers or alkaline electrolysers.

As shown in FIG. 8, the electrolyte solution (55) is constantly topped-up with fresh water (19) from the desalination plant (40) to sustain the hydrogen producing reaction in the electrolyser (49).

The electrical generator (47) preferably generates a DC current and delivers this directly to the cathode (52), negative terminal, and/or anode (53), positive terminal, on the electrolyser (49).

Similar to FIG. 8, FIG. 9 illustrates a geothermal hydrogen production system (102) with additional details of the electrolyser (49), as described above. In contrast to the system (101), the system (102) drives the first turbine from the secondary circuit (2), while the secondary turbine (10a) is driven off the primary liquid circuit (1).

The geothermal hydrogen production system (102) comprises a primary circuit and a secondary circuit, the primary liquid circuit circulating liquid into a geothermal well and returning heated liquid from a well head of the geothermal well, the heated liquid being fed to a heat exchanger to heat a working medium of the secondary circuit, before passing through a desalination plant, wherein the heated working medium of the secondary circuit drives a first turbine to produce a first mechanical output and the heated liquid of the primary circuit drives a second turbine to produce a second mechanical output; and wherein the first mechanical output drives an electrical generator configured to power an electrolyser generating hydrogen via electrolysis of water, and the second mechanical output drives an air compressor to provide at least one of a first, a second and a third compressed air supply, wherein the first compressed air supply drives a supply pump to supply salt water to the desalination plant, the second compressed air supply drives a start-up pump to initiate the primary liquid circuit, and the third compressed air supply drives a fresh water pump to deliver fresh water from the desalination plant to the electrolyser.

In FIG. 9, the secondary turbine (10a) produces the second mechanical output (12a) to drive the compressor (14); however, the second turbine has been relocated to be driven off the primary liquid circuit (1) and not the secondary circuit (2). In the system, (102) of FIG. 9 the first turbine (10) is the only turbine driven off the secondary circuit (2), so all of the geothermal energy imparted to the second circuit is directed to the creation of electricity via the electrical generator (47).

After the primary liquid circuit (1) passes through the heat exchanger (30) there is still sufficient geothermal energy in the primary liquid circuit (1) to drive the secondary turbine (10a) from which the second mechanical output (12a) is drawn. This second mechanical output (12a) is configured to directly or indirectly drive the compressor (14) to charge the plurality of air supply lines (13, 15, 31) within the system (101). In FIG. 9, the compressor (14) is directly driven off a drive shaft from the secondary turbine (10a).

FIG. 9 illustrates the system (102) for producing hydrogen where the pair of turbines (10, 10a) is driven from different circuits. FIG. 9 additionally provides some temperature ranges for different parts of the system (102), as calculated using a well (5) at a depth of about 8,000 m-10,000 m. These temperatures are based on calculations and may be subject to some variance. At the bottom of the well (5) will be temperatures of around 350° C.-500° C., producing water temperatures in the primary liquid circuit (1) of about 200° C.-300° C.

As the working medium exits the turbine (10), the temperature will be between 85° C.-95° C. before entering the first chamber (42) of the desalination plant (40). The optimum medium temperature of the first chamber of the desalination plant is 72° C. As the working medium exits the desalination plant (40) it has dropped in temperature to about 50° C.-60° C.

In the system (102) as shown in FIG. 9 green Hydrogen can be produced without emissions and at very low cost when low-cost geothermal electricity and zero emission distilled water is fed to the hydrogen electrolyser (49).

In this embodiment of the system (102) the lower temperature and lower pressure turbine (10) is physically located within the primary liquid circuit (1) and drives the compressor (14) therefrom. However, the higher temperature and higher pressure first turbine (10) is driven from vapour (or steam) off the heated working medium (34) of the secondary circuit (2).

When using a system having a secondary circuit (2), the lower temp/pressure of the secondary turbine (10a) can be driven either from the secondary circuit (2) (as shown in system (101) of FIG. 4) or from the primary liquid circuit (1) (as shown in system (102) of FIG. 9).

The plan diagrammatically shown in FIG. 9 produces large amounts of hydrogen using the electrolyser (49) and a supply of fresh water (19), distilled and drawn from the desalination plant (40).

Figure 10:
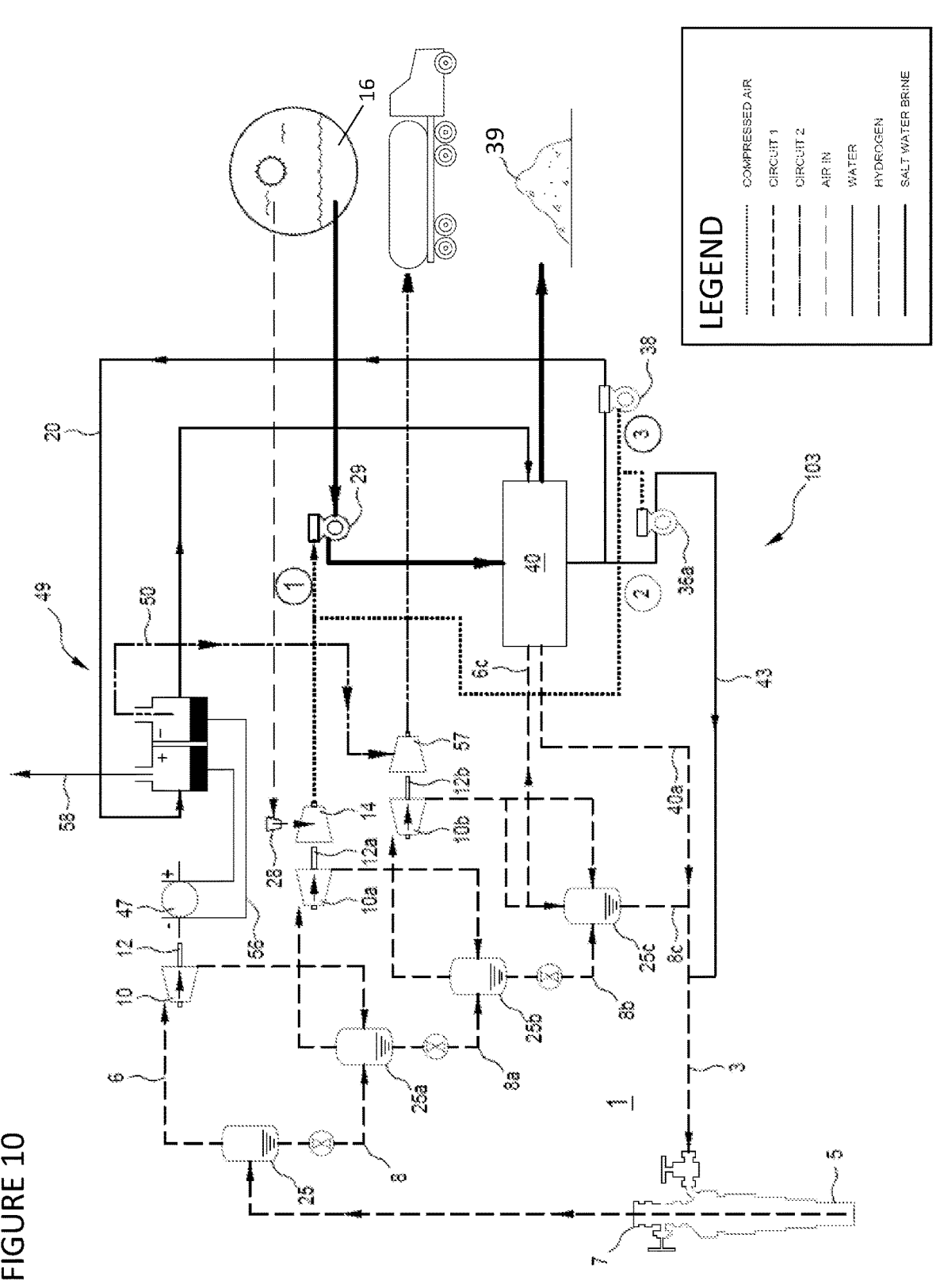
FIG. 10 is a schematic view of a geothermal hydrogen production and compression system according to an embodiment of the disclosure, wherein three turbines are driven off the primary circuit to produce electricity, drive an air compressor and drive a hydrogen compressor with sufficient waste heat to also supply an MED desalination plant.

FIG. 10 is a schematic view of a geothermal hydrogen production and compression system (103) according to one embodiment of the disclosure.

In the system (103) a tertiary turbine (10b) is driven from the primary liquid circuit (1) to produce a tertiary or third mechanical output (12b) from which a compressor (57) is driven. The compressor (57) is in fluid communication with the hydrogen line (50) to compress the hydrogen before being sent to the tank (51) for storage.

While the third mechanical output (12b) drives the compressor (57) to compress hydrogen produced by the electrolyser (49) the primary liquid exhaust (9b) from the tertiary turbine (10b) is fed into the desalination plant (40) at a temperature of approximately 95° C. and exits the final chamber (44) of the desalination plant (40) at approximately 60° C.-70° C. before being re-injected into the geothermal well (5).

The first turbine (10) receives the flashed vapour from the first separator (25), this vapour (6) is the hottest and will provide the greatest energy to drive the electrical generator (47).

As with systems (100-102), the exhaust (9) from turbine (10) is combined back into the primary liquid circuit (1) in system (103) the exhaust (9) thereby reenergised with the saturated steam or residual heated liquid (8) from the first separator (25) before being fed to the secondary separator (25a).

The secondary separator (25a) flashes liquid (medium steam) (6a) which is used to drive the compressor (14) via a secondary mechanical output (12a) from the secondary turbine (10a).

The exhaust (9a) of the secondary turbine (10a) is reinvigorated with the heated residual output (8a) from the secondary separator (25a) before being inputted to a third separator (25b). The heated liquid (4) is flashed to produce a low steam output (6b) and used to drive the tertiary turbine (10b) with in turn powers a hydrogen compressor (57) from a third mechanical output (12b).

The exhaust (9b) from the tertiary turbine (10b) is mixed with the residual heated liquid (8b) from the third separator (25b) before being fed to a fourth separator (25c), the output (6c) of which is fed to the first chamber (42) of the desalination plant (40) at about 95° C.

The residual output (8c) from the fourth separator (25c) is channelled back into the primary liquid circuit (1) and combined with the output (40a) from the desalination plant (40) which is routed back to the well head (7) to be reheated. The primary liquid circuit (1) can also receive fresh water (19) from the top up supply line (43).

According to theoretical calculations, the cooled liquid (3) of the primary liquid circuit (1) will exit the desalination plant (40) to return to the well (5) at a temperature of about 55° C. to 85° C., or hotter if steam is fed to the desalination plant.

The primary liquid circuit (1) can be topped up from the fresh water outlet (20) of the desalination plant (40) where required. The top up supply exits the desalination plant (40) and enters the top-up water supply line (43) to be integrated into the primary liquid circuit (1) from a cold side of the circuit. The newly added fresh water from supply line (43) passes straight to the well head (7) to be heated before circulating the primary liquid circuit (1).

Figure 11:
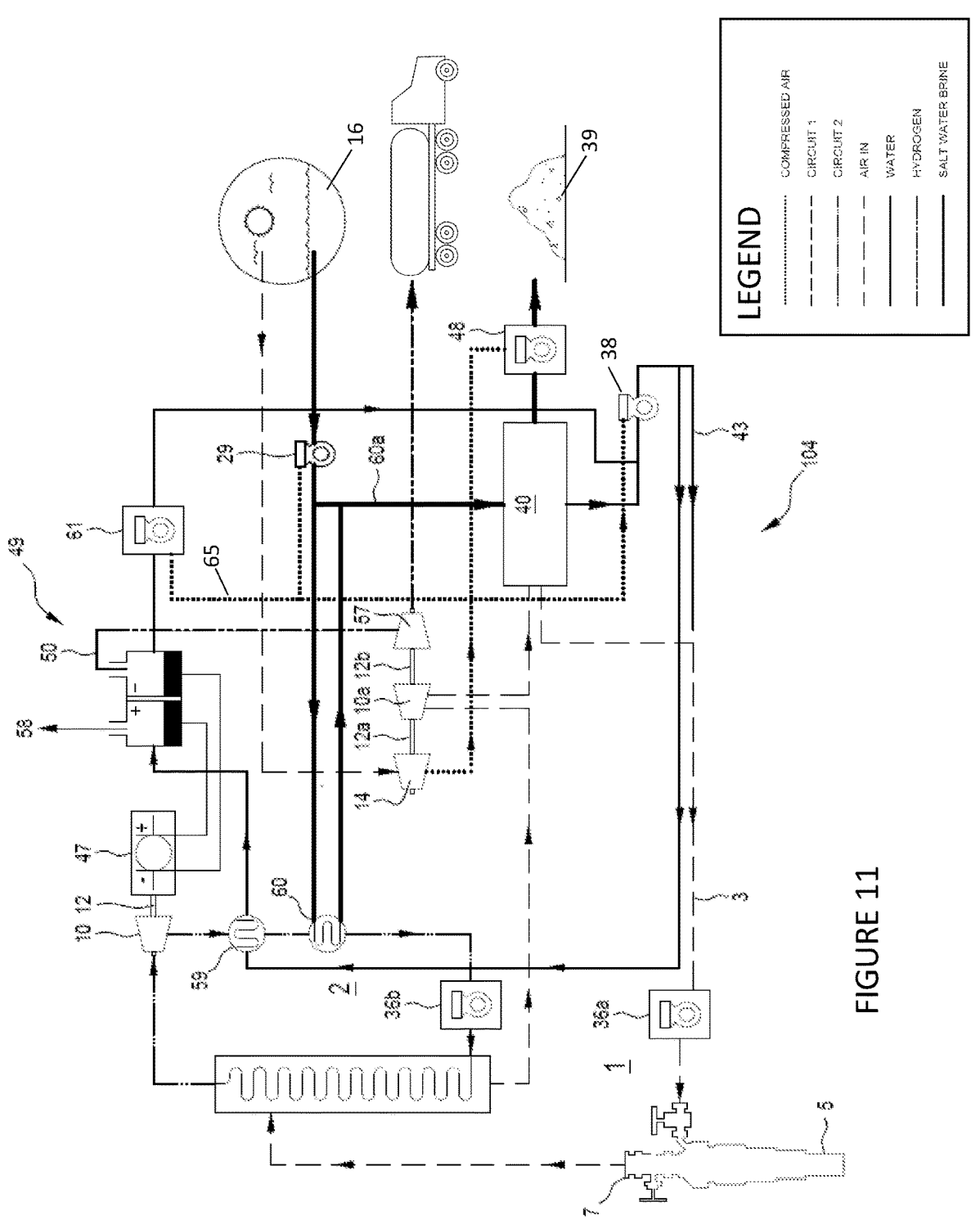
FIG. 11 is a schematic view of a geothermal hydrogen production and compression plant according to one embodiment of the disclosure, wherein a first turbine is driven off a secondary circuit, and an air compressor and a hydrogen compressor are driven off the primary circuit.

In a further contemplated embodiment, the disclosure provides a geothermal hydrogen production and compression system (104) comprising a primary liquid circuit (1) and a secondary circuit (2) illustrated in FIG. 11, for producing and compressing hydrogen.

The geothermal hydrogen production and compression system (104) comprises: a primary liquid circuit (1) and a secondary circuit (2), the primary liquid circuit (1) circulating liquid (3) into a geothermal well (5) and returning heated liquid (4) from a well head (7) of the geothermal well (5), the heated liquid (4) passing through a desalination plant (40) within the primary liquid circuit (1) the heated liquid (4) of the primary circuit (1) passing a heat exchanger (30) to heat a working medium (33) of the secondary circuit, wherein heated working medium (34) of the secondary circuit (2) drives a first turbine (10) to produce a first mechanical output (12) and the heated liquid (4) of the primary circuit drives a second turbine (10a) to produce a second mechanical output (12a); the first mechanical output (12) drives an electrical generator (47), configured to power an electrolyser (49) generating hydrogen via electrolysis of water, and the second mechanical (12a) output drives a first compressor (14) and a second compressor (57), the first compressor (14) configured to compress air and the second compressor (57) configured to compress hydrogen, wherein the first air compressor (14) provides at least one of a first (13), a second (15) and a third (31) compressed air supply, the first compressed air supply (13) driving a supply pump (29) to supply salt water (16) to the desalination plant (40), the second compressed air supply (15) driving a start-up pump (36a) to initiate the primary liquid circuit (1), and the third compressed air supply (31) driving a fresh water pump (38) to deliver fresh water (19) from the desalination plant (40) to the electrolyser (49).

The lower pressure secondary turbine (10a) is configured to drive a series of air pumps (29,36a,38) from compressor (14), and the compressor (57) for compressing hydrogen using the geothermal heat in the primary liquid circuit (1). In the binary system arrangement of FIG. 11, only electricity is generated from the secondary circuit (2). The remainder of the energy for driving additional turbines and compressors comes from the primary liquid circuit (1) after the heat exchanger (30) has drawn sufficient thermal energy from the primary liquid circuit (1) to heat the secondary circuit (2) for electricity generation. In contrast to system (102) illustrated in FIG. 9 where the desalination plant (40) is supplied from the secondary circuit (2), in the system (104) the desalination plant (40) is supplied from the primary liquid circuit (1).

FIG. 11 is to be contrasted to FIG. 9, in that the desalination plant (40) is charged with thermal energy from the second or binary circuit (2) in the system (102). In contrast, the desalination plant (40) of FIG. 11 is charged with geothermal energy from the primary liquid circuit (1). This system (104) is designed for use where the well head (7) temperatures are lower than 250° C. and the primary liquid circuit (1) does not attain a sufficient temperature to drive the first turbine (10) for powering the generator (47) of a first mechanical output (12).

FIG. 11 illustrates a plurality of compressors (14, 57) driven directly off the secondary turbine (10a), whereby compressor (14) is driven off a second mechanical output (12a) and compressor (57) is driven off a third mechanical output (12b). Although the schematic illustration of FIG. 11 shows the two compressors (14, 57) being shaft driven on opposing sides of the secondary turbine (10a) effectively sharing a single shaft (conveying mechanical outputs 12a, 12b), the skilled person will appreciate that there are other physical arrangements whereby a pair of compressors (or more) can be driven from a pair of mechanical outputs (12a, 12b) on a single side of the secondary turbine (10a).

A first of the compressors (14) is configured to compress air and supply the plurality of compressed air supplies (13, 15, 31) that drive the pumps (29, 36a, 38) of the system (104). The system can also include additional air driven pumps, for example: the circuit pump (36b) to assist the circulation of the working fluid in the secondary circuit; the brine discharge pump (48) to pump brine from the desalination plant (40) during distillation of salt water (16); a waste water pump (61) that pumps waste water from the hydrogen electrolyser (49). Each of the aforementioned must can be implemented as air driven pumps, powered from air supply lines fed from the air compressor (14).

The second of the compressors (57) is configured to compress hydrogen and is placed in fluid communication with the hydrogen line (50) collecting hydrogen drawn from the cathode (52) of the electrolyser (49). Once collected and compressed the "green" hydrogen can be transported for sale or use.

This system (104) can also include a fresh water cooling system for the secondary circuit (2). The cooling system is provided in the form of a fresh water condenser (59). The fresh water condenser (59) draws thermal energy from the secondary circuit (2) to cool the second circuit (2) and heat the fresh water (19) distilled from the desalination plant (40) before it is supplied to the electrolyser (49) via a hot fresh water pipe (59a)

The fresh water condenser (59) provides two advantages: (1) it heats the distilled water before delivery to the electrolyser (49) for better hydrogen production efficiency; and (2) it provides a fresh water (low maintenance) cooler and condenser for the secondary circuit (2). The flow of distilled or fresh water (19) from the MED plant (40) through this fresh water condenser (59) is achieved by thermal energy in the primary circuit before the desalination plant.

A secondary salt water or sea water cooler/condenser (60) can also be incorporated into the system (104). This salt water condenser (60) can be activated for additional cooling and condensing of the working medium in the secondary circuit (2) or deactivated when lower levels of electricity generation are required, because lower levels of electricity production require lower levels of cooling/condensing.

The salt water condenser (60) draws thermal energy from the secondary circuit (2) to thereby cool the secondary circuit (2) and heat the salt water (16) before it is supplied to the first chamber (42) of the desalination plant (40) for distillation. The flow of salt or sea water is also achieved by thermal energy.

In this system (104), only one screw expander or secondary turbine (10a) drives both the air compressor (14) and the hydrogen compressor (57) by one single shaft (12a). The compressors (14, 57) can be either side of the secondary turbine (10a) or they can both be on a single side with the drive shaft (12a) passing through the first compressor (14) to drive the second compressor (57).

In the system (104) it is anticipated that the electrolyser (49) will only use a portion of the freshwater (19) produced from the desalination plant (40) and as such, there will be additional fresh water generated for sale.

It is further anticipated, that additional electricity can be generated from the electrical generator (47) which can then also be sold to individual users or back to the grid. In some embodiments, electricity generated from the electrical generator (47) can be used to power one or more of: the supply pump (29); the start-up pump (36a); the circuit pump (36b); the fresh water pump (38); and the brine pump (48).

System (104) is show to draw sea water or salt water (16) from the ocean, however, it is contemplated that the salt water required can also be drawn from a salt water bore (18), or a plurality of salt water bores (18) as described in relation to other embodiments of the disclosure. So too, the geothermal well (5) illustrated in FIG. 11 can be comprised of a plurality of geothermal wells (5) each producing a portion of the required geothermal energy to power the systems (100, 101, 102, 103, 104).

A further hybrid embodiment of the disclosure is contemplated, whereby the system (102) as illustrated in FIG. 9 incorporates a second compressor (57) for compressing hydrogen produced from the electrolyser (49). This embodiment is not illustrated and combines the dual compressors (14, 57) of FIG. 11 with the secondary circuit (2) of FIG. 9, in that the desalination plant (40) is supplied by thermal energy in the secondary circuit (2) and not from the primary liquid circuit (1) as illustrated and described in relation to system (104) of FIG. 11.

This hybrid embodiment of a geothermal hydrogen production and compression system comprises a primary liquid circuit (1) and a secondary circuit (2), the primary liquid circuit (1) circulating a liquid into a geothermal well (5) and returning heated liquid from a well head (7) of the geothermal well (5), the heated liquid of the primary circuit (1) being fed to a heat exchanger (30) to heat a working medium (33) of the secondary circuit (2), the heated working medium passing through a desalination plant (40), wherein the heated working medium (43) of the secondary circuit (2) drives a first turbine (10) to produce a first mechanical output (12) and the heated liquid (4) of the primary liquid circuit (1) drives a secondary turbine (10a) to produce a second mechanical output (12a); the first mechanical output (12) drives an electrical generator (47), configured to power an electrolyser (49) generating hydrogen via electrolysis of water, and the second mechanical output (12a) drives a first compressor (14) and a second compressor (57), the first compressor (14) configured to compress air and the second compressor (57) configured to compress hydrogen, wherein the first compressor (14) supplies a first (13), a second (15) and a third (31) compressed air supply, the first compressed air supply (13) driving a supply pump (29) to supply salt water (16) to the desalination plant (40), the second compressed air supply (15) driving a start-up pump (36a) to initiate the primary liquid circuit (1), and the third compressed air supply (31) driving a fresh water pump to deliver fresh water (19) from the desalination plant (40) to the electrolyser (49).

In a fifth aspect the disclosure provides a method of generating and feeding fresh water (19) to an electrolyser (49) to produce hydrogen, powered by geothermal energy and driven by compressed air, comprising the steps: feeding liquid into a geothermal well (5) and drawing heated liquid (4) from the well head (7) of the geothermal well (5) to form a primary liquid circuit (1), the primary liquid circuit (1) passing through a desalination plant (40) (step 400); communicating the heated liquid (4) from the primary liquid circuit (1) to a first turbine (10) and a secondary turbine (10a) to produce a first mechanical output (12) and a second mechanical output (12a) respectively (step 401); directing the first mechanical output (12) to an electrical generator (47) to power an electrolyser (47) (step 402); and directing the second mechanical output (12a) to an air compressor (14) to produce a first (13), a second (15) and a third compressed (31) air supply (step 403), wherein the first compressed air supply (13) is configured to drive a supply pump (29) located within a salt water bore (18) driving compressed air into the salt water bore below ground level, to drive salt water (16) from the salt water bore (18) to the desalination plant (40) (step 404), the second compressed air supply (15) driving a start-up pump (36a) to initiate the primary liquid circuit (1) (step 405), and the third compressed air supply (31) driving a fresh water pump (38) to drive fresh water (19) from the desalination plant (40) to the electrolyser (47) to be decomposed into green hydrogen and oxygen (step 406).

The geothermal hydrogen production system (100) requires no electricity and uses the thermal syphoning effect for energy requirements to maintain the primary liquid circuit (1) and to deliver salt water (16) to the desalination plant (40). As such, the hydrogen produced from the system can be referred to as "Green hydrogen".

The method of generating and feeding fresh water (19) to an electrolyser (49) to produce hydrogen, powered by geothermal energy and driven by compressed air is described further in relation to FIG. 12.

In some embodiments step 401 delivering heated liquid to the turbines (10,10a) is driven directly off the primary liquid circuit (1). Alternatively, the primary liquid circuit (1) can be configured to communicate the heat energy to a secondary circuit (2) via a heat exchanger (30), where the turbines (10,10a) are then driven off the secondary circuit (2). Alternatively, the first and second turbines (10,10a) can be driven off separate circuits (1, 2). As the generation of electricity requires more geothermal energy that that required to drive a compressor, the electrical generator (47) will preferably be driven from the primary liquid circuit (1) in a single circuit system (100) and driven off the secondary circuit (2) in a binary circuit system (101, 102, 104).

In some embodiments the method further comprises a step of pumping the liquid (3) around the primary liquid circuit (1) via a start-up pump (36a) to initiate circulation of the liquid within the primary liquid circuit (1).

In some embodiments the method further comprises a step of pumping the working medium (33) around the secondary circuit (2) to draw cool working medium (33) from the desalination plant (40) before being communicated back to the heat exchanger (30) to be heated.

In some embodiments the method further comprises a step of pumping the working medium (33) around the secondary circuit (2) while drawing cooled liquid (3) in the primary liquid circuit (1) from the desalination plant (40) before being communicated back to the geothermal well (5) to be re-heated.

The secondary turbine (10a) is thus configured to be driven off the heated liquid (4) or heated working medium (34) of either of the primary liquid circuit (1) or secondary circuit (2) to produce the first mechanical output (12) and the second mechanical output (12a). At least one of the first and the second mechanical outputs can be used to drive at least one compressor (14). At least one of the first and the second mechanical outputs (12, 12a) can be used to drive an electrical generator (47).

It is further contemplated that a tertiary turbine (10b) can be driven off either of the primary liquid circuit (1) or secondary (2) liquid circuits to produce a third mechanical output (12b). The third mechanical output (12b) can be used to drive the compressor (57) which can be arranged to compress at least one of the hydrogen or oxygen outputs from the hydrogen electrolyser (47).

In some embodiments the heated liquid (4) of the primary liquid circuit (1) is circulated through the desalination plant (40) to distil water therein. In other embodiments, the heated working medium (34) of the secondary circuit (2) is circulated through the desalination plant (40) to distil water therein.

In some embodiments the compressed air supply is additionally communicated to supplementary air supplies to drive supplementary pumps. The supplementary pumps (36b, 48, 61) can be configured to maintain pressure in the secondary circuit, or to pump brine from the desalination plant, or to pump waste water from the electrolyser, or to pump oxygen generated from the electrolyser. In some embodiments one or more of the pumps (29, 36a, 38) and supplementary pumps (36a, 48, 61) can be driven from electricity generated from the electrical generator (47). However, excessive electrical draw from the electrical generator (47) will diminish capacity from the electrolyser (49).

Geothermal Ammonia Production System

Figure 13:
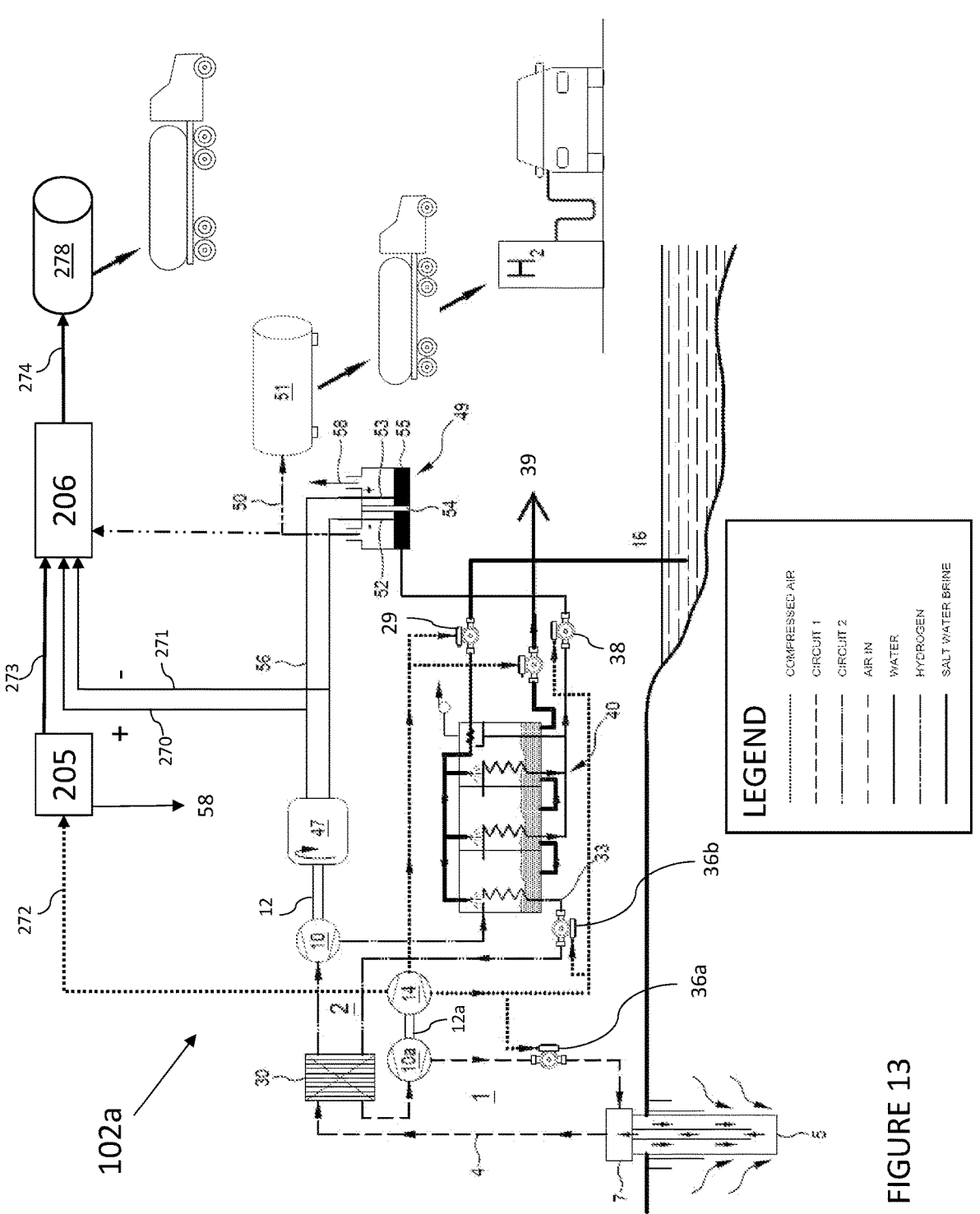
FIG. 13 is a is a schematic view of a geothermal hydrogen and ammonia production plant having a secondary or binary circuit according to an embodiment of the disclosure, wherein a first turbine is driven off the secondary circuit and a second turbine is driven off the primary circuit.
Figure 14:
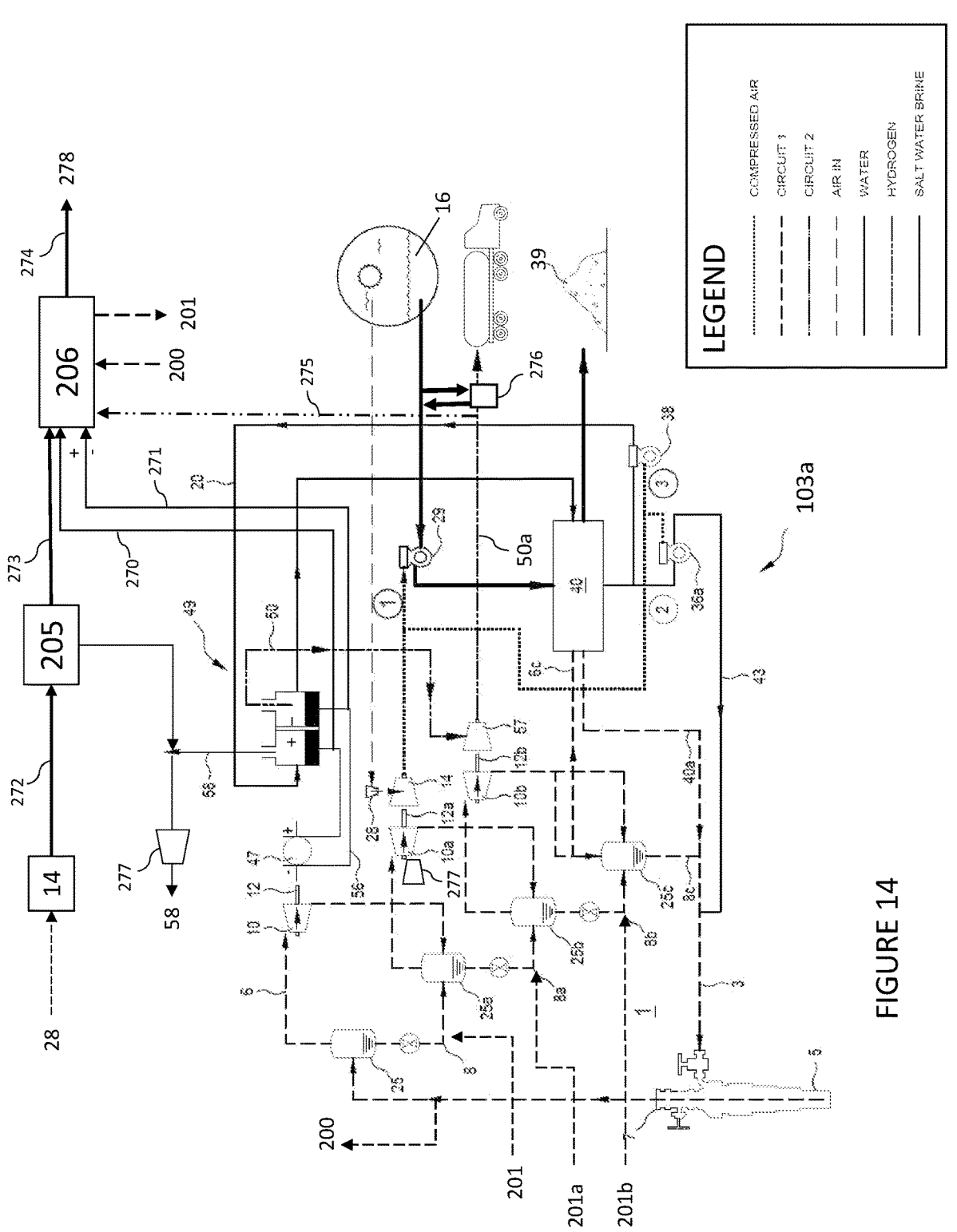
FIG. 14 is a schematic view of a geothermal hydrogen and ammonia production and compression system according to an embodiment of the disclosure, wherein three turbines are driven off a primary circuit to produce electricity, drive an air compressor, a hydrogen compressor and an oxygen compressor with sufficient waste heat to also supply an MED desalination plant.
Figure 15:
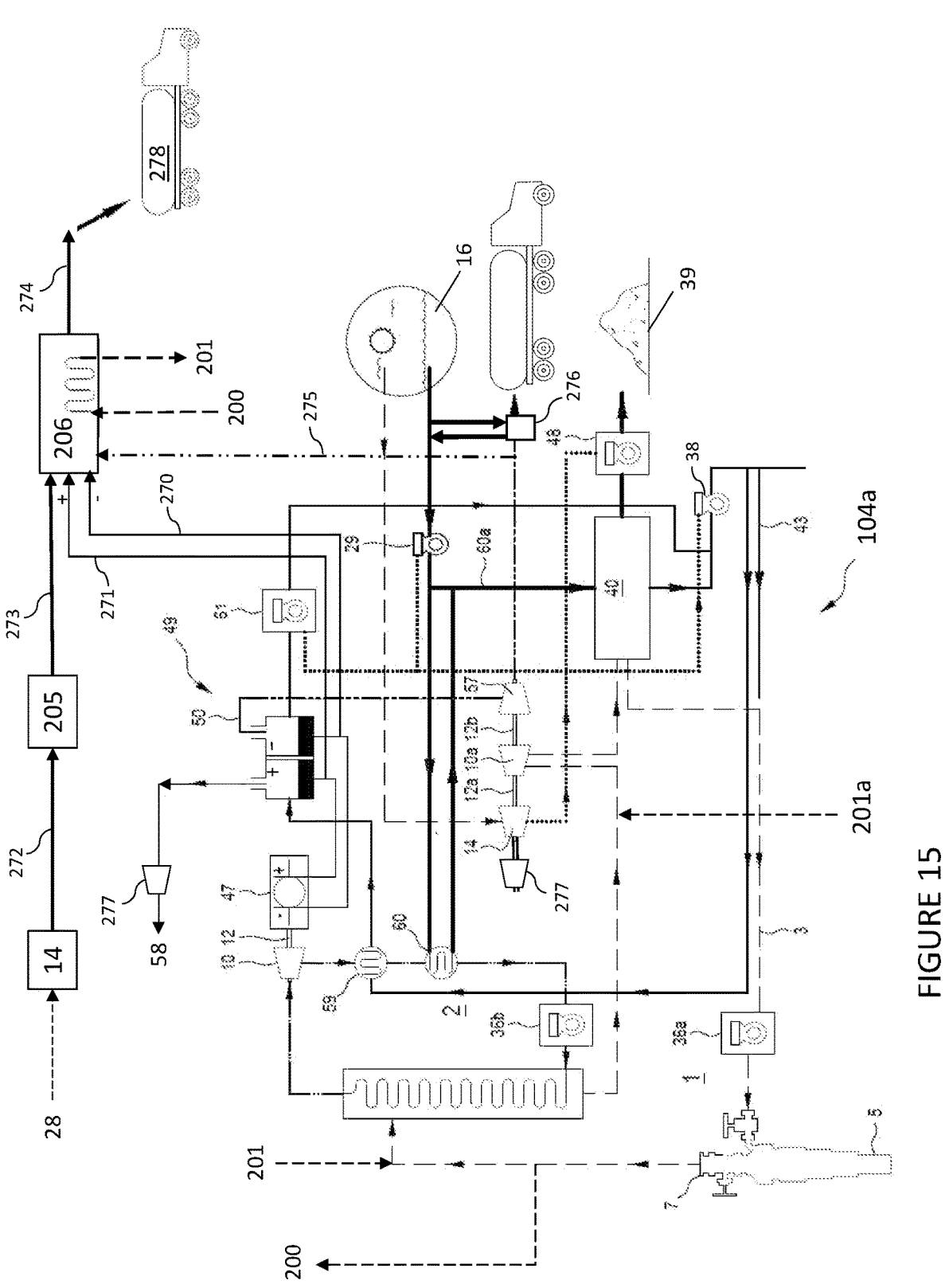
FIG. 15 is a schematic view of a geothermal hydrogen and ammonia production and compression plant according to one embodiment of the disclosure, wherein a first turbine is driven off a secondary circuit to power an electrical generator, and a primary circuit is configured to drive an air compressor, a hydrogen compressor and an oxygen compressor.

In reference to FIGS. 13-15, in still further embodiments of the disclosure, there is provided geothermal ammonia production systems.

FIGS. 13-15 are based on the systems illustrated in FIGS. 9-11, respectively. All features described herein in relation to FIGS. 9-11 (systems 102, 103, 104) are present in the geothermal ammonia production systems (102a, 103a, 104a) as illustrated in FIGS. 13-15. The additional components of FIGS. 13-15 (over FIGS. 9-11) will now be described in detail and their interconnectivity with the aforementioned systems (102, 103, 104).

Referring first to the geothermal ammonia production system (102a) of FIG. 13 (based on the system (102) of FIG. 9). FIG. 13 is a diagrammatic view of a geothermal hydrogen and ammonia production plant having a secondary or binary circuit according to an embodiment of the disclosure, wherein a first turbine is driven off the secondary circuit and a second turbine is driven off the primary circuit.

The geothermal ammonia production system (102a) comprises a primary liquid circuit (1) and a secondary circuit (2), the primary liquid circuit circulating liquid into a geothermal well (5) and returning heated liquid (4) from a well head (7) of the geothermal well, the heated liquid of the primary liquid circuit (1) being fed to a heat exchanger (30) to heat a working medium of the secondary circuit (2), the heated working medium (34) passing through a desalination plant (40), wherein the heated working medium (34) of the secondary circuit drives a first turbine (10) to produce a first mechanical output (12) and the heated liquid (4) of the primary liquid circuit (1) drives a secondary turbine (10a) to produce a second mechanical output (12a), the first mechanical output drives an electrical generator (47), configured to power: (i) an electrolyser (49) generating hydrogen via electrolysis of water; and (ii) an ammonia production plant (206), the second mechanical output drives an air compressor (14) drawing ambient air (28) through a nitrogen plant (205) to separate nitrogen from the ambient air to feed the ammonia production plant (206), wherein any one of the first and second mechanical outputs is configured to drive a supply pump (29) to supply salt water to the desalination plant and drive a freshwater pump (38) to deliver fresh water from the desalination plant (40) to the electrolyser (49). The first and second mechanical outputs can further be config- ured to drive a start-up pump (36*a*) for the primary liquid circuit (1) and a circuit pump (36*b*) to drive the working medium of the secondary circuit (2).

The ammonia production plant (206) may be a Haber-Bosch ammonia production plant but is not limited to the Haber-Bosch process.

While the system (102*a*) in FIG. 13 illustrates a plurality of compressed air lines (13, 15, 31, 32, 46) driving the plurality of pumps (29, 36*a*, 38, 36*b*, 23) respectively, it is further contemplated that any one of more of the pumps (29, 36*a*, 38, 36*b*, 23) can be powered from the electrical output of the generator (47). While this will reduce the available power for running the electrolyser (49) there may be geographical or physical limitations which require one or more air pumps to be substituted for electrically driven pumps. In some embodiments, each of the pumps (29, 36*a*, 38, 36*b*, 23) can be driven from the electrical output of the generator (47).

Air compressor (14) draws ambient air in for compression to drive the pumps (29, 36*a*, 38, 36*b*, 23) and additionally is configured to draw the ambient air into the nitrogen plant (205) via a nitrogen plant air intake line (272). Within the nitrogen plant (205) compressed air is forced through a filter to separate nitrogen and oxygen from the compressed air (the series of filters and nitrogen compressor are not shown in FIG. 14) providing a source of compressed nitrogen to nitrogen line (273). The compression process heats the nitrogen to about 400° C.-600° C. before being delivered to the ammonia production plant (206).

FIG. 13 also illustrates power lines in the form of electrical cables (270, 271) providing electrical power to the ammonia production plant (206) from the generator (47).

As hydrogen is drawn off the electrolyser (49) it is delivered to the tank (51) for transportation or storage and also to the ammonia production plant (206).

Along with the nitrogen supply from the nitrogen line (273), power from the generator (47); and hydrogen from the electrolyser (49), the ammonia production plant (206) requires thermal energy or heat, which is drawn from the primary liquid circuit (1) (as shown in more detail in FIGS. 14 and 15).

An ammonia outtake line (274) communicates the ammonia from the ammonia production plant (206) to a storage tank (278) or tanker for transportation.

It is calculated that an additional 11 kWh/kg of electrical power is required to run the ammonia production system.

The nitrogen plant (205) will also exhaust oxygen) from the ambient air drawn therethrough. The oxygen from the nitrogen plant (205) can be combined with the oxygen drawn from the oxygen outlet (58) of the electrolyser (49) and either stored, sold or reintroduced into the salt water (16) source or reservoir surrounding the plant (205) or system, to re-oxygenate and reinvigorate the environment. This can boost the oxygen levels in the sea or salt water supply (18) and support the local flora and fauna.

More detail of the ammonia production system (102*a*) will be described in relation to systems (103*a*, 104*a*).

Referring next to the geothermal ammonia production system (103*a*) of FIG. 14 (based on the system (103) of FIG. 10). FIG. 14 is a diagrammatic view of a geothermal hydrogen and ammonia production system according to an embodiment of the disclosure, wherein three turbines are driven off the primary circuit to produce electricity, drive an air compressor, a hydrogen compressor and an oxygen compressor with sufficient waste heat to also supply an MED desalination plant.

The geothermal ammonia production system (103*a*) of FIG. 14, comprises: a primary liquid circuit (1) circulating liquid into a geothermal well (5) and returning heated liquid from a well head (7) of the geothermal well (7), the primary liquid circuit (1) passing through a desalination plant (40); a first (10), a secondary (10*a*), and a tertiary turbine (10*b*) driven by the heated liquid (4) to produce a first (12), a second (12*a*) and a third (12*b*) mechanical output; wherein the first mechanical output (12) drives an electrical generator (47), configured to power (i) an electrolyser (49) generating hydrogen via electrolysis of fresh water; and (ii) an ammonia production plant (206), the second mechanical output (12*a*) drives an air compressor (14) drawing ambient air through a nitrogen plant (205) to separate nitrogen from the ambient air to feed the ammonia production plant (206), the third mechanical output (12*b*) is configured to drive a compressor (57) to compress the hydrogen generated by the electrolyser (49) and feed the compressed hydrogen to the ammonia production plant (206); and wherein any one of the first (12), second (12*a*) and third (12*b*) mechanical outputs is configured to drive a supply pump (29) to supply salt water to the desalination plant (40) and drive a freshwater pump (38) to deliver fresh water from the desalination plant (40) to the electrolyser (49).

The system (103*a*) differs to the system (102*a*) shown in FIG. 13, in that the geothermal heat of the primary liquid is contained in a primary liquid circuit (1) and repeatedly flashed to provide the required vapour (6) to drive the first, second and third turbines.

The supply of nitrogen, electrical power and hydrogen to the ammonia production plant (206) is as described above in relation to system (102*a*). To supply the ammonia production plan (206) with thermal energy, a heat source is drawn off the primary liquid circuit (1) at a tapping point (200) before the heated liquid (4) is flashed in separator (25). The heat requirements of the ammonia production process will require the heat source to be drawn directly from the well head (7) before the heated liquid (4) is flashed or directed to a heat exchanger (30). The heated liquid (4) of the primary liquid circuit (1) is communicated to the ammonia production plant (206) as shown in FIG. 14 by an input arrow indicating the tapping point (200) schematically.

Heated liquid (4) from the primary circuit (1) is drawn off at the tapping point (200) at a temperature between 200° C.-400° C. This temperature is to some extent determined by the depth of well (5) and the thermal gradients therein. The amount of liquid diverted from the primary liquid circuit (1) at tapping point (200) can be anywhere from 1% to 20% of the total flow, but is preferably taken from primary circuit (1) before power production. Taking thermal energy form the primary liquid circuit (1) at the initially high temperatures exiting the well head (7) will lower the temperature at the turbine inlets which will result in less electricity production from generator (47). However, this is still a more efficient process than using electricity from the generator (47) for the heating of the ammonia plant (206).

The heated liquid (4) is exhausted from the ammonia production plant (206) and channelled back into the primary liquid circuit (1) at a reinjection point (201). The reinjection point (201) is shown schematically in FIG. 14 leaving the ammonia production plant (206) and feeding heated liquid (4) exhausted from the ammonia production plant (206) back into the primary liquid circuit (1) after the flash separator (25): into the residual heated liquid (8) output from the separator (25). The temperature of the liquid (4) exiting the plant (206) to reinjection point (201) will be between 150° C. and 300° C. This temperature will depend on the flow rate of the heated liquid (4), which is determined by the amount of ammonia being produced. This heated liquid (4) is thus re-introduced into the geothermal closed primary liquid circuit (1) before the heat from the primary liquid circuit (1) is used for desalination.

A second optional location for reinjection point (201a) to the primary circuit (1) is into the residual heated liquid (8a) exhausted from the second separator (25a) at the inlet of the third separator (25b). The reinjection point (201a) into the primary liquid circuit (1) can be used if the ammonia production level is increased and more heat is taken from the heated liquid (4) going through the ammonia plant (206). If the temperature of the heated liquid (4) coming out of the ammonia plant (206) is reduced to around 200° C., then the reinjection point (201a) is located before the third separator (25b) and before the heat from the primary liquid circuit (1) is used for desalination.

A third optional location for reinjection point (201b) to the primary liquid circuit (1) is into the exhaust (8b) from the third separator (25b) at the inlet of the fourth separator (25c). The reinjection point (201b) into the primary liquid circuit (1) can be used if the ammonia production level is increased and more heat is taken from the heated liquid (4) going through the ammonia plant (206). If the temperature of the heated liquid (4) coming out of the ammonia plant (206) is reduced to around 150° C., then the reinjection point (201b) is located before the fourth separator (25c) before the heat from the primary liquid circuit (1) is used for desalination.

The reinjection points (201, 201a, 201b) are optional and can be varied depending on the ammonia production levels. The reinjection of the exhausted liquid (4) back into the primary liquid circuit (1) will not adversely affect the output of the separators (25a, 25b, 25c) as the reinjection point (201, 201a, 201b) are selected such that the exhaust (201, 201a, 201b) from the ammonia plant (206) is returned to the primary liquid circuit (1) at a corresponding temperature to that of the heated liquid (4) in the primary liquid circuit (1). As such, the reinjection points (201, 201a, 201b) for the exhausted liquid from the ammonia production plant (206) will combine with the heated liquid (4) at a similar temperature in the primary liquid circuit (1): the lower the exhausted liquid temperature from the ammonia production plant (206), the cooler the temperature at the reinjection point into the primary liquid circuit (1) after the one or more processes have extracted heat energy for power generation and pumping etc.

Additionally to FIG. 13, the system (103a) comprises a hydrogen cooler (276). When the hydrogen is compressed by compressor (57) the hydrogen is increased in temperature upward of 400° C. (and up to 600° C.). The hotter the hydrogen and nitrogen, the better the ammonia synthesis process in the ammonia production plant (206). Additionally, less pressure is required if the temperature of the incoming gases is hotter.

The heated, compressed, hydrogen is fed to the ammonia production plant (206) via a heated hydrogen line (275) but needs to be cooled for storage or transportation. A simply valve arrangement can be added to the heated hydrogen line (275) to allow the supply of hydrogen to the ammonia production plant (206) to be initiated or halted. The hydrogen cooler (276) is a water cooler and is charged with sea water (salt water) (16) being drawn by supply pump (29) en route to the desalination plant (40). The hydrogen to be delivered via the heated hydrogen line (275) to the ammonia production plant (206) is drawn from the compressed hydrogen line (50a) before entering the hydrogen cooler (276).

As the heated hydrogen in the heated hydrogen line (275) is already at a high temperature the additional heat source (200) can be reserved as an optional heat source, where additional thermal energy is required by the ammonia production plant (206). Drawing thermal energy out of the primary liquid circuit (1) before the separator (25) will reduce the capacity for electrical power generation of the system (103a).

System (103a) illustrates an additional oxygen compressor (277), which can be added to system (102a) but is not illustrated in FIG. 13. The oxygen compressor (277) compresses the oxygen (58) drawn from the electrolyser (49) and can additionally be fed from an exhaust of the nitrogen plant (205).

For clarity, oxygen compressor (277) is illustrated twice in FIG. 14, although it is the same compressor. The oxygen compressor (277) is driven off the second mechanical output (12a) from the secondary turbine (10a). This is a dual compressor arrangement (14, 277) driven by secondary turbine (10a). It will be appreciated by persons skilled that numerous configurations can be used to drive two compressors from one turbine, and the disclosure is not to be limited to the schematic illustration of FIG. 14.

Not illustrated in FIG. 14, it is further conceived that the oxygen compressor (277) can be driven from tertiary turbine (10b) using the third mechanical output (12b) to power both the oxygen and hydrogen compressors of the system (103a). In a still further embodiment of the system (103a) electrical power from the generator (47) can be used to drive the oxygen compressor (277) noting that this will diminish the electrical power available to other parts of the system (103a).

When using compressed air supplies from the compressor (14) to drive the pumps (29, 36a, 38, 36b, 23) the system will direct maximum thermal energy to the production of electricity via the generator (47). However, it is understood that the system can be tailored in many ways to best utilise the thermal energy from the geothermal well (5). The use of compressed air to deliver nitrogen, hydrogen, oxygen and water to various parts of the system (103a) provides the most efficient operating mode. By diverting electrical energy from the hydrogen production process in the electrolyser, hydrogen production is far less efficient but still a "green" hydrogen production process, as the geothermal energy provides the electricity, but will not be as efficient as using the waste thermal energy from the primary liquid circuit (1) to drive the peripheral pumping processes. It is calculated that the pumping, cooling and compressing processes within the system (103a) could require as much as 100 kWh, which if drawn from the generator (47) would reduce the power to both the electrolyser (49) and ammonia production plant (206).

Referring to the geothermal ammonia production system (104a) of FIG. 15 (based on the system (104) of FIG. 11). FIG. 15 is a schematic view of a geothermal hydrogen and ammonia production plant according to one embodiment of the disclosure, wherein a first turbine is driven off a secondary circuit to power an electrical generator, and a primary circuit is configured to drive an air compressor, a hydrogen compressor and an oxygen compressor.

The system (104a) comprises a primary circuit (1) and a secondary circuit (2), the primary liquid circuit circulating liquid (3) into a geothermal well (5) and returning heated liquid (4) from a well head (7) of the geothermal well (5), the heated liquid (4) passing through a desalination plant (40) within the primary liquid circuit (1), the heated liquid of the primary circuit (1) passing a heat exchanger (30) to heat a working medium (33) of the secondary circuit (2), wherein heated working medium (34) of the secondary circuit (2) drives a first turbine (10) to produce a first mechanical output (12) and the heated liquid (4) of the primary circuit (1) drives a secondary turbine (10a) to produce a second mechanical output (12a); the first mechanical output (12) drives an electrical generator (47), configured to power (i) an electrolyser (49) generating hydrogen via electrolysis of water; and (ii) an ammonia production plant (206), and the second mechanical output (12a) drives a first air compressor (14) and a second hydrogen compressor (57), the first compressor (14) configured to draw ambient air through a nitrogen plant (205) to separate nitrogen from the ambient air to feed the ammonia production plant (206), and the second compressor (57) configured to compress the hydrogen generated by the electrolyser (49) and feed the compressed hydrogen to the ammonia production plant (206), wherein any one of the first (12) and the second (12a) mechanical outputs is configured to drive a supply pump (29) to supply salt water to the desalination plant (40), and a fresh water pump (38) to deliver fresh water from the desalination plant (40) to the electrolyser (49).

Within system (104a) both the desalination plant (40) and second mechanical output (12a) are driven from the thermal energy in the primary liquid circuit (1). The second turbine (10a) is illustrated in FIG. 15 to drive three compressors: air compressor (14), hydrogen compressor (57); and oxygen compressor (277). The air compressor (14) is configured to provide a plurality of compressed air supplies (13, 15, 31, 32, 46) to drive the pumps (29, 36a, 38, 36b, 23) of the system (104a). However, as previously described herein, any one of more of the pumps (29, 36a, 38, 36b, 23) can also be electrically driven from the generator (47).

In system (104a) the heated liquid (4) is drawn off at tapping point (200) drawn directly from the well head (7) and reintroduced into the primary circuit at the reinjection point (201), wherein both the tapping point (200) and reinjection point (201) are located before the heated liquid (4) enters the heat exchanger (30).

An optional secondary reinjection point (201a) is also illustrated in FIG. 15, located after the heated liquid (4) in the primary liquid circuit (1) exits the heat exchanger (30) and before the heated liquid (4) is introduced into the desalination plant (40).

As described herein, the reinjection point (201, 201a) for the exhausted liquid from the ammonia production plant (206) will combine with the heated liquid (4) at a similar temperature in the primary liquid circuit (1): the lower the exhausted liquid temperature from the ammonia production plant (206), the cooler the temperature at the reinjection point into the primary liquid circuit (1) after the one or more processes have extracted heat energy for power generation and pumping etc.

A hydrogen cooler (276) is also incorporated into system (104a) to cool the hydrogen in the compressed hydrogen line (50a) which can be over 500° C. As described in reference to FIG. 14, the hydrogen cooler (276) is a water cooler and is charged with sea water or salt water (16) being drawn by supply pump (29) toward the desalination plant (40). The hydrogen to be delivered via heated hydrogen line (275) to the ammonia production plant (206) is drawn from the compressed hydrogen line (50a) before entering the hydrogen cooler (276).

As described herein in relation to FIG. 11, the system (104a) also provides a fresh water cooling system for the secondary circuit (2). The cooling system is provided in the form of a fresh water condenser (59). The fresh water condenser (59) draws thermal energy from the secondary circuit (2) to cool the secondary circuit (2) and heat the fresh water (19) distilled from the desalination plant (40) before it is supplied to the electrolyser (49) via a hot fresh water pipe (59a).

The fresh water condenser (59) heats the distilled water before delivery to the electrolyser (49) for better hydrogen production efficiency and provides a fresh water (low maintenance) cooler and condenser for the secondary circuit (2). The flow of distilled or fresh water (19) from the MED plant (40) through this fresh water condenser (59) is achieved by thermal energy in the primary liquid circuit (1).

As described herein in relation to FIG. 11, the system (104a) also provides a secondary salt water condenser (60). The salt water condenser (60) can be activated for additional cooling and condensing of the heated working medium (34) in the secondary circuit (2) or deactivated when lower levels of electricity generation are required, because lower levels of electricity production require lower levels of cooling/condensing.

The salt water condenser (60) draws thermal energy from the secondary circuit (2) to thereby cool the secondary circuit (2) and heat the salt water (16) before it is supplied to the desalination plant (40) for distillation. The flow of sea or salt water (16) is also achieved by thermal energy.

It is further contemplated that an additional pump can be added to anyone of the systems (102a, 103a, 104a) to compress the ammonia output from the ammonia production plant (206). This pump (not illustrated in FIGS. 13-15, can be driven by compressed air from the compressor (14) or from electrical power from the generator (47).

While the nitrogen plant (205) is described herein as separating nitrogen from ambient air, it is also contemplated that the nitrogen could be extracted from water to supply the ammonia production plant (206).

While the ammonia production plant (206) is described herein as being a Haber-Bosch process plant, it is contemplated that alternative methods of ammonia production could be driven from the geothermal energy of the well using the systems as described herein.

Figure 16:
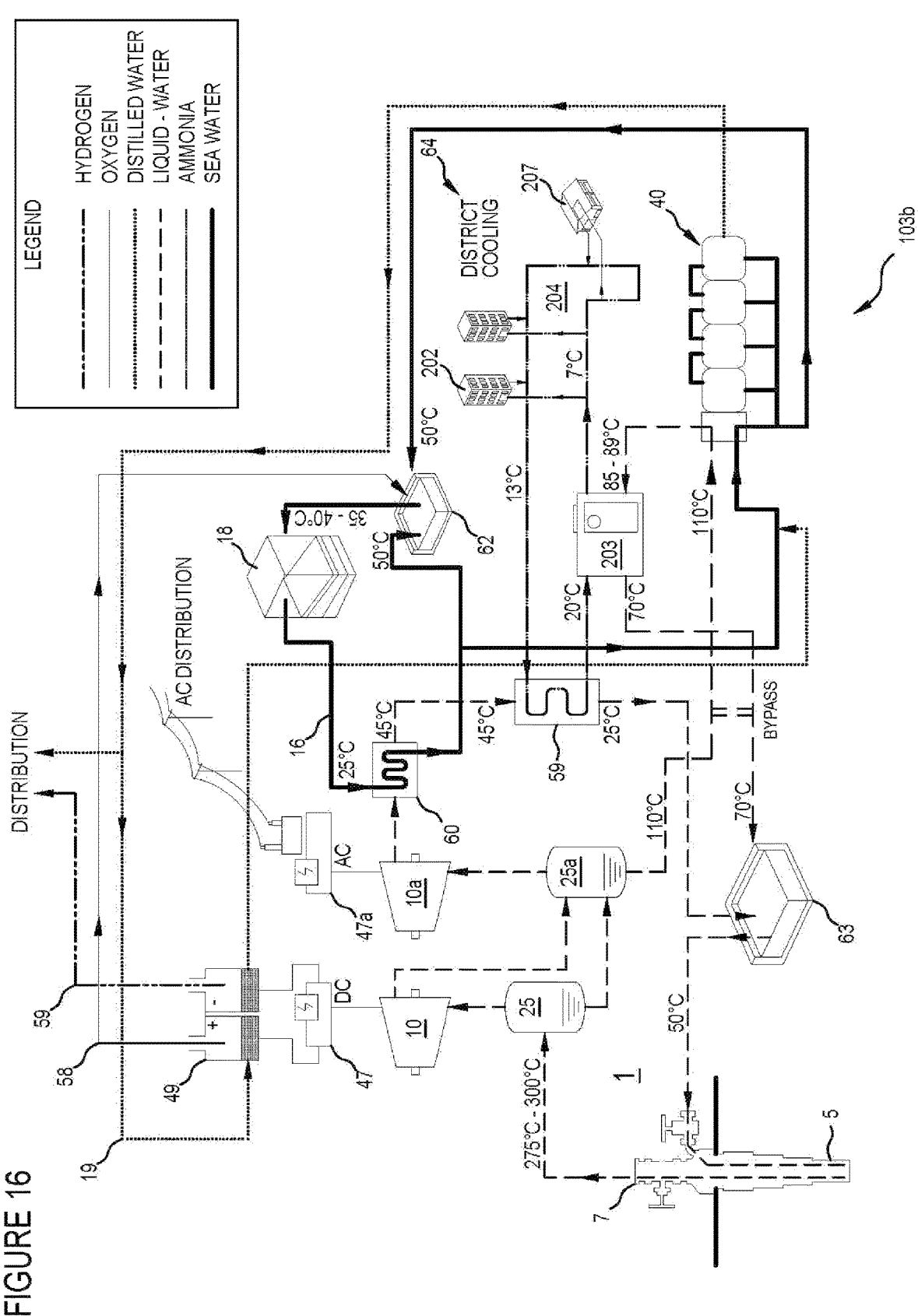
FIG. 16 is a schematic view of a geothermal hydrogen production system according to one embodiment of the disclosure, utilising a district cooling system to cool the primary liquid circuit.

Referring to the geothermal ammonia production system (103b) of FIG. 16 (based on the system (103a) of FIG. 14). FIG. 16 is a schematic view of a geothermal hydrogen and ammonia production plant according to one embodiment of the disclosure, wherein a district cooling system (64) and cooling ponds (62, 63) have been arranged to provide additional cooling to the system (103a).

The system (103b) comprises: a primary liquid circuit (1) circulating liquid into a geothermal well (5) and returning heated liquid (4) from a well head (7) of the geothermal well (5), the primary liquid circuit (1) delivering thermal energy to a desalination plant (40); and a first (10) and a second turbine (10a) driven by the heated liquid (4) to produce a first mechanical output (12) and a second mechanical output (12a), wherein the first mechanical output (12) drives an electrical generator (47), configured to power an electrolyser (49) generating hydrogen via electrolysis of fresh water, and the second mechanical output (12a) drives a second electrical generator (47a) configured to provide electrical power to a power grid, and a cooling circuit (204) in connection with the district cooling system (64), the cooling circuit (204)

comprising an chiller (203) driven from residual thermal energy of the primary liquid circuit (1). The chiller (203) can be an absorption chiller.

The first electrical generator (47) is preferably a DC generator and will be primarily used to power the electrolyser (49). In some embodiments of the system (103b) power from the DC generator (47) can also be used to power pumps and compressors within the system (103b) for example: to initiate the primary liquid circuit (1); to pump saltwater to the desalination plant (40); to compress the hydrogen from the electrolyser (49); and to pump freshwater from the desalination plant (40) to the electrolyser (49).

The second electrical generator (47a) is preferably an AC generator configured to feed additional electrical energy straight back into the local energy grid. This provides an additional commercial revenue stream to the system (103b).

In some embodiments, the system (103b) further comprises a compressor (14) driven off any one of the first (12) and second (12a) mechanical outputs to supply at least one compressed air supply configured to drive a supply pump (29) supplying salt water to the desalination plant (40). A further compressed air supply can be drawn from the compressor (14) to drive the freshwater pump (38) to deliver fresh water from the desalination plant (40) to the electrolyser (49). A further compressed air supply can be drawn from the compressor (14) to drive a hydrogen compressor (57) to compress the hydrogen produced by the electrolyser (49) for storage or transportation. A further compressed air supply can be drawn from the compressor (14) to drive a start-up pump (36a) to initiate circulation of the liquid of the primary liquid circuit (1).

The residual thermal energy from the primary liquid circuit (1) is taken from the circuit (1) after processes like, electricity production, pumping, compression and desalination plant (40) have extracted heat. The residual temperature in the primary liquid circuit (1) is sufficient to feed the chiller (203) as a heat source to generate low cost cooling.

The system (103b) can be configured to integrate with the district cooling system (64) to service buildings (202) in the vicinity of the system. In this manner the system (103b) can be configured to cool office space or private residences (207) from the waste heat from the primary liquid circuit (1) further cooling the liquid of the primary liquid circuit (1) and propagating the thermal siphoning effect.

A further advantage of the system (103b) as fed by waste or exhausted thermal energy from the primary liquid circuit (1) is that the majority of the cooling water required to maintain the thermal siphoning effect, can be used to generate income in the form of sales of thermal energy as district cooling. A portion of the water in the cooling circuit (204) at 7° C. is routed to cool the primary liquid circuit (1). The additional cooling improves the efficiency of the power generation by reducing the sea water cooling flow requirement and increasing the energy production from the turbines (10, 10a) due to a cooler exhaust temperature.

The system (103b) can additionally comprise a series of cooling ponds, for example a salt water cooling pond (62) and a freshwater cooling pond (63). While heating the saltwater before desalination will improve the fresh water production efficiency of the desalination plant (40) it is preferable that any saltwater discharged back into the ocean is not at elevated temperatures.

The freshwater cooling pond (63) is incorporated into the fresh water (19) circuit of the system, receiving warm or hot liquid (around 70° C.) from the chiller (203) and cooler water (around 25° C.) from the freshwater condenser (59) to allow the combined freshwater sources to cool to a combined temperature of about 50° C. before being drawn back into the geothermal well (5) of the primary liquid circuit (1).

The incorporation of the district cooling system (64) will not have an effect on the efficiency of the hydrogen or the ammonia production capabilities of the system (130b). However, it will have a positive effect on the efficiency of the steam turbines (10, 10a). As such, there is provision to increase the quantity of electricity generation from the system (103b) hence the addition of a secondary electrical generator (47a) and this will in turn have a positive effect on the quantity of hydrogen produced due to the additional electricity available for electrolysis in the electrolyser (49).

The desirable feed temperature to the chiller (203) is between 85° C.-95° C. This is compared to the desirable feed temperature for the desalination plant (40) which is about 110° C., wherein the exhausted heat in the primary liquid circuit (1) exiting the desalination plant can then be fed to the chiller (203) for further heat extraction.

The salt water cooling pond (62) is incorporated into the salt water (16) circuit of the system, receiving warm or hot saltwater (around 50° C.) from the desalination plant (40) and warm or hot saltwater (around 50° C.) from the saltwater condenser (60) to allow the combined saltwater sources to cool to a combined temperature of about 35° C.-40° C. before being fed back to the ocean or alternative seawater source. This configuration will importantly reduce the amount of sea water needed for cooling the system (103b) via the salt water condenser (60) which can become an important consideration where sea water discharge volumes may limit expansion. The salt water cooling/evaporation ponds (62) can also be used to produce sea salt; providing significantly reduced costs when compared to current methods of solar pumping to deliver sea water and brine to evaporation ponds.

The chiller (203) can be an absorption chiller, a centrifugal chiller, or a helical-rotary chiller. In one embodiment, the chiller (203) is an absorption chiller using an absorption refrigeration cycle as opposed to a mechanical compressor and configured to run on waste thermal energy from the system (103b) thereby providing cooling to HVAC systems of local buildings (202). The term HVAC is understood to refer generally to Heating, Ventilation and Cooling systems. The term "absorption" chiller refers to the ability of the chiller to provide a cooling effect by absorbing heat from a first fluid and transferring the heat to a second fluid.

The absorption chiller (203) requires a high-temperature energy source, for example heated liquid (4) from the primary liquid circuit (1) to drive the absorption cooling cycle, using: evaporation; absorption; and regeneration. The heat from the primary liquid circuit (1) is used in an evaporator to boil the ammonia refrigerant in the chiller (203) to form an ammonia vapour. The ammonia vapour is introduced to an absorbant (eg. water) in an absorber, which absorbs the ammonia forming a strong, concentrated ammonia solution. The concentrated ammonia solution is again heated to separate the ammonia from the absorbant and form a pure, high-pressure ammonia vapour that flows to a condenser. In the condenser the hot ammonia vapour is drawn through pipes, heating the outer surface of the piping. These pipes are placed in contact with cool air or water (extracting the heat from the hot surface of the pipes) and converting the ammonia vapour back to a liquid to be returned to the evaporator.

Using ammonia refrigerant in the chiller (203) offers a number of benefits over alternatives, in that it has an ozone depletion rating of zero. It is also a naturally occurring substance and has a global warming potential of <1. Typically, the costs of using an absorption chiller to provide cooling for the primary liquid circuit (1) would not be commercially viable; however, the system (103*b*) provides opportunities for generating income from at least 50% of the cooling capacity, which makes it viable to use residual system heat as energy generation cooling. The required ammonia for the chiller (203) can also be sourced from the system (103*b*) ammonia output.

The chiller (203) is an integral part of the cooling circuit (204), which circulates a heat transfer medium (such as water) between the fresh water condenser (59), the chiller (203), and evaporators of the buildings (202) or private residences (207). Referring to FIG. 16, the cooling circuit (204) is a closed circuit, keeping the heat transfer medium contained therein. As the heat transfer medium flows to the absorption chiller (203) the heat transfer medium is chilled from about 20° C. to about 7° C.

The chilled heat transfer medium then flows to one or more evaporators of the air conditioning systems of the buildings (202) or private residences (207) connected to the district cooling system (64). The chilled heat transfer medium flows through the building's evaporators where warm or hot air from the buildings (202, 207) is drawn across the evaporators (typically by fans) cooling the air and raising the temperature of the heat transfer medium back up to about 13° C.

The warmed heat transfer medium then flows to the fresh water condenser (59) where heat is exchanged between the freshwater circuit and the cooling circuit (204) reducing the temperature of the freshwater from about 45° C. to about 25° C. and increasing the temperature of the heat transfer medium from about 13° C. to about 20° C.

Thermal energy (heat) is inputted to power the chiller (203) from the primary liquid circuit (1), the heated liquid (4) flowing into the chiller (203) at about 85° C.-95° C. and the heated liquid (4) outputted from the chiller (203) reduced to a temperature of about 70° C.

The heat transfer medium of the cooling circuit (204) can also contain corrosion inhibitors to reduce corrosion to the piping of the cooling circuit (204).

It will be appreciated by persons skilled in the art that numerous variations and modifications may be made to the above-described embodiments, without departing from the scope of the following claims. The present embodiments are, therefore, to be considered in all respects as illustrative of the scope of protection, and not restrictively.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

As used herein and in the appended claims, the singular form of a word includes the plural, unless the context clearly dictates otherwise. Thus, the references "a," "an" and "the" are generally inclusive of the plurals of the respective terms. For example, reference to "a feature" includes a plurality of such "features." The term "and/or" used in the context of "X and/or Y" should be interpreted as "X," or "Y," or "X and Y.

It is to be understood that, if any prior art publication is referred to herein, such reference does not constitute an admission that the publication forms a part of the common general knowledge in the art, in Australia or any other country.

In the claims which follow and in the preceding description of the disclosure, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the disclosure.

| LEGEND | | | |
| --- | --- | --- | --- |
| No. | Description | No. | Description |
| 100 | Geothermal hydrogen production system | 103 | Geothermal hydrogen production and compression system |
| 101 | Geothermal hydrogen production | 104 | Geothermal hydrogen production and compression system having a binary circuit |
| 102 | system having a binary circuit | | |
| 1 | Primary liquid circuit | 54 | Diaphragm |
| 2 | Secondary liquid circuit | 55 | Electrolyte solution |
| 3 | Primary liquid - water | 56 | Power supply |
| 4 | Heated water | 57 | Hydrogen compressor |
| 5 | Geothermal well | 58 | Oxygen out |
| 6 | Steam | 59 | Fresh water condenser |
| 7 | Well head | 60 | Salt water condenser |
| 8 | Residual heated liquid | 61 | Waste water pump |
| 9 | Turbine exhaust fluid | 62 | Cooling pond - Seawater |
| 10 | Turbine | 63 | Cooling pond - Freshwater |
| 12 | Mechanical output | 64 | District cooling |
| 13 | Compressed air line ① | 65 | Compressed air line ⑥ |
| 14 | Air compressor | 112 | Well inlet |
| 15 | Compressed air line ② | 114 | Well outlet |
| 16 | Salt water | 120 | Outer casing |
| 17 | Salt water bore head | 122 | Insulated inner casing |
| 18 | Salt water bore | 170 | First support casing |
| 19 | Fresh water | 172 | Second support casing |
| 20 | Fresh water outlet | 174 | Third support casing |
| 21 | Brine outlet | | |
| 22 | Air vacuum pump | | |
| 23 | Air driven brine pump | | |
| 24 | Vacuum line | 200 | Tapping point |
| 25 | Flash separator | 201 | Reinjection point |
| 26 | Drain | 202 | Building |

-continued

LEGEND

| No. | Description | No. | Description |
|---|---|---|---|
| 27 | Salt water delivery line | 203 | Chiller |
| 28 | Ambient air intake | 204 | Cooling circuit |
| 29 | Air well pump | 205 | Nitrogen plant |
| 30 | Heat Exchanger | 206 | Ammonia production plant |
| 31 | Compressed air line ③ | 207 | Private residences |
| 32 | Compressed air line ④ | | |
| 33 | Working medium | 270 | Positive power cable |
| 34 | Heated working medium | 271 | Negative power cable |
| 36a | Primary circuit start-up pump | 272 | Nitrogen plant air intake |
| 36b | ORC Circuit pump | 273 | Nitrogen line into ammonia plant |
| 37 | Air storage tank | 274 | Ammonia outtake line |
| 38 | Fresh Water pump | 275 | Heated Hydrogen line |
| 39 | Brine | 276 | Hydrogen cooler |
| 40 | Desalination plant | 277 | Oxygen compressor |
| 42 | First chamber | 278 | Ammonia storage tank |
| 43 | Top up water supply | | |
| 44 | Last chamber | 400 | Heating liquid step |
| 46 | Compressed air line ⑤ | 401 | Driving turbines step |
| 47 | Electrical Generator | 402 | Driving electrical generator |
| 48 | Brine discharge pump | 403 | Driving air compressor step |
| 49 | Electrolyser | 404 | Configure first air supply line to drive air well pump |
| 50 | Hydrogen line | 405 | Configure second air supply line to drive start-up pump |
| 51 | Hydrogen Storage Tank | 406 | Configure third air supply line to drive fresh water pump |
| 52 | Cathode | | |
| 53 | Anode | 510 | Seals |
| | | 512 | Exterior support collar |

The invention claimed is:

1. A geothermal hydrogen production system, comprising:

a primary liquid circuit circulating a liquid into a geothermal well and returning heated liquid from a well head of the geothermal well, the primary liquid circuit passing through a desalination plant;

a first turbine driven by the heated liquid to produce a first mechanical output;

a second turbine driven by the heated liquid to produce a second mechanical output, and an electrolyser, wherein the first mechanical output drives an electrical generator configured to power the electrolyser generating hydrogen via electrolysis of fresh water, and the second mechanical output drives a compressor to provide at least one of a first, a second and a third compressed air supply, wherein the first compressed air supply drives a supply pump to supply salt water to the desalination plant, the second compressed air supply drives a start-up pump to initiate the primary liquid circuit, and the third compressed air supply drives a fresh water pump to deliver fresh water from the desalination plant to the electrolyser.

2. The geothermal hydrogen production system of claim 1, wherein a portion of the heated liquid is subject to pressure change in a separator to produce a vapour to drive the first turbine and the second turbine.

3. The geothermal hydrogen production system of claim 1, wherein residual heated liquid from a first separator is mixed with an exhaust from the first turbine liquid in the primary circuit to increase the temperature of the liquid in the primary liquid circuit.

4. The geothermal hydrogen production system of claim 3, wherein residual heated liquid from a second separator is mixed with an exhaust from the second turbine in the primary circuit to increase the temperature of the liquid in the primary liquid circuit.

5. The geothermal hydrogen production system of claim 1 further comprising a second compressor driven by the second mechanical output from the second turbine and configured to compress the hydrogen generated by the electrolyser.

6. The geothermal hydrogen production system of claim 1, further comprising:

a third turbine driven by the heated liquid of the primary liquid circuit to produce a third mechanical output, wherein the third mechanical output is configured to drive a second compressor to compress the hydrogen generated by the electrolyser.

7. A geothermal hydrogen production system comprising:

an electrolyser, a primary circuit and a secondary circuit, the primary circuit circulating a liquid into a geothermal well and returning heated liquid from a well head of the geothermal well, the heated liquid of the primary circuit being fed to a heat exchanger to heat a working medium of the secondary circuit, the heated working medium passing through a desalination plant, the heated working medium of the secondary circuit driving a first turbine to produce a first mechanical output and the heated liquid of the primary circuit driving a second turbine to produce a second mechanical output, wherein the first mechanical output drives an electrical generator configured to power the electrolyser generating hydrogen via electrolysis of fresh water, and the second mechanical output drives a compressor to provide at least one of a first, a second and a third compressed air supply, wherein the first compressed air supply drives a supply pump to supply salt water to the desalination plant, the second compressed air supply drives a start-up pump to initiate the primary liquid circuit, and the third compressed air supply drives a fresh water pump to deliver fresh water from the desalination plant to the electrolyser.

8. The geothermal hydrogen production system of claim 7, further comprising a second compressor driven by the second mechanical output from the second turbine and configured to compress the hydrogen generated by the electrolyser.

9. The geothermal hydrogen production system of claim 7, further comprising:

a third turbine driven by either of:

(i) the heated liquid of the primary liquid circuit; or (ii) the heated working medium of the secondary circuit, to produce a third mechanical output, wherein the third mechanical output is configured to drive a second compressor to compress the hydrogen generated by the electrolyser.

10. A geothermal hydrogen production system comprising an electrolyser, a primary circuit and a secondary circuit, the primary liquid circuit circulating a liquid into a geothermal well and returning heated liquid from a well head of the geothermal well, the heated liquid passing through a desalination plant within the primary liquid circuit, the heated liquid of the primary circuit passing a heat exchanger to heat a working medium of the secondary circuit, wherein the heated working medium of the secondary circuit drives a first turbine to produce a first mechanical output and the heated liquid of the primary circuit drives a second turbine to produce a second mechanical output; wherein the first mechanical output drives an electrical generator configured to power the electrolyser generating hydrogen via electrolysis of fresh water, and the second mechanical output drives a compressor to provide at least one of a first, a second and a third compressed air supply, wherein the first compressed air supply drives a supply pump to supply salt water to the desalination plant, the second compressed air supply drives a start-up pump to initiate the primary liquid circuit, and the third compressed air supply drives a fresh water pump to deliver fresh water from the desalination plant to the electrolyser.

11. The geothermal hydrogen production system of claim 10, further comprising a second compressor driven by the second mechanical output from the second turbine and configured to compress the hydrogen generated by the electrolyser.

12. The geothermal hydrogen production system of claim 10, further comprising:

a third turbine driven by either of:

(i) the heated liquid of the primary liquid circuit; or (ii) the heated working medium of the secondary circuit, to produce a third mechanical output, wherein the third mechanical output is configured to drive a second compressor to compress the hydrogen generated by the electrolyser.

13. The system of claim 7 wherein, the secondary circuit comprises at least one of:

a fresh water condenser configured to draw heat from the secondary circuit to heat the fresh water from the desalination plant before being delivered to the electrolyser; and a salt water condenser configured to draw heat from the secondary circuit to heat the salt water prior to supplying the desalination plant.

14. The system of claim 7, wherein the working medium in the secondary circuit is a binary fluid having a low-boiling point.

15. The system of claim 7, wherein the working medium is N-Pentane.

16. The system of claim 7, wherein the compressor further provides a fourth compressed air supply to drive a circuit pump to circulate the working medium in the secondary circuit.

17. The system of claim 1, wherein the fresh water from the desalination plant is pumped directly to the electrolyser to be disassociated into oxygen and hydrogen.

18. The geothermal hydrogen production system of claim 1, wherein the hydrogen is collected from the electrolyser and stored in liquid form at about 1000 Bar.

19. The system of claim 1, wherein either the heated liquid of the primary liquid circuit or the heated working medium of the secondary circuit passes through the desalination plant divesting thermal energy to distil the salt water in the desalination plant to produce fresh water and brine.

20. The system of claim 1, wherein the compressor further provides a fifth compressed air supply to drive a brine pump, to pump brine from the desalination plant.

21. The system of claim 1, wherein the compressor further provides a sixth compressed air supply to drive a waste water pump, to pump waste water from the electrolyser.

22. The geothermal hydrogen production system of claim 1, wherein at least one of the supply pump, the start-up pump, the fresh water pump, the circuit pump, the brine pump, and the waste water pump is configured to be powered by the electrical generator.

23. The system of claim 1, wherein at least one of the first turbine, the second turbine and the third turbine is substituted for any one of: a screw expander, an ORC turbine, an engine, a steam engine or a water wheel.

24. The system of claim 1, wherein the supply pump is configured to drive salt water from a salt water source to a first chamber of the desalination plant.

25. The system of claim 24, wherein the salt water is sprayed into the first chamber of the desalination plant, the first chamber heated by either of the heated working medium of the secondary circuit or the heated liquid of the primary liquid circuit passing therethrough.

26. The system of claim 1, wherein a storage tank is incorporated within at least one of the first, second, and third air supplies to store compressed air.

27. The system of claim 1, wherein an air vacuum pump is connected upstream of the compressor, such that the air vacuum pump is driven by a flow of ambient air drawn into the compressor.

28. The system of claim 27, wherein a vacuum line is connected to the vacuum pump to drawn air from at least one chamber of the desalination plant.

29. The system of claim 1, wherein circulation of the primary liquid circuit once initiated by the start-up pump is sustained by a thermal syphoning effect drawing liquid into the geothermal well at a first temperature as heated liquid is forced out of the well head at a second temperature, greater than the first temperature.

30. The system of claim 29, wherein the start-up pump of the primary liquid circuit is deactivated once the liquid of the primary liquid circuit is circulating predominantly under the thermal syphoning effect.

31. The system of claim 1, wherein the liquid in the primary liquid circuit is water or distilled water.

32. A method of generating and feeding fresh water to an electrolyser to produce hydrogen, powered by geothermal energy, comprising the steps: feeding a liquid into a geothermal well and drawing heated liquid from the well head of the geothermal well to form a primary liquid circuit, the primary liquid conveying heat energy to a desalination plant; communicating the heated liquid from the primary liquid circuit to a first turbine and a second turbine to produce a first mechanical output and a second mechanical output respectively; directing the first mechanical output to an electrical generator to power the electrolyser configured to generate hydrogen via electrolysis of fresh water, and directing the second mechanical output to a compressor to produce at least one of a first, a second and a third compressed air supply, wherein the first compressed air supply drives a supply pump configured to drive salt water to the desalination plant, the second compressed air supply drives a start-up pump to initiate the primary liquid circuit, and the third compressed air supply drives a fresh water pump to pump fresh water from the desalination plant to the electrolyser to be decomposed into hydrogen and oxygen.

33. The method of claim 32, further comprising the step of:
driving a second compressor from the second mechanical output of the second turbine, the second compressor configured to compress the hydrogen generated by the electrolyser.

34. The method of claim 32, further comprising the step of:
communicating the heated liquid from the primary liquid circuit to a third turbine to produce a third mechanical output, and
directing the third mechanical output to a second compressor configured to compress the hydrogen produced by the electrolyser.

35. The method of claim 32, comprising the step of converting a portion of the liquid in the primary liquid circuit to vapour in a separator to drive at least one of the first turbine and the second turbine.

36. The method of claim 35, comprising the step of combining residual heated liquid from the separator with an exhaust from the first turbine to increase the temperature of the liquid in the primary liquid circuit.

37. A method of generating and feeding fresh water to an electrolyser to produce hydrogen, powered by geothermal energy, comprising the steps: feeding a liquid into a geothermal well and drawing heated liquid from the well head of the geothermal well, the heated liquid of the primary circuit being fed to a heat exchanger to heat a working medium of the secondary circuit, the heated working medium passing through a desalination plant, wherein the heated working medium of the secondary circuit drives a first turbine and a second turbine to produce a first mechanical output and a second mechanical output respectively; directing the first mechanical output to an electrical generator to power the electrolyser configured to generate hydrogen via electrolysis of fresh water, and directing the second mechanical output to a first compressor to produce at least one of a first, a second and a third compressed air supply, wherein the first compressed air supply is configured to drive a supply pump to drive salt water to the desalination plant, the second compressed air supply drives a start-up pump to initiate the primary liquid circuit, and the third compressed air supply drives a fresh water pump to pump fresh water from the desalination plant to the electrolyser to be decomposed into hydrogen and oxygen.

38. The method of claim 37, further comprising the step of:
driving a second compressor from the second mechanical output of the second turbine, the second compressor configured to compress the hydrogen generated by the electrolyser.

39. The method of claim 37, further comprising the step of:
communicating the heated liquid from the primary liquid circuit to a third turbine to produce a third mechanical output, and
directing the third mechanical output to a second compressor configured to compress the hydrogen produced by the electrolyser.

40. A method of generating and feeding fresh water to an electrolyser to produce hydrogen, powered by geothermal energy, comprising the steps: feeding a liquid into a geothermal well and drawing heated liquid from the well head of the geothermal well to form a primary liquid circuit, the primary liquid conveying heat energy to a desalination plant; feeding the heated liquid of the primary circuit to a heat exchanger to heat a working medium of a secondary circuit, wherein the heated working medium of the secondary circuit drives a first turbine to produce a first mechanical output and the heated liquid of the primary liquid circuit drives a second turbine to produce a second mechanical output respectively; directing the first mechanical output to an electrical generator to power the electrolyser configured to generate hydrogen via electrolysis of fresh water, and directing the second mechanical output to a compressor to produce at least one of a first, a second and a third compressed air supply, wherein the first compressed air supply is configured to drive a supply pump to drive salt water to the desalination plant, the second compressed air supply drives a start-up pump to initiate the primary liquid circuit, and the third compressed air supply drives a fresh water pump to pump fresh water from the desalination plant to the electrolyser to be decomposed into hydrogen and oxygen.

41. The method of claim 40, further comprising the step of:
driving a second compressor from the second mechanical output of the second turbine, the second compressor configured to compress the hydrogen generated by the electrolyser.

42. The method of claim 40, further comprising the step of:
communicating the heated liquid from the primary liquid circuit to a third turbine to produce a third mechanical output, and
directing the third mechanical output to a second compressor configured to compress the hydrogen produced by the electrolyser.

43. The method of claim 37, further comprising the step of:
drawing heat from the working medium of the secondary circuit via a fresh water condenser to heat the fresh water from the desalination plant before delivering the fresh water to the electrolyser.

44. The method of claim 37, further comprising the step of:
drawing heat from the working medium of the secondary circuit via a salt water condenser to heat the salt water before delivering the salt water to the desalination plant.

45. The method of claim 37, further comprising the step of driving a circuit pump from a fourth compressed air supply from the first compressor to circulate the working medium in the secondary circuit.

46. The method of claim 37, wherein the working medium in the secondary circuit is a binary fluid having a low-boiling point.

47. The method of claim 46, wherein the working medium is N-Pentane.

48. The method of claim 32, further comprising the step of driving a brine pump from a fifth compressed air supply from the first compressor to pump brine from the desalination plant.

49. The method of claim 32, further comprising the step of driving a waste water pump from a sixth compressed air supply from the first compressor to pump waste water from the electrolyser.

50. The method of claim 32 further comprising the step of powering at least one of the supply pump, the start-up pump, the fresh water pump, the circuit pump, the brine pump, and the waste water pump from the electrical generator.

51. The method of claim 32, wherein the liquid in the primary liquid circuit is water or distilled water.

52. The method of claim 32, further comprising the step of drawing ambient air through the compressor via a vacuum pump.

53. The method of claim 52, further comprising the step of drawing air from at least one chamber of the desalination plant to create a vacuum therein via a vacuum line off the vacuum pump.

54. The method of claim 32, wherein at least one of the first, second and third turbine is substituted for a screw expander, a steam engine, an ORC turbine, an engine, a steam engine or a water wheel.

55. The method of claim 32, wherein at least one of the first, second and third turbines comprises a series of turbines.

56. The method of claim 32, further comprising the step of pumping saltwater from a saltwater source using the supply pump, to deliver salt water to the desalination plant, wherein the supply pump is an air-pump.

\* \* \* \* \*